(12) United States Patent
Aarskog

(10) Patent No.: US 8,265,925 B2
(45) Date of Patent: Sep. 11, 2012

(54) METHOD AND APPARATUS FOR TEXTUAL EXPLORATION DISCOVERY

(75) Inventor: Brit Helle Aarskog, Bergen (NO)

(73) Assignee: Texturgy AS, Bergen (NO)

( * ) Notice: Subject to any disclaimer, the term of this patent is extended or adjusted under 35 U.S.C. 154(b) by 361 days.

(21) Appl. No.: 10/495,727

(22) PCT Filed: Nov. 15, 2002

(86) PCT No.: PCT/NO02/00423
§ 371 (c)(1), (2), (4) Date: Dec. 13, 2004

(87) PCT Pub. No.: WO03/042859
PCT Pub. Date: May 22, 2003

(65) Prior Publication Data
US 2005/0108001 A1    May 19, 2005

(30) Foreign Application Priority Data
Nov. 15, 2001 (NO) .................................. 20015581

(51) Int. Cl.
*G06F 17/27* (2006.01)
(52) U.S. Cl. .................. 704/9; 704/1; 704/10; 707/706; 707/707; 707/708
(58) Field of Classification Search .................. 704/9, 1, 704/10; 707/2–6, 706, 711, 736, 741, 752, 707/755, 778
See application file for complete search history.

(56) References Cited

U.S. PATENT DOCUMENTS

| | | | | |
|---|---|---|---|---|
| 5,913,215 A * | 6/1999 | Rubinstein et al. | ........... | 707/708 |
| 5,963,940 A | 10/1999 | Liddy et al. | | |
| 6,076,088 A * | 6/2000 | Paik et al. | .......... | 707/5 |
| 6,167,370 A * | 12/2000 | Tsourikov et al. | ................ | 704/9 |
| 6,212,494 B1 * | 4/2001 | Boguraev | .......... | 704/9 |
| 6,263,335 B1 * | 7/2001 | Paik et al. | .......... | 707/5 |
| 6,360,216 B1 * | 3/2002 | Hennessey et al. | ................... | 1/1 |
| 6,901,399 B1 * | 5/2005 | Corston et al. | .................... | 707/6 |
| 7,251,781 B2 * | 7/2007 | Batchilo et al. | ................ | 715/210 |
| 2002/0016707 A1 * | 2/2002 | Devoino et al. | ................ | 703/22 |
| 2002/0077832 A1 * | 6/2002 | Leonid et al. | ................ | 704/276 |
| 2005/0267871 A1 * | 12/2005 | Marchisio et al. | ................ | 707/3 |
| 2007/0156393 A1 * | 7/2007 | Todhunter et al. | ................ | 704/9 |

FOREIGN PATENT DOCUMENTS

WO    WO-00 14651 A    3/2000

(Continued)

OTHER PUBLICATIONS

Papageorgiou et al., Multi-level XML-based Corpus Annotation, 2002, Institute for Language and Speech Processing, p. 1723-p. 1728.*

(Continued)

*Primary Examiner* — David R Hudspeth
*Assistant Examiner* — Lamont Spooner
(74) *Attorney, Agent, or Firm* — Fulbright & Jaworski LLP

(57) ABSTRACT

The present invention relates to a method and system for textual exploration and discovery. More specifically, the method and system provide a text-driven and grammar based tool for textual exploration and textual navigation. The facilities for textual exploration and textual navigation are based on a system of index entries that are connected to the underlying text segments from which the index entries are derived. Text units with particular grammatical, semantic, and/or pragmatic features constitute bundles of sentences or text zones.

30 Claims, 10 Drawing Sheets

Synopsis: Insight, Exploration and Discovery
Main Interface Options

Contacts in the APO triplet (facets Agent, Process, and Object) are interconnected terms with particular grammatical roles in the text from which they are extracted.

The contacts are connected to the underlying text and assigned to the facets in the APO triplet (and more detailed facets).

The extraction procedure is based on three sets of interdependent principles:
• grammar based extraction patterns
• free faceted classification method
• target word selection procedures The user can explore the contacts through various options for filter and sort.

When selecting a contact in Agent, the Process and Object facets are filtered to show collocating codes (referring to words from the text that are grammatically related).

FOREIGN PATENT DOCUMENTS

| | | |
|---|---|---|
| WO | WO-00 46701 A | 8/2000 |
| WO | WO-01 11492 A | 2/2001 |
| WO | WO-01 82123 A | 11/2001 |

OTHER PUBLICATIONS

Weibel et al., Dublin Core Metadata for Resource Discovery, 1998, RFC Editor, pp. 1-11.*

Lawrence, Digital Libraries and Autonomous Citation Indexing, 1999, IEEE, vol. 32, No. 6, pp. 67-71.*

Lenci et al., Fame: a Functional Annotation Meta-scheme for multi-modal and multi-lingual Parsing Evaluation,1999, Association for Computational Linguistics, p. 39-46.*

Tapanainen et al., Tagging accurately: don't guess if you know, 1994, ACL, pp. 47-52.*

* cited by examiner

Figure 5

NEW
220501

Synopsis: Insight, Exploration and Discovery
Main Interface Options

Contacts in the APO triplet (facets Agent, Process, and Object) are interconnected terms with particular grammatical roles in the text from which they are extracted.

The contacts are connected to the underlying text and assigned to the facets in the APO triplet (and more detailed facets).

The extraction procedure is based on three sets of interdependent principles:

- grammar based extraction patterns
- free faceted classification method
- target word selection procedures The user can explore the contacts through various options for filter and sort.

When selecting a contact in Agent, the Process and Object facets are filtered to show collocating codes (referring to words from the text that are grammatically related).

METHOD AND APPARATUS FOR TEXTUAL EXPLORATION DISCOVERY

This is a §371 of PCT/NO02/00423 filed Nov. 15, 2002, which claims priority from Norwegian 20015581 filed Nov. 15, 2001, each of which are hereby incorporated by reference in their entireties.

FIELD OF THE INVENTION

The present invention relates to a method and system for textual exploration and discovery. More specifically, the method and system provide a text-driven and grammar based tool for textual exploration and textual navigation. The facilities for textual exploration and textual navigation are based on a system of index entries that are connected to the underlying text units from which the index entries are derived. Text units with particular grammatical, semantic, and/or pragmatic features constitute bundles of sentences or text zones.

Index structures constitute a system of representations of texts extracted from preferably domain specific document collections. Indexes stand in place of the original text of interest to users and constitute the system's selectivity. The present invention focuses on the rules applied for the construction of representations and the process for making use of the representations during text exploration and text navigation. The system of representations is made available in a preferred embodiment of an apparatus supporting text exploration activities.

The present invention focuses on presenting the representations as attention structures making the user aware of the texts' content. The preferred embodiment of the present invention supports users when they formulate their requests and provides for flexible tools that guide the users' attention to portions of the underlying texts with options for further in-depth exploration.

BACKGROUND OF THE INVENTION

The brief description of the problem area is restricted to the two-sided problem facing the user instructed to investigate documents. In this situational context she knows from experience that some particular parts of the documents are more noteworthy for the interpretative task she is engaged in, and that other parts may be considered as more superfluous. Further she finds it difficult to rapidly locate the important parts in a context characterised by time pressure.

The present invention is founded on the assumption that improved indexing engines, search engines, and other tools that are developed as a response to search related problem are not adequate for the performance of interpretative tasks involving in-depth investigations of texts. These tools are primarily seen as addressing another type of problem, commonly denoted as 'information overflow' and where the goal is to detect a possibly useful subset of documents from www accessible collections comprising millions of documents.

Search systems of the prior art are, in large, based on the so-called 'traditional model of information retrieval'. This model is thoroughly characterised and discussed in information retrieval literature. A quote extracted from Blair (1990) indicates the principal features of the problem in focus: " . . . the traditional model of information retrieval which stipulates that the indexer's (or automatic indexing procedure's) job is to accurately describe the content and context of documents, regardless of how the inquirers might describe that content, and the inquirer's task is to guess how the documents he might find useful have been represented. This is the normative model of information retrieval and it is implicit in most information retrieval models." (1990:189).

The provision of the right information and saving time puts pressure on better acquisition procedures and as the amount of information that is available is steadily growing, the burden on indexing devices also becomes higher. This is commonly denoted as the 'scaling problem'.

The present invention looks beyond information dissemination as merely making more information available. The present invention presupposes intermediaries in the organisation (user community) who gather documents from various sources. Acquisition, segmentation, disambiguation and the underlying indexing principles are of critical importance for effective dissemination, searching and use of document collections. The answer to the specific problems addressed is not found in smarter search algorithms or so-called intelligent agents per se, although new functionality and new visualisation techniques might help. The answer embedded in the present invention is to get the user closer to the content by new representational means and a new set of tools interfacing these.

The challenge is to transform the essential documents into a system that differentiates between document types and construct representations of texts extracted from documents in a manner that attract the users' attention. The textual content has to be transformed and reduced into a form that makes the content accessible with less effort and time expenditures. Special designed services will add value to the content representations by applying a particular apparatus for zonation and an apparatus for filtering that delivers results in an interface, preferably denoted as a text sounding board.

The Principle of Text Driven Attention Structures

In order to explain this principle, it is necessary to include a brief reflection on the concepts of 'meaning', 'understanding', and 'context', and with reference to characteristics of text. Preferably this reflection relates to genres as argumentative text, directive texts and narratives.

First of all, the comprehension of, and therefore the definition of, the concepts 'meaning' and 'content' is dependent on that of 'context'. The environment of the present invention constitutes two substantially different parts: 1) Authors situated in a situational context and, for some reason, produce documents that reflect some of the features of the situational context and as perceived by the authors. 2) Users situated in another situational context and, for some reason, have to confront themselves with documents in order to read and interpret the 'meanings of the author' mediated in text.

Authors who are situated in particular situational contexts produce documents, and other actors who are situated in quite different situational contexts use documents. Even if the author and user happen to be the same person, the situation at the time of writing will be different from a later situation of exploring and reading. The user may perceive/understand one 'meaning' from the text's content in one situational context, but seeks for another 'meaning' from the same content in another situational context. The situational context is for instance influenced by the work task at hand, time available, background knowledge, etc.

'Meaning' and 'context' appear in varying situations, but are still mutually related and relative. To situate some words or word constellations within the text's inner context, i.e., within the context of the text itself, will lead the user's attention to a certain place ('locus'). However, for the user to understand the visualised place as meaningful, she also has to understand it as meaningful in the situational context in which she operates, i.e., why she finds it necessary to explore and read documents.

The concept of 'meaning in context' cannot be defined properly since it denotes a kind of circularity of enclosure. The interrelationships between 'meaning' and 'context' can be expressed if 'context' is seen as levels of enclosure. Thus the words' inner context is the words in the surrounding area and preferably with the document from which the text is extracted seen as the edges of the inner context. A particular text has also an outer context, also textual, as defined by other documents in some way related to the situational context in which they were produced. The situational context is the world 'outside the text' and each text always reflects more or less, one or several authors' interpretation of this 'outside world'.

A user situated in a different situational context can thus be made aware of some features related to the author's interpretation mediated in text. A text driven generation of text zones reflects some of the features and as related to how the author's focus of attention moves and shifts across the text's collection of sentences. Thus text zones provide for artificial horizontal sub-contexts, i.e., horizontal in that sentences follow each other in sequences, at least within the cultural environment of the present invention.

The text zones reflect particular patterns of repetition which when taken together with words not in particular repeated within a zone, builds up structures of attention originating from the author. The patterns of repetition encompass several textual features at different levels, i.e. not only lexical features but features related to grammatical form as tense and modality, and superordinate argumentative functions signalling particular discourse elements.

A text zone is an artificial or derived horizontal sub-context (within the inner context), giving the background information for a particular word occurrence or word constellation. This background information affects the 'meaning' of the word occurrence as determined by the author. Likewise, the background information affects the 'meaning' of the word occurrence as understood by a user in a totally different situational context. The background information can be as significant as the particular word occurrence when the user decides whether the 'meaning' or 'content' is useful in that particular situational context.

Consequently, the notion of 'equality' between words, either the very same word or its synonyms or near-synonyms, is by definition an ambiguous concept. Equality or sameness refers to word occurrences and by some schools of thought, purporting to refer to the 'same entity' in the situational context, i.e. supposed to exist in the world outside the text. The present invention is based on the assumption that even the 'same entity' will be perceived differently and that this perception again varies with context. This ends up with an assertion that there are no criteria for determining equality between the very same words occurring in varying contexts. It will therefore not be possible to construct a description for a word and its interconnections to other words that is detached from context, and thereafter apply the description for the same word occurring in various contexts. Since the identification of text zones is dependent on the identification of word occurrence and how they repeat in patterns of fluctuation, the users' recognition and understanding of the word occurrences will be dependent on the text zone in which the word occurs, i.e., the word occurrences' situated background information.

This brief reflection explains why the present invention does not rely on, or is cautious about, the application of general thesauri (such as the widely used WordNet) or semantic networks as for instance conforming to the syntax defined for Topic Maps (ISO/IEC 13250).

The present invention instead relies on a method and system for establishing relations between word occurrences, and with respect to the words' inner context. This explains the principle of text drivenness in which the text itself gives the necessary background information for the generation and construction of relations between words, where bundles of relations form text zones reflecting how the author's attention moves across the text. When these text zones and particular word occurrences within zones are visualised in a preferred interface, the users' attention will be directed towards these structures seen as horizons virtually superimposed on underlying grammatical encoded texts. The phrase 'virtually superimposed' refers to the fact that the structures are not encoded in the text, rather they are managed in a system of external files and a device that transmits derived information and displays it in a text sounding board. By operating on this text sounding board, the user can directly influence the device that constructs attention structures reflecting the users' explorative moves.

The key concept is that of text driven attention structures reflecting aspects of the authors' attention in their perceived situational context at the time of writing. The concepts of insight, chance and discovery covers for the user, and reflecting the knowledgeable user confronted with the texts made accessible via a text sounding board, and where the user operates in totally different situational context. (The concepts of insight, chance, and discovery are borrowed form the ancient legend about the Three Princes of Serendip, and as told in Remer (1965).

The Users' Problem

The user's main problem is to express her 'information need'. The problem for the user is related to the indexing devices (in a continuum from controlled to free-text indexing), and not so much related to the system's search functionality. (The concept search functionality refers to the implementation of how the system matches the user request against representations of documents in the system and how the system calculates/presents the items most likely to satisfy the user's need).

The main problem for the user is related to the user's ability to express her 'information need' as a request submitted to the search system. The search request is a search expression composed of a set of search terms and search operators. The search expressions are indirect in that the searches are not executed in the text itself, but in index structures that is supposed to represent to the text content (text content surrogates). The search system compares the constellation of terms in the search expression with the system's index terms (document representations or document vectors).

The index terms in a search expression may be combined in a seemingly infinite number of ways and the user will experience uncertainty whether documents are indexed with the terms included in the search expression. Surely, in all information searching, there is an investment of time. Advanced indexing devices aim at reducing search time by trimming the search space. However, the point made is that the user will meet the same type of problem regardless of whether the index structures contain so-called free-text terms or terms from a controlled vocabulary (index terms using the notation form a classification scheme which in fact is an extreme form of summarisation). The index structures may be restricted to chains of nominal expressions and concepts may be related by simple semantic links (synonyms, etc), arranged in hierarchical structures (broader terms and narrower terms). However, these relations are always much weaker than the original textual semantic relations that incorporate textual coherence.

The Search Process is a Linguistic Transformation Process

Empirical investigations reveal several factors explaining the user's incapability to express their information need in an accurate manner so that the system produces a result covering the information needs (normally the discussions differentiate between goal-oriented searches and interest oriented searches). The user is in a situation in which she has to balance two quite different goals: First of all, she has to predict how supposedly relevant parts of the text are represented in the index system. Secondly, she must formulate a request that retrieves a number of items (documents or text segments) that is adequate with respect to the amount of resources she has available when judging the items' usefulness.

When performing a goal-oriented search in a domain-specific, rather small-scale document base, the user needs a possibility to explore available index terms in order to deliver an accurate request to the system. A search result of, let say, 100 to 1000 items (or more) is in some situations of no value to the user. The number of items in the result list exceeds the user's futility point, or the user's capacity to browse/read in order to find information accepted as useful.

A lot of factors influence on the user when she is trying to formulate a 'best match query' (background knowledge, data base heterogeneity, etc). This process is in fact a linguistic transformation process where the user has to transform her ideas about an information need to a chain of nominal expressions. On the other side, document content has been transformed in another process resulting in lists of isolated concepts.

An isolated term or concept is a word that cannot, in isolation refer to the meaning mediated in the text (Ranganathan 1967). (An isolated concept can be a component in a compound subject in turn being a part for a complex subject.) This assertion covers both indexes resulting from automatic indexing procedures or so-called independent subject analysis. Semantic relations that occur in the text cannot be expressed in the index (as opposed to semantic relations encoded in for instance thesauri).

Why Does the User's Request Fail?

A search request may fail for a number of reasons (the request fails when the system delivers a result that the user finds unsatisfactory). The following list gives a simple overview of some important causes related to the use of terms (words, expressions) in the search requests.

Terms are left out (excluded), perhaps because the user assumes that they are not present in the system's index structure or that she assumes them to be of no relevance in a search request or that she believes that certain terms do not have a sufficient discriminating ability.

Terms are included because the user thinks that certain words are present in documents or represented in the index structures. Automatic procedures can remove such terms and/or replace them by classifying them as members of a semantic class in a thesaurus. Replacements may be in conflict the user's intention or the idea the user is trying to express through a set of terms (however, systems supporting this option normally ask the user to confirm term replacements).

The user selects terms referring to words that are used at present (new or popular terms) or words related to a specific domain (professional language). Documents of potential relevance may be indexed with terms that are different from those used at present but referring to the same meaning. Thesauri inquiries may establish term accordance (terms in request and terms in index structure). This strategy however, increases the search scope (involves the operator OR) and thereby the result list may exceed the user's futility point.

The request includes too many terms or terms combined with operators that exclude potentially relevant documents (text segments). Empirical investigations indicate that users are reluctant to alter or remove the first 2-3 terms in a combined list. Automatic procedures can adjust the sequence of terms and/or give terms weights according to their position in a list. If the user considers the first terms as more important than the others, these automatic procedures may conflict with the user's intention. The request includes terms at an abstraction level different from the terms in the index structure. In more advanced systems the user is given the option to select broader or narrower terms. Alternatively, the user can choose operators that move downwards or upwards in a term hierarchy. Depending on the thesaurus, the search scope may accordingly be too large or too narrow with respect to the user's search intention.

Several Failure Causes may be Present in One Request

The user's linguistic transformation problem is that several of these 'failure causes' may be present in one search request. The user has no possibility to evaluate her search request with respect to terms available in the index structures. The index terms are 'hidden' in that the user only can perceive fragments (if the system at all offers options for looking into the index system).

The problem convey some resemblance with a situation where to persons are trying to dialog by talking two different languages (the user's natural language transformed into a chain of terms and the system's documents transformed into an index structure with isolated terms without relations). The user is in a situation where she tries to learn the system's language in order to achieve a goal (satisfying an information need). However, the learning of a new language presupposes feedback about why a certain expression does not produce a satisfactory search result. No system (yet) provides feedback explaining why the search request failed—a complicated feedback if several of the mentioned 'failure causes' are present in the same request. Since the user cannot inspect the system's language use, she will not be able to correct her own language use when formulating search requests. The only available strategy is to proceed tentatively (trial en error) in every new search situation (new tasks with new information requests).

Systems of the prior art embody various proposals aiming at constructing diagnostic devices analysing the user's requests as compared to the results the user evaluates and marks as relevant. Such diagnostic devices seem to have problems dealing with the fact that language use is a dynamic entity "whose times of greatest dynamism and change may come in the very process of interacting with a retrieval system" (Doyle 1963).

The Present Invention's Solution Proposal

As early as in 1963 Doyle considered the role of relevance in information retrieval testing and concluded: "The gradually increasing awareness of human's incapability of stating his true need in a simple form will tend to pull the rug out from under many information retrieval system evaluation studies which will have been done in the meanwhile."

Doyle argued that the solution to this problem was not to design systems around the concept of relevance, but to base design on the concept of exploratory capability: "the searcher needs an efficient exploratory system rather than a request implementing system".

With reference to this quote, the inventor of the present invention therefore basically, addresses the user's problem related to formulating queries and providing feedback about to what extent the request matches the actual content in the documents/texts. A context-dependent and situated content representation takes into account the actual situation of the user. The assumption for the present invention is a domain-specific document collection evaluated as worth delivering to professionals within a certain user community.

Rather than relying on the user's capability of expressing information needs in an accurate manner, the system should provide the user with mechanisms that reflect the actual content in the document collection. The representation of document content must attend to the economy of time and more costly techniques are justified in terms of offering the user advanced options for exploring text in order to discover text zones that are useful in a given situation. The percentage scores of current search engines are, in this context, entirely inadequate measure of a system's value for the user. This problem is sought solved by incorporating new text theories and language technology into the field constructing system's selectivity. The apparatuses for segmentation and disambiguation perform essential pre-processing of the texts in order for other apparatuses to construct the preferred selectivity embodied as attention structures supporting individual behaviour during text exploration and navigation.

The interconnected apparatuses as outlined in FIG. 1 provide for a new type of selectivity. The particular apparatus that visualises grammar based contacts to the texts prepared for investigation will be explained in more detail below. The interface that displays these contacts is preferably denoted 'text sounding board' and provides a kind of 'decision support' in that it exposes the texts' content to the user and she is free to select her own moves by operating the content of the text sounding board. Her moves and actions are immediately mirrored in the interconnected text pane as illustrated in FIG. 5.

The selectivity of the present invention incorporates and supports:
  Grammatical information derived from CG-taggers
  Semantic information and the transfer of techniques related to thesauri construction
  Pragmatic information related to text understanding and features related to the situational context
  Statistical information derived from applying a reference corpus and computing keyness, and keyness of keyness
  Frequency information combined with grammatical information in relation to interconnected documental logical object types
  Zonation and filtering realised as intersecting chains, which embody the various types of information, outlined above Search Engines do not Solve this Particular Problem Despite all the work on search and indexing engines over the past 50 years, the problem of classifying, indexing and retrieving digital content remains a major problem for unstructured data such as text. Search and indexing engines (as Lycos, Google, AltaVista, InfoSeek, etc) proposes to solve the problem of finding information by constructing indexes from information sources available on the World Wide Web. Oversimplified, this is done by tracing hyperlinks and parsing the pages these hyperlinks point to. The URLs are maintained as entries in global index tables that these engines create and the pages referenced by the URLs can be retrieved in reply to a search request. Information filters propose to solve the problem of information overload in that they synthesise previous user requests into categories that are regularly invoked to operate on information streams.

Traditional search systems rely on different indexing devices and different indexing languages vary in the extent to which they use single or compound terms and hierarchies, whether index terms are controlled for synonyms or homographs. Free-text indexing devices are often combined with controlled vocabularies (assigned keywords). The user can normally restrict their search scope to certain fields (catalogue elements or Dublin Core Elements such as title, author, date of publication, headers, abstracts, and so on) and/or to certain document types. Typical search options are simple searches, category searches (index terms are arranged in controlled hierarchies). More sophisticated systems support GREP searches (Get Regular Expressions) which control the matching process based on 'special characters' included in the search string and various types of proximity operators. The employment of statistical and probabilistic techniques is a broadly accepted quantitative framework. However, limitations of the statistical approach are still claimed with reference to various retrieval performance metrics of systems employing statistical techniques is still (in absolute terms) low.

The Indexing Problem

As mentioned, index structures constitute a system of representations. The concept of representation by definition means that some information is left out. In order to ensure that the loss is not crucial with respect to information searches, the indexing strategy should focus on which information is expendable and which is not. In the following, some principal issues are shortly described. Indexing and classifying (indexing here: using the notations of a classification scheme) appear as a special profession and are often seen bound to retrieval necessities. Since indexing is bound to technical use in information retrieval, indexers (persons or programs) must strictly consider a set of representational prescriptions. The myriad of indexing strategies can be positioned according to combinations of a wide range of dimensions. Search engines operating on index structures to a varying degree include techniques for integrating (compare, weigh and merge) the index terms across databases. Representing textual content with compliance to prescriptions may explain the cause of several problems related to retrieval issues.

First of all, prescriptions set the requirement for the index terms, thus it can be the source of the 'isolated' descriptors assigned to the document at the cost of the textual formulations which may be the best discriminators in a given search situation.

Secondly, different indexing strategies result in different index terms for the very same textual content (extracted from a document), known as the inter-indexers' consistency problem, and the problem exists whether the indexing is performed by a human or a machine.

The tuning of index terms based on statistical information (word weighting procedures) may further obscure textual nuances that have a discriminating search effect. For instance, it is assumed that highly professional authors use a richer vocabulary than more inexperienced authors. Lexical style (influenced by personal, social, cultural, and other contextual factors) reflects the author's choices among immense variations in word constellations used to express more or less the same meaning. Words like 'lawyer', 'attorney', or 'solicitor' are variations in lexical style; however, the textual context may reveal deeper semantic variations. Such simple linguistic variations may be captured in indexing devices with synonymy relations derived from thesauri. The problem escalates when considering the fact that similar meanings may be expressed through sentences having different syntactic structure or word constellations that paraphrase single-word terms ('diseases of children' in stead of 'paediatrics').

The issue about lexical style is related to another indexing problem. Selecting the 'right' words from a classification system or thesauri can be quite complicated when indexing documents with an 'unexpected' or innovative content. New terms not covered in the classification system have to be projected into existing terms or the indexer has to extend the classification system so that it reflects the new terms. This latter case requires human intervention (independent subject analysis), and in principle also requires a professional indexer with lexicographic competence.

These and related problems explain the viewpoint taken by Langridge (1989): "At present the potential of computers is largely wasted because they are merely used as a medium for inferior indexing methods." Blair goes even further and claims: "To see the information problem as a computer problem is to confuse physical access with logical access, or to confuse the tool with the job." (1990:70). The concept 'logical access' in information retrieval refers to issues related to reducing the number of logical decisions the user must make when searching for information.

Focus is on how to identify and represent textual content in a text-driven fashion and provide representations visualised in a text sounding board. These representations are the logical access points for the set of texts of potential interest to users and constitute. The present invention also includes a rich set of options giving the users the opportunity to conduct text exploration and text navigation based on the constellations of access points visualised in the text sounding board.

SUMMARY OF THE INVENTION

"TextSounder" is the preferred name of the present invention.

The main object of the present invention is to address the information processing requirements in information-intensive organisations. More specifically, organisations with 'knowledge specialist' and documents are an interpretative medium for the enterprises' activities.

The present invention elevates the users' 'insight' into the chosen stance of search, offering numerous options for exploring logical access points organised in a set of contacts to the underlying text prepared for exploration. The present invention enables the user to transform his/hers insight into textual discovery.

Specifically, the user is given the opportunity to explore such contacts to the text as displayed in a interface with the preferred name 'text sounding board' that includes a wide variety of facilities arranged in five different modus operandi. The users' moves and actions when operating the text sounding board are immediately reflected in the interconnected text pane. Preferable, a particular device preferably denoted as the 'triple track' organises contacts in triplets in which the contacts give a glance into the word types nearest inner textual context. The preferred current display in the text pane 'follows' the moves in these 'rolling tracks', in which a selection made in one of the tracks influences the display of contacts in two other interconnected tracks. The triplets of contacts underlying the triple track are founded on a wide range of criteria as elaborated in the section 'Zonation Criteria', subsumed in the section 'Apparatus for Zonation'.

The selectivity embodied in the triple track requires pre-processing of the underlying texts, in particular pre-processing performed by grammar taggers known in the prior art. The section 'Apparatus for Disambiguation' briefly outlines the process and the present inventions' adjustments of deliveries from grammar taggers. The prepared texts and all necessary information extracted, and/or derived from the annotated texts are stored and managed in a special designed database, managed by a DBMS known in the prior art.

Further embodiments of the invention include detailed design and construction of semantic relations between words as they appear in their inner context. The explanation for the rather cautious approach regarding the establishment of semantic relations is given in the section 'The principle of text driven attention structures' and in the section 'Apparatus for Zonation'.

The contacts are inter alia mapped against preferably domain specific thesauri in a target word selection procedure that regulates the assignment of relations in accordance with how the words appear in their inner context. The target word selection procedure aims at strengthening the text zones within a text. Relations that are validated with reference to the texts' content are structured in an evolving thesaurus that provide for more details about the contacts displayed in the text sounding board. They will preferably support the user in her text exploration tasks in that they only reflect features about word occurrences in the current text displayed in the text pane. The new thesauri structures are not superimposed on new texts before the word appearances in the text are checked in a new cycle of target word selection.

The users' request posed to the system, or rather the direction of a course of search (moves) will be influenced by patterns of contact collocations displayed in the triple track. If these contacts resemble 'something' that the user had intended to find or look for, the search can proceed as planned. If the interests and/or contacts diverge, the user may wish to alter her focus of the search. The present invention offers options for navigating up or down abstraction layers (rounds and levels within each track in the triple track).

What characterises the insightful user from the more casual one is the ability to see a pattern or implication when exposed to it. The present invention is designed for users prepared to recognise triplets containing signs reflecting the information sought for, and the invention thus presumes that triplets of contacts (or parts of them) will be recognised as significant when they occur in the windowpanes. The user may discover potential worthwhile material when exposed to the texts' content and the patterns revealed in the text sounding board.

When a user has evaluated a set of contacts, she can ask for further refinements, which preferably will be embodied in the form of 'unfolding panes'. Much of what users are exposed to will rapidly be discarded. The triple track may be considered as an embodiment of an epitomic approach, which guides the users' attention into portions of the text. The underlying text is always present and in the most advanced modus operandi, it is preferred that the users cursor moves in the text pane will be mirrored in the triple track. This preferred embodiment is a bidirectional flow of content from the text to the triple track, and from the contacts in the triple track to the content in the text.

BRIEF DESCRIPTION OF FIGURES

The invention will be described in detail, with reference to the accompanying set of figures:

FIG. 5 shows an interface design of the APO triplets.

DETAILED DESCRIPTION OF PREFERRED EMBODIMENTS

Figure 1:
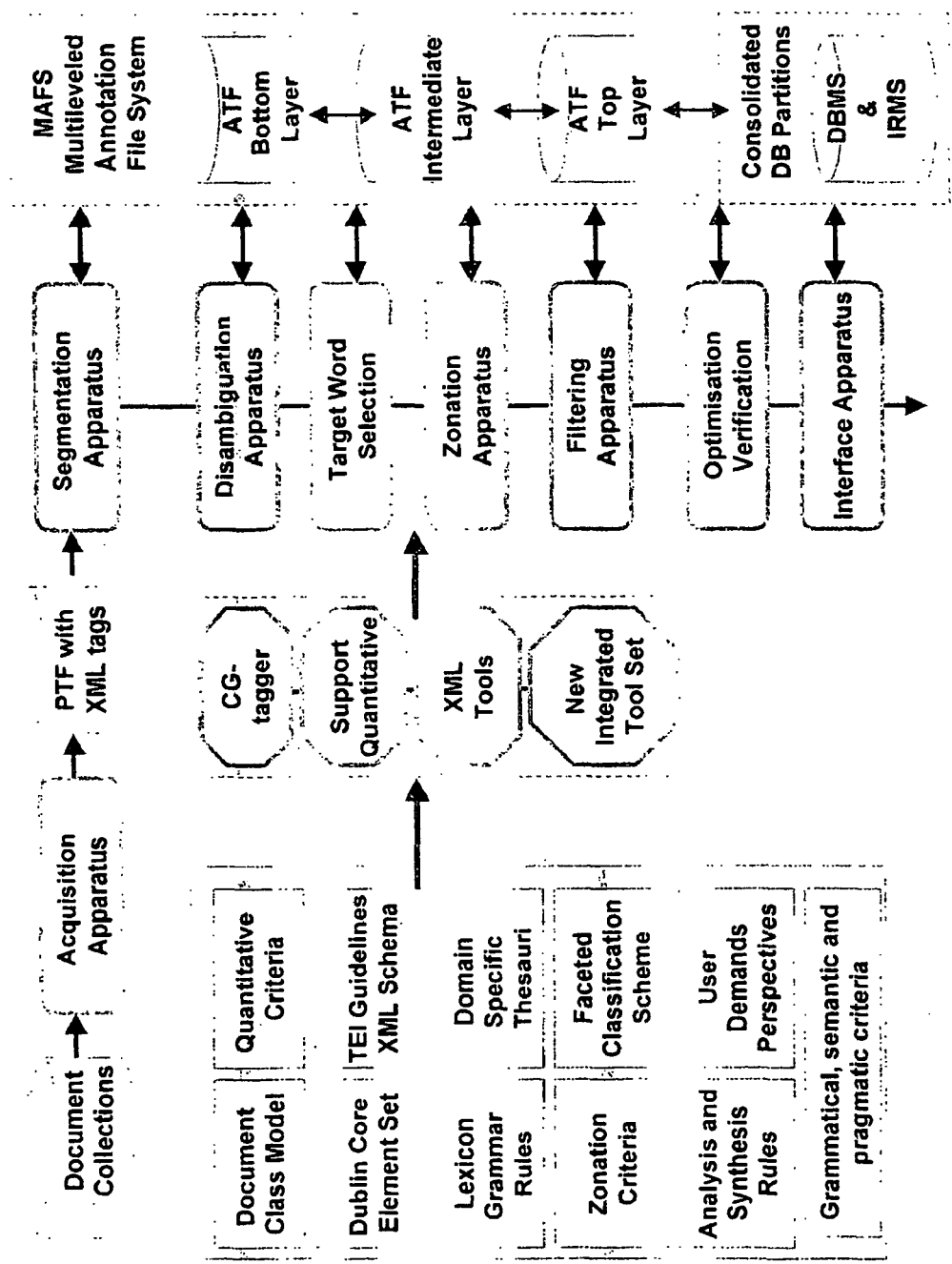
FIG. 1 is a general overview of some of the modules preferably incorporated in a preferred embodiment of the invention.

The Apparatuses According to the Present Invention

The present invention embodies a set of interconnected apparatuses (or modules) that operates on an integrated set of database partitions populated with data transmitted by the devices associated to each apparatus. Search engines known in the prior art are considered as part of the present invention's environment. The set of devices perform a wide spectrum of text processing tasks in order to support the user in her interpretative tasks involving the need for text exploration. The constructed attention structures and representative samples of the text content derived from the underlying texts are presented in an interface preferably denoted as a text sounding board. The text sounding board incorporates a multitude of filtering options and the users' actions are at all times mirrored in the interconnected text pane. The present invention embodies a method and system (apparatus) of interrelated devices (modules) that prepare the texts and make them available for in-depth inspection and analysis.

The text sounding board will preferably consist of a set of special designed windowpanes and according to modern theory within HCI (Human Computer Interaction). The panes present interrelated 'contacts' to the underlying text and the user is given several options for filtering the content presented in the panes and thus filtering the underlying texts from which the contacts to the texts are extracted. The user can explore the text spans displayed in their full textual context in order to better decide between options for exploring and navigating through the text (denoted as options for text traversal)." The following presentation describes the interconnected apparatuses in order of relatedness. That is, the order of presentation does not correspond to the order of processing tasks performed in iterative cycles.

Preferred Interface

The present invention prepares text for textual exploration and preferably presents the results in a special-designed interface preferably denoted as a text sounding board. The panes in the text sounding board reflect the textual features that are captured by the present inventions' apparatuses. The content in the text sounding board informs the user about the features in the text laid out for inspection in the interconnected text pane. The system of panes and options are arranged in five different 'modus operandi'. Each of them provides for advanced tools supporting the user when she is engaged in interpretative tasks and has to figure out what the texts are about, and based on the information presented to her, determine what text zones to investigate thoroughly.

Traditionally in information retrieval systems, query expressions are considered as representing the users' information need. These expressions can take various forms, from simple free text expressions, keywords or NL (natural language) expressions being parsed and transformed into a formal query expression. The user's problem will anyhow be the same—the problem of anticipating what words actually occur in the text and how these words are related to each other—either within sentences, sections or other documental logical object types. The display of KWIC (Key Word In Context) according to one or several search terms in the query expression is often used in order to support the user in her retrieval task. However, it is difficult to grasp the text's flow of content from a KWIC. First of all this is because the KWIC only displays the search terms by physical vicinity. Secondly because the KWIC normally is sorted based on centre words (search term) and words immediate to the left and/or right.

The user (dealing with some sort of problem solving) needs an option for exploring representatives of the text content and have they displayed in their full textual context. The present invention is founded on the principle of text drivenness, in which the content presented in the text sounding board actually do appear in the underlying text prepared for the users' exploration. FIG. 5 outlines a prototypical embodiment of a partition of the preferred interface denoted as 'triple track'.

Modus Operandi' Denotes an Arrangement of Panes in the Interface

The present invention embodies sets of devices that operate on the database partitions in order to construct attention structures that are organised in various layers, preferably denoted as 'modus operandi'. The design of the modus operandi is inspired by theory from ancient rhetoric, specifically Cicero's 'De Oratore I.xxxi'. Each modus operandi preferably supports the activities known from ancient rhetoric as Inventio, Dispositio, Elocitio, Memoria and Actio. The design model based on ancient rhetoric is further elaborated in Aarskog (1999), which is incorporated herein with reference.

The various modus operandi differ in complexity of underlying necessary processing of the database partitions and intermediate files, thus supporting an option for regulating costs involved, and where costs can be balanced against the user communities' need for performance/benefit. Data are captured by procedures that generate results displayed in the text sounding board in which contacts to the underlying texts are made available to the user in order for her to explore the underlying texts and navigate through the texts during interpretative actions. Specifically, the apparatus for modus operandi generates the content of the text sounding board, the interconnections between the various panes in the sounding board, and the links between the contacts and the underlying text displayed in a separate text pane. In particular the device denoted 'triple track' mirrors ordered and interlinked sets of contacts captured by the present invention's apparatuses. By operating the triple track, the user can select or combine interlinked contacts by applying flexible filtering devices, and where the users actions and results produced are displayed as directly linked contact with the text displayed in the text pane. The content of the text sounding board manifests the principle of text drivenness.

Layered Set of Database Partitions

An accommodated DBMS known in the prior art embodies interconnected Database Partitions (due to efficiency). Each Database Partition (DPB) embodies multiple files/tables organised in a multi-levelled file system (MFAS) containing information transmitted from the present inventions' apparatuses and devices, and which is input to the apparatuses for further processing (see FIG. 1). The collection of database partitions are documented in and managed via a higher order DBMS (virtual DBMS layer) denoted as Information Resource Management System, and preferably organised as specified in the ISO standard for IRDS known in the prior art.

The naming convention is as follows: DBP Information Word, the DataBase Partition that contains consolidated information about each word in the pre-processed text prepared for text exploration and navigation. The naming convention applies to all devices in this presentation, the most general term to the left, and specific term towards the right. The naming convention applies to all components in the present inventions' specification model.

The Present Invention's Environment

User communities preferably influence the design and construction of particular applications conforming to the present invention. Search engines known in the prior art are considered as a component in the present invention's environment, and the relations between search engines and the apparatuses for acquisition embodied in the present invention is briefly described.

User Community

Information-intensive organisations understand the importance of high quality document access. Modern organisations are characterised as organisations of knowledge specialists. Organisational information takes the form of documents and documents are the interpretative medium that gives other information meaning within an organisational context. Low quality access to documents 'equals' to low quality access to the organisation's acquired information and knowledge mediated via documents. Recent surveys indicate that executives spend 40% of their time dealing with documents and that for information-intensive organisations, as much as 90% of an organisation's information is contained in documents.

Documents in an Organisational Setting

The overall aim of the present invention is described in general terms in the section 'Field of the Invention'. The concept 'document collection' is used to describe a set of documents organised according to a specific set of criteria, preferably specified by the user community. Preferably, the present invention will focus on 'closed' document collections in that the documents are related to a specific domain or field of interest, i.e. share some features related to situational context. In any organisational setting, document collections may be considered as 'small-scaled' as compared to the notion of 'large' in www environments. Even small document collections or subsets may be conceived as too large for users confronted with them in an organisational setting. The collection and its content exceed the user's futility point.

The present invention is however not restricted to such closed document collections, and can be used as a complementary to Information Retrieval (IR) systems and search engines know in the prior art. Given that it becomes common to deliver well-formed documents appropriately annotated in XML, or a future meta-language, and common to pre-process texts with grammar taggers, the present invention can be applied as a kind of 'on-top-of-technology' as explained in detail below.

Document Landscape

The present invention incorporates a documental classification scheme specifically designed in order to organise and structure the display of text zones in conformity with document classes reflecting the documents' situational context (see also the definitions of the text's inner and outer context). The classification scheme is founded on theory related to how documents may be conceived as positioned according to actor relations (superior, subordinate, equality) and norms. This model is augmented by including a more detailed dimension reflecting norms of regulations and norms of competence, and includes a fine-grained diversification founded on the principle of workflow and actors seen in a sender-receiver perspective, as well as the intended audience. The document model is further elaborated in Aarskog (1999). The Dublin Core Element Set attached to each document is correspondingly augmented with elements used for assigning document class descriptors. In a typical foreseen situation, the user may select a set of texts as current for exploration that originates from different classes. Characteristically, a task requires the user to explore documents as 'virtually co-existing' and 'examine them side-by side': This situation calls for sets of work-related documents to be opened/activated simultaneously. For example, the set of documents comprises one or several laws/directives, one or several reports referencing the laws, inquiry documents, public debates, and so on. In the present invention it is preferred to provide options for visualising the texts' or portions of the texts' origin in a 2-dimensional space (or 3-dimensional) from which the user promptly can comprehend the 'information landscape' surrounding the texts being investigated. The device for visualisation unfolds the hyper textual links between documents and situates the extracted texts in a manner that reflects the texts' outer context, as well as aspects related to the situational context. The device for visualisation operates on the values assigned to each document's Dublin Core Element Set, an in particular the set of elements added in the present invention, and according to the document model described shortly above. In accordance with a system of identifier inheritance and propagation, each text or portion of text being selected by the user can automatically be displayed in a plane in which the coordinates are specified with reference to the documental classification scheme (document model). Icons representing texts or portions of texts in the plane of situational context may be disclosed by programmed techniques known in the prior art.

The interconnections between the texts, or text zones being derived documental logical object types and their documental origin, and thereby the documents' DCES values, provides for immediate information about 'location in documental space'. In the preferred embodiment of the invention, each icon has attached buttons for activating either the DCES values and/or contacts that are current via the triple track in the text sounding board. Likewise, the user can move from the content of the text sounding board and have the current text zones visualised in their plane of outer context, and aspects of the situational context. When the knowledgeable user is given a direct overview of the text zones' locality, she may focus her attention on what text zones to opt for as possibly more useful/important than others. The sections of the plane will make her aware of the text zones' documental origin. The present invention emphasises that information about the texts' context must be available 'at all places' since it is considered as critical for a user confronted with piles of texts unfolded 'side by side'. The principle is based on the concept of 'topos' (locus) in the ancient theory of rhetoric. The devices in the present invention preferably relieve the users from navigational dislocation known as 'lost in hyperspace'.

One particular part of the classification scheme prescribes codes (organised in facets) that signify/express the text zones' superordinate argumentative function. The classification scheme adopted is elaborated in detail in Aarskog (1999). These codes are displayed in a designated pane in the text sounding board. The user can activate these codes and thereby establish contact with a kind of function-advancing information lead 'on top' of the underlying text. Again, this follows the principle of text drivenness and also reflects how the authors' focus of attention moves along lines described in the theory of text linguistics. For example, if the user activates a code 'Problem Indicators', the text sounding board will display the phrases classified as 'problem indicators' in the text, and the phrases from the text classified as such, are accordingly highlighted in the text pane. Additionally, the text sounding board can display the nouns and/or verbs (either at the sentence level or at zone level) neighbouring the 'problem indicators'. Similarly, the 'triple track' (i.e., a special device in the text sounding board that contains an ordered set of contacts structured around the notion of Subject followed-by Verb followed-by Object) will provide for more detailed information about the inner context surrounding 'problem indicators'.

The shift of contacts displayed in the text sounding board, depending on the users' choice of discourse element indicator, is founded on pragmatic reasoning. For example, a list of nouns (with options for display in various types of order and various levels of detail) captured from zones will give the user a first impression of what the text is about. The user can attain a more detailed impression by splitting the nouns into two broad categories—that of nouns in the role as subject and nouns in the role as objects, preferably displayed in the order of appearance in the text. The amount of contacts displayed in the panes embodied in the text sounding board can at all times be regulated in accordance with frequency information and information about density (the distance between word occurrence embodied in intersecting chains). If the user gets aware of how these contacts are related to zones with respect to discourse element indicators, this will affect her reflections about the signals from the text sounding board. For instance, a set of nouns with the syntactical function of subjects and in order of appearance as {gas plant, power cable, environment, government, etc.} may evoke different thoughts if attached to 'problem indicators' than if attached to 'solution indicators'.

User Profile

The database partition User Profile preferably contains registered user activities on the text sounding board. The User Profile is derived from user requests that the user has marked as successful and/or user access log files (with the user's approval). A particular user may have available several User Profiles reflecting various types of tasks.

User Request

Information about the user request (series of moves or actions taken in the text sounding board) are preferably generated when the user explores a text sounding board from which she can select displayed contacts, either individual contacts or combination of contacts. The user may also transmit traditional free-text search expressions and the text sounding board will present information about the terms in the free-text expression provided that the terms match with the text content. When exposed to information about possible matches, the user can start the exploration of how these contacts (referring to word types in the text displayed in the text pane) can be utilised for further filtering. User can also mark sentences in the current text explored and transmit these sentences to a device that generates a set of search operands by manipulating entries in the MAFS that contain information in accordance to the user-selected set of sentences.

User Requests are Divided Into Two Main Forms:

User Request Concept Expression denotes all types of search expressions, for instance in the form of traditional queries, terms selected from displayed lists in the sounding board's panes, or a combination. User Request NL Passage denotes requests where the user inputs a text span (written work in Natural Language) that the user finds noteworthy. See user added text.

User Request Annotated

User Requests in Natural Language (NL) form are annotated with grammatical tags according to the rules underlying grammar taggers known in the prior art. The annotated User Requests are transformed and stored in a representation depending on the identified grammatical patterns in the User Request. The can be activated as input (Search Operand) in filtering options, for instance when generating zone traversal paths (or sentence traversal paths if the text has no or few identified zones). The User Request Annotated may preferably be transformed in order to regulate the order of zone traversal. See 'Zone Traversal Path Adjusted'.

User Request Concept Expression

A User Concept relates to a theme preferred by the user. A concept refers to a word or combination of words. If the concept appears in the text sounding board the user is informed that the concept actually occurs in the current underlying texts prepared for text exploration. The user may restrict the exploration so that the concept (or word(s) referred to) preferably should exist within the same text zone or in adjacent text zones, i.e. and operation connected to the filter 'Zones Proximity'.

User Request Concept Section

The Concept Section in the DBP User Profile stores concepts known to the user and may be activated by the device that generates zone bonds. The Concept Section may be activated when another particular device transmits and presents the content in the text sounding board, either by displaying only contacts (with links to underlying text) that matches user concepts in the Concept Section or by highlighting these contacts in the sounding board. The Concept Section or any part of it can also simply be activated so that all matching word occurrences in the text are highlighted. This device is a kind of 'awareness option', and the user can preferably activate this option for all new documents that enter the system as workflow related to previous documents.

User Request NL Section

The User Request NL Section in the DBP User Profile contains information derived from any kind of Natural Language Requests. The NL Section reflects the user's previous activities. A particular device generates user profile spin-off (activation of filtering options in which 'open operands' capture word types in the user request that matches with respect to grammatical class, etc.) The spin-off is transmitted to the device that generates zone bonds and zone traversal paths. A Zone Traversal Path Adjusted is a modification of the default path based on pre-calculated weights that are adjusted according to information captured from the user request. When activating one of the navigational operators, preferably displayed by comprehensible icons in the text sounding board, the user can navigate or traverse zones in the text matching parts of the spin-off.

The method according to the present invention processes the set of sentences in the User Request NL Passage in the same manner as any text prepared for text exploration. That is, the User Request NL Passage is entered as input to a grammar tagger known in the prior art, and outputs a User Request Annotated.

When a user enters a Natural Language Request, it is assumed by default that the words with particular syntactical functions are more noteworthy for the user. The device that generates user profile spin-off will assign a higher weight to these words and locate zones in which the same word occurrences appear in the same syntactical position. It is important to note that this particular device do not intend to operate as a 'fact-finding system' known in the prior art. The description given in the section 'The principle of text driven attention structures' explains why this type of goal is not an issue in the present invention. The device makes the user aware of zones containing the specific words and restricted according to some subset of grammatical information. However, this does not imply that the present invention suggests that the located zones reflect some kind of sameness in the 'meaning-relationships' between the words in the user request and the text exposed for exploration. The present invention generates attention structures and if the user decides to explore/read the content of the zones it is the user with her insight that determines whether there is a 'meaning-relationship' during her virtually dialogic interaction with the text.

User Added Text

When a user has marked out text portions considered as important for the task, she may wish to insert a commentary (note, memo) and a device stores and manages the users' notes in a separate file. This service of note-management is known in the prior art. In addition to technology known in the prior art, the present invention preferably will give the user an option in which she can mark the zone and export the zone into the current memo. Since each zone inherits properties from the document the text originates from, the activation of a memo with a registered insertion address i.e. the zone, sentence or word identifier, the activation of the memo at a later point in time will invoke the referenced text in the text pane. The notes are treated as 'user-added text' and seen as interwoven with the current text examined by the user. The user-added text inherits a subset of the properties assigned to the current text (sentence identifiers at the insertion point, links to document information, etc) and a set of properties related to the act of adding text (time data, version data, user identifier, etc).

The present invention includes a device that transmits the user-added text back into the line of processing. The users' notes (own and/or others) are then made available for the user to explore in a similar way as the source text and the content of the user-added text is exposed in the text sounding board. This service suits well into the notion of information-intensive organisations of knowledge specialists. The present invention provides for a wide range of access to source text and texts added in line with the users' process of interpretation and composition. At present, screen size complicates the display and visualisation of several source texts and preferably user-added text constituting the 'place of investigation', in which the texts can be opened and compared side by side. This is however a simple technical restriction, and it is expected that two-screen or wide-screen working places will become a customary mode of operation for users spending most of their working time dealing directly with documents (searching, locating, reading, interpreting, and presumably composing new text, etc).

Search Engine

IR-systems and search engines known in the prior art are considered as preferred technology in the present invention's environment. The aim of IR (Information Retrieval) technology is to detect (identify, differentiate, locate, and present) a possible useful subset of a huge document collection. IR-systems typically incorporate advanced procedures for indexing and ranking a subset of a document collection. Ranking is commonly based on degree of similarity between vectors or document surrogates supposed to represent the content of whole documents or parts of documents.

The present invention embodies methods and devices that perform a deeper processing of individual texts selected as potentially relevant by a user. The collection of apparatuses may be conceived as an 'on-top-of-technology'. Users, in a previous information seeking stage, have submitted request to an IR system (for instance via a search engine), have browsed through the set of detected and ranked documents, and selected a subset from the detected set as 'candidate documents' judged to be of potential interest or possibly useful. The apparatus for acquisition can be applied on this user-selected subset of document collection detected by and IR-system and mediated as a digital file (expected to preferably be encoded in XML in the nearest future). As outlined in FIG. 2, the candidate documents are pre-processed by particular devices and thereafter transmitted for further processing in the apparatuses for segmentation, disambiguation, zonation and filtering.

The Concept of 'Relevance'

IR-systems known in the prior art commonly adopt a system's perspective to relevance. The notion of relevance is taken as a technical term referring to degree of similarity between a document vector (the representation of document content) and a query vector. A query vector is supposed to represent the user's information need.

The present invention is based on a more human-oriented perspective. A 'traditional query' represents the user's attempt to verbalise their information need by trying to figure out discriminating terms with respect to all the millions of document vectors accessible via a search engine. In the section 'Field of the Invention' it is proclaimed that the main problem for the user is to express her 'information need' as a request submitted to the search system. The search request is a search expression composed of a set of search terms and search operators. The search expressions are indirect in that the searches are not executed in the text itself, but in index structures that is supposed to represent to the text content (text content surrogates). The search system compares the constellation of terms in the search expression with the system's index terms (document representations or document vectors). Further, it is commonly experienced that the user has no possibility to evaluate her search request with respect to terms available in the index structures. The index terms are 'hidden' in that the user only can perceive fragments (if the system at all offers options for looking into the index system).

The present invention does therefore not consider the concept of 'relevance' in the traditional IR sense. In stead relevance is considered as a relative relation perceived differently by individual users, dependent on type of information need (interest oriented, fact oriented, etc), individual information seeking behaviour, task complexity, level of experience, use of sources, etc. In addition the user's futility point will influence on the user's judgement of relevance, in the present invention preferably paraphrased as usefulness or utility in order to notify a difference between the commonly accepted notion of 'relevance' as a vector similarity indicator (technical system's perspective).

Apparatus for Acquisition

The apparatus or module for document and text acquisition operates on documents detected from www sites or other sources of documents in electronic format. Preferably, the present invention will focus on 'closed' document collections in that the documents are related to a specific domain or field of interest. The present invention is however not limited to such closed document collections.

Figure 2:
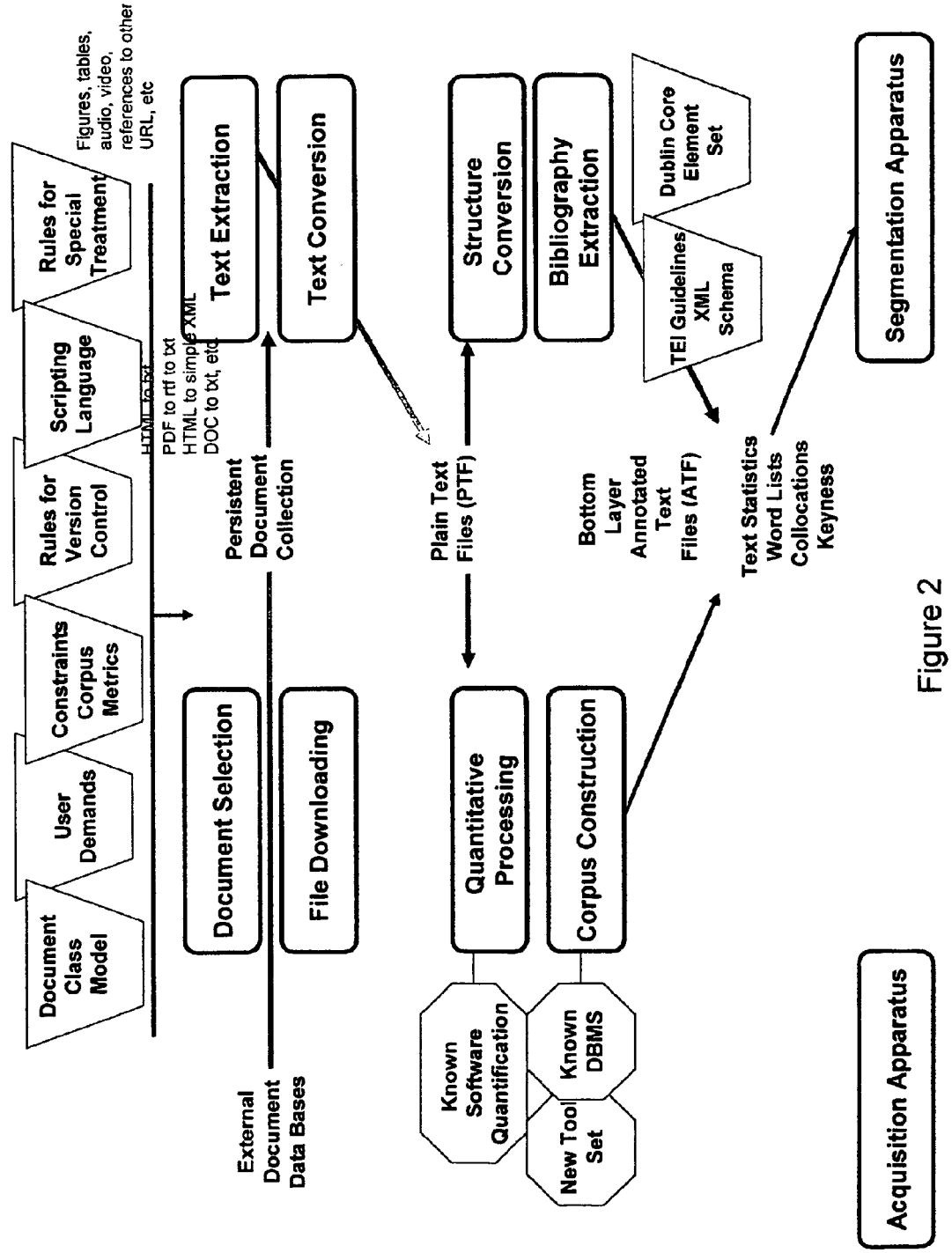
FIG. 2 is a schematic representation of an apparatus for acquisition in accordance with an embodiment of the present invention.

FIG. 2 gives a schematic presentation of an apparatus for acquisition in accordance with the present invention.

The collection of texts is initially retrieved in various formats, and has to be converted to at least one common format. The concept 'document collection' is used to describe a set of documents organised according to a specific set of criteria, preferably specified by the user community. The present invention operates will preferably operate on small document collections, but considered as large to the user confronted with them in an organisational setting. The term 'corpus' usually refers to large heterogeneous document collections, although criteria for organising and managing corpora relate to smaller document collections as well. The discussion about the apparatus for acquisition of documents and texts therefore refers to a general discussion related to the construction of a corpus. A reference corpus with partitions that conform to the present invention's preferred document class model is applied in procedures that calculate genre specific values for keyness and keyness of keyness.

Device Support Document Analysis

Software for quantitative text processing known in the prior art, will be used for exploring frequency and distribution data, and with respect to the words inner context (words within one text) and outer context (words within several texts extracted from documents with shared features referring to the situational context). Frequency and distribution data include: frequency lists, collocations, concordances, consistency checks between word lists referring to various texts, plots displaying the scattering of occurrences, calculating 'keyness' (unusual high frequent words in one document or document segment as compared to a larger corpus), sorting and filtering words and clusters, calculating statistics, exporting filtered word lists, etc. The output in the form of frequency and distribution data, i.e. collocations, concordances, plots, etc, are utilised to support the construction of domain-specific thesauri. A particular device will combine traditional collocations with grammatical information, specifically the words' grammatical class. The device uncovers patterns that give information about each content word, and preferably constrained with reference to frequency data. The combined collocations show, for each content word in the texts extracted from a document, how often this particular content word co-occurs with another content word within a specified number of positions part from each other. The concept 'content word' normally refers to the four main grammatical word classes (open-class parts of speech), i.e., nouns, adjectives, verbs, and adverbs.

Document Candidates

Document Candidates are the documents returned in a list (possibly ranked) from the application of one or several search engines. It is firmly stated that the present invention is not related to what is subsumed under the concept of Information Retrieval systems (IR). IR systems and search engines are preferably considered as components in the environment of the present invention (technical artefacts designed and constructed outside the present invention).

The present invention assumes documents detected by an IR system, or an already existing document collection within an organisational setting.

The candidates are analysed by one or several devices performing analysis at the document level. For instance the device for keyness calculation may operate on the document candidates as detected by a previous IR operation. The selected set of documents originally detected by an external search engine, are transmitted to a convenient DBMS for persistent storage under the assumption that authority is given.

Document Format

There are a great variety of formats (multiformity), and each format requires special treatment. The source texts (doc, rtf, html, SGML, XML, txt, pdf) have to be converted to at least one common format (input to the grammar tagging being the essential part of the disambiguation process (described below).

Multiformity in source texts and source texts with low quality may result in a time-consuming format conversion process. For instance, highly formatted texts have words superimposed on background images, words are running in 'hidden' columns or tables, the texts are frequently interrupted by illustrations, misspellings, hyphenation, tabulator marks, single line breaks between paragraphs, missing punctuation marks, abbreviations, etc. There are standards for document structure but not for the authors' writing behaviour. This accounts for a mixed tool-set supporting the conversion processes. The domain specific collection must take two forms due to the software to be applied and new special purpose software that is constructed. A Plain Text Corpus (PTC) contains plain text files, and an Annotated Text Corpus (ATC) contains the same set of text with annotations. A device for text transformation produces the various formats.

Document Candidates Analysed

This denotes the set of documents returned from a device that performs automatic or semi-automatic quantitative text processing and analysis. This set of documents may be further reduced based on a prescribed set of more detailed selection criteria.

Document Collection

The document collection will include texts that already exist in electronic format. Data can be acquired by scanning printed material (requires good print and paper) and converted into electronic format. The process is error-prone and expensive and will be performed only when needed to meet the users' coverage criteria. Files in pdf (printed document format) pose another type of problems. If spoken material is to be included, these files will not be converted through a transcription process. The files will be described in an attached Dublin Core record and if convenient, linked to segments in the written material.

The document collection or part of a document collection (sub-collection) is stored as persistent in a web-accessible system managed by a DBMS known in the prior art. Each document has preferably attached a Dublin Core Element Set, which include a unique identifier.

The pre-processing steps include format conversion and the partitioning of documents into sentences (and some other types of syntactical/lexical units) and indexing of the whole corpus. A complete full-text index of the whole corpus makes it possible to perform statistical analysis tasks. The software WordSmith or Document Explorer can preferably be used for these types of tasks.

When a document collection is constructed using electronic documents, the documents need to be saved in their original format. This is necessary for several reasons. The original format often contains useful information, which must be extracted into the metadata descriptions (e.g. the headers of html documents may contain information about author, keywords, the production date, language versions, format versions, etc.). This type of information will be extracted and assigned to fields in the Dublin Core element set (DC).

Version data is necessary for two main reasons:
   Used in order to measure progress and statistics (how many files in the various formats etc)
   Used in order to know which tools to use in subsequent processing (transformation to plain text, part-of-speech tagging, etc).

Device Keyness Calculation

Software known in the prior art computes each document's keyness (words with unusual high frequency as compared with a corpus). The words with highest keyness, above a threshold value, are filtered to include only nouns and posted in the element Keywords in the Dublin Core Set. Keyness values are used for documentation, that is, a part of the metadata managed in the Information Resource Management System (IRMS). IRMS is realised in DBMS software known in the prior art. The corpus used in the keyness calculation is constructed specifically for the purpose, and along dimensions following the document model. The corpus construction is seen as an activity related to the apparatus for acquisition of documents assembled to form the domain specific document collection on which the present invention is to operate, including the extraction of texts from documents classified according to the document model.

Device Support Corpus Construction

Information-based organisations normally have their own 'in-house' document collections, and regularly incorporate information judged as useful from external sources. These external sources will preferably be detected and retrieved by search engines known in the prior art. The information retrieval system's architecture that these search engines operate on, often cause a failure of discrimination by delivering a result list of potential useful documents that exceeds the user's futility point. The device for keyness calculation requires a device that supports the construction of a reference corpus conforming to certain criteria for coverage (genre, actuality, etc.). The present invention applies various software tools known in the prior art, which support the construction process. Particular programs provide interconnections between various software tools in order to ease the transmission of output from one particular device to another. These programmed connections customise the software tools according to the needed processing tasks.

The acquisition of data involves the use of general-purpose software known in the prior art. Document Explorer and WordSmith are both systems used for quantitative processing large text collections and can operate on text collections constituting millions of running words. Document Explorer accepts texts annotated with structural information (documental logical object types as title, header, paragraphs, sentence, etc) and grammatical information, that is Part-Of-Speech tags (POS) and Constraint Grammar tags (CG tags). WordSmith, and preferably Document Explorer can thus be used as general-purpose software in order to construct traditional concordance output as for instance a KWIC concordance. Document Explorer and WordSmith can also generate lists of collocates and produce a wide range of frequency and distribution data for various parameters. A particular device is constructed in order for the general-purpose software to handle grammatical information and intersect this information with distribution data. In particular, 'combined collocations' are transmitted to devices embodied in the present invention, which activate procedures for the identification of new words or word constellations conforming to simple grammar patterns.

DBP Information Reference Corpus

The accommodated device supporting corpus construction focus on the quality of the texts collected. To ensure quality, a particular database partition (DBP) includes various types of information about the texts. Examples are document source, collection date, person responsible for collecting it, language, copyright status, dissemination license (permission is obtained, permission denied or restricted), format information, version information, and so on. These records are preferably stored and managed in a web-based database application, each record giving access to an URL and the document stored as persistent in a web-accessible system (DBP Information Reference Corpus.

The reference corpus can be dynamic and open-ended or the size may be known from the outset, or at least there is an estimated size of the corpus. When the size of the corpus is known in advance, this indicates a target to be reached and marking the end of a data collection phase. If the collection is to be open-ended, the positioning of documents must be based on a specified set of criteria that accommodate the defined document class model embodied in the present invention.

Users within a user community will have different views about the categories and subcategories of the texts that are assembled in a document collection. However such views are often stated in very general terms, mentioning document types, organisations, events, particular years, etc. Therefore, the first step is to get the user community to formulate their needs for data in explicit terms. Thereafter decide what type of data are to be included in the document collection and in what proportions. The document class model allows for adjustments conforming to user requirements. The reference corpus applied in the calculation of 'keyness' and 'keyness keyness' values must be adjusted to reflect the details of the revised document class model.

DBP Information Frequency

Frequency information underlies the processing at all levels (word, sentence, zone, text, text collection).

The present invention applies the widely known inverse document frequency adapted form information retrieval literature. This technique calculates the relative frequency of words in an item (sentence, zone, text) compared with the word's relative frequency in a set of other items. The devices in the present invention also operates intratextually, it is therefore of interest to calculate for instance a word's relative frequency in a zone as compared to the word's relative frequency in the whole text or a collection of domain-related text. The background collection of items must be adjusted in terms of genres in each case based on the filtering purpose or need for discrimination between word types. The technique supports the process of identifying so-called focused words and may be restricted along a variety of dimensions as described in a set of underlying criteria for text zonation.

Device Support Document Classification

The present invention includes a method and system for organising documents with reference to a model describing document classes. The document model and document instances assigned to the system of classes provides for a multidimensional representation of the document set. This multidimensionality in links between documents will preferably be transmitted to a device for visualisation of texts extracted from documents, and thereby directly give the user insight to aspects related to the texts outer context, and aspects related to the situational context.

The document model is primarily reflecting issues from juridical theory and traditional classification theory, and additionally incorporates the dimension central and peripheral with respect to for instance organisational or procedural matters. The document model thus supports the definition of hyper textual links between text zones or text segments extracted from different documents (authority and norm space model). The model's generality at the highest abstraction level, it adapts easily to document collections of interest to various user communities related to particular domains (social, cultural, law, business, etc.).

Document Class Model

The document class model is primarily reflecting issues from juridical theory and traditional classification theory, and additionally incorporates the dimension central and peripheral with respect to for instance organisational or procedural matters. The document model thus supports the definition of hyper textual links between text zones or text segments extracted from different documents (authority and norm space model). The model's generality at the highest abstraction level, it adapts easily to document collections of interest to various user communities related to particular domains (social, cultural, law, business, etc.).

The classification criteria are based on two dimensions describing the relations between actors participating in the interaction/communication. One of the dimensions tells whether the relation between actors is superior or subordinate or whether the actors are to be considered as equal. The other dimension tells something about the norms influencing the relations between actors. The norms are demarcated towards norms of competencies. Norms of competencies are divided into two subclasses denoted as legal authority and other forms of authority. The latter includes authority experiences through social norms, authority delegated through a decision and with a limited duration, norms in the form of regulations, standards or other types of qualification norms. The cross points between these dimensions yields four broad document classes which may be further divided into subclasses, for instance according to more traditional criteria describing document types (law, regulation, report, etc). The four broad document classes (each class with subclasses) will support the need for restricting the search span. Information about document classes will therefore preferably be included in one of the panes in the text sounding board. Most retrieval systems offer the option for restricting search spans by selecting database partitions. The classification criteria underlying the document classes according to the present invention are however different with respect to the features of the situational context that is taken into account. The underlying criteria are derived from juridical theory and traditional classification theory. The document classes will also support the definition of hyper textual links between text zones extracted from different documents. For instance, text zones extracted from Debate documents (e.g. newspaper), may in some way be related to utterances in the Negotiation documents (e.g. discussions in ministries) and further on in Normative Regulations (e.g. laws, directives, regulations). The text zones are preferably to be connected in a hypertext system, that is, predefined links between selected (extracted) text zones (the links are considered as conceptual pathways through the text base). Most preferably a knowledgeable user will be able to construct their own hyper textual structures superimposed on the text zones they found noteworthy and by this operation the hypertext will yield a kind of 'user view'.

Document Class Normative Regulation

This class covers all types of normative regulations, that is all types of formal, approved norms such as laws, regulations, directions, rules, etc. regulating the enterprise and activities within an institution. The DCES for this class of documents will include information about legal authority and actors mentioned in the normative document, preferably displayed with superior/subordinate relations.

Document Class Competence

This class covers all types of normative regulations, that is all types of formal, approved norms such as laws, regulations, directions, rules, etc. regulating the enterprise and activities within an institution. The DCES for this class of documents will include information about legal authority and actors mentioned in the normative document, preferably displayed with superior/subordinate relations.

Document Class Debate

The class refers to all types of viewpoints expressed in various types of channels for debates such as speeches, comments/chronicles in all types of media, including news reports, interviews, etc. All types of authority may be involved, and all types of social norms, and where there are equality relations between actors due to the channel used for mediating opinions.

Document Class Negotiation

The class covers all documents related to affairs dealt with in an administrative agency or other institution, etc. Often a legal authority is involved while the sender and receiver relations reflect actors with equality relations.

Document Relation

The present invention also provides a method for providing a documental link structure. The link structure is based on a authority and juridical norm space model in which documents are organised with respect to factors defined by the documents situational context and adjusted according to the requirements in user community. The multidimensional representation of the document set is founded on a model describing document classes, each class with subclasses according to the documents' status (production date, producer's authority, etc.). At the highest abstraction level, there are four broad classes described in the section 'Document Class Model'.

The concept behind the link structures established is that the user should be able to identify easily the documents that are most likely to be relevant with respect to current information needs. The link structures are presented to the user as a graphic image with each class, subclass and document represented by an icon. The user can 'open' the icons for more information about the documents and this information is also organised in several abstraction layers. At the upper level the user can explore document class information, at the next level the user can explore information encoded in the Dublin Core element set, and on the most detailed level the user can explore the documents through the basic triplet structure. The user is given control over the display of layers and can easily navigate through the document collection. By incorporating the dimension central and peripheral with respect to for instance organisational or procedural matters, the link structures are realised as multidimensional. For instance, a group of peripheral documents within one class may be linked to a central document within the same class, and central documents can be linked to each other within the same class or across several classes (hierarchically or in networks).

The document class scheme will be used when deciding what type of texts to include in each class/subclass and in what proportion (topicality, coverage, etc.). The decision on a strategy for the size of the document collection and composition can vary across these broad document classes. For instance, it may be convenient to decide on a rather closed strategy for the Normative Regulations, and a more open-ended or mixed strategy for the other three classes. The users must provide for the selection criteria.

The present invention comprises two broad classes of association types, i.e. document level association types and zone level association types, and described in more detail in the table 1 below. Document Level Association Types are links between units that are whole documents. The content of the text sounding board at this level will be information extracted from the Dublin Core Element set.

These association types reflect aspects of the document's situational context and as prescribed in the document class model.

Zone Level Association Types, preferably including icons referring to identified indicators for discourse elements. Bu activating the icon the text sounding board will preferably display the words and phrases classified as discourse element indicators. Similarly, a preferred icon represents the Dublin Core Element Set, which is attached to all textual units extracted from a document.

TABLE 1

Document Level Association Types

| | |
|---|---|
| 1 | Between Central Documents, same Event or Time Span |
| 2 | Between Central Documents, different Events or Time Spans |
| 3 | Between Central and Peripheral Documents, same Event or Time Span |
| 4 | Between Central and Peripheral Documents, different Events or Time Spans |
| 5 | Between Peripheral Documents, same Event or Time Span |
| 6 | Between Peripheral Documents, different Events or Time Spans |

Zone Level Association Types

| | |
|---|---|
| 7 | Between Zones within Central Document |
| 8 | Between Zones across Central Documents, same Event or Time Span |
| 9 | Between Zones across Central Documents, different Events or Time Spans |
| 10 | Between Zones across Central and Peripheral Documents, same Event or Time Span |
| 11 | Between Zones across Central and Peripheral Documents, different Events or Time Spans |
| 12 | Between Zones across Peripheral Documents, same Event or Time Span |
| 13 | Between Zones across Peripheral Documents, different Events or Time Spans |

DCES Dublin Core Element Set

The device for identifying and registering information about the documents' structure extracts bibliographic data, and preferably from a Dublin Core Element Set which is a component in the file 'Information Document Structure.'

Minimum: Dublin Core Element Set (DCES) includes 15 DC standard elements (top level) and user community elements subsumed in one DC element. The present invention incorporates new elements needed for the purpose of other devices in the present invention, and these new elements are subsumed under DC.

The extraction or production of a DCE Set requires a tool set for metadata assignment and management. The file containing information about document structures should ideally incorporate a metadata section (new segment encoded in document, XML DC) adapting the general scheme Dublin Core. Dublin Core is a structure known in the prior art, and is flexible without being to complex and so versatile that any document can be described with it. Authors can also easily provide metadata by themselves. Dublin Core is considered as a sort of 'lowest common denominator'. The preferred device must collect and record metadata about documents—including results from text processing (calculations of frequency, keyness, etc) represent the connections between text files (stored in corpus) and generate reports on metadata assignments (corpus resource reports).

DC elements may provide contacts (codes) to some of the facets in the classification scheme: [cat1 fac1 Sender], [cat1 fac2 Receiver] and [cat2 fac2.5 Time Utterance (Logical Now)].

DCE Relation

The Dublin Core Element Set includes the Element Relation that gives information about relations or references to other documents. Besides, within the text, there may also be references to other documents. If the documents are denoted by 'reserved names' (as in laws), and a limited set of spelling variants, these document relations can be identified and represented automatically. In order to identify cue phrases (signals in the form of words), it is necessary to use a Target Word Selection Procedure operating against a thesauri entry for 'document synonyms or near-synonyms'. (document={report, appendix, paper, book, article}.

Information about Document Relations is used in order to generate hyper textual links (inter-documental links).

Information about co-references may also be used to position documents in a documental space (central and peripheral documents in a Semantic-Pragmatic Distance Distribution Model), which may be adjusted according to users' preference.

The document class model includes a description of how the dimensions of this model preferably will be utilised in order to display text zones, preferably selected by the user, in an authority norm space model.

Apparatus for Segmentation

The concept of text segmentation in the present invention denotes the set of procedures that recognises structural elements depending on the format of the ATF (Annotated Text File). Text segmentation concerns structural properties while text zoning concerns thematic properties.

Figure 3:
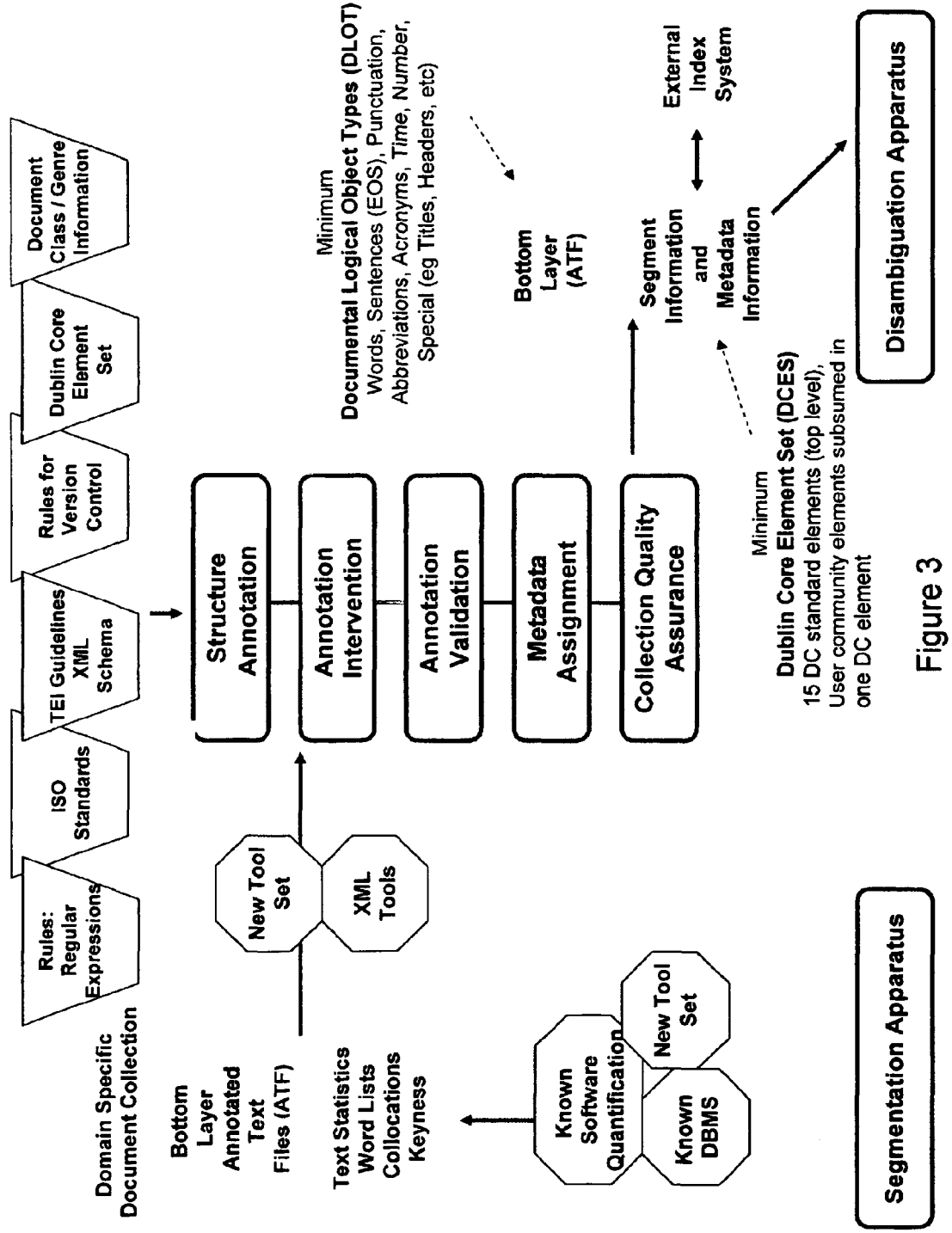
FIG. 3 shows a schematic representation of an apparatus for segmentation in accordance with the present invention.

FIG. 3 gives a schematic presentation of an apparatus for segmentation in accordance with the present invention. The apparatus embodies devices that deal with techniques for constructing files enriched with tags describing the documents' logical structure. The segmentation process also includes metadata assignment, and a preferred embodiment of the invention applies the Dublin Core Metadata Element Set.

The present invention does not provide an unsupervised separate procedure for additional XML-coding (for instance according to TEI or XML-Schema). Structural encoding of texts is considered as an affair outside the present invention. The present invention is based on a general expectation that most software for the production of documents will offer options for XML-transformations in the near future.

XML is a proper format in that XML ensures that each text contains self-describing information. The information encoded in the tag system can be extracted, manipulated and formatted to various requirements (user requirements or requirements of target software) and text can be queried and displayed by using both free software tools XML and special constructed advanced XML-based tools. The advantages of XML are well known. In summary, XML offers a high degree of flexibility regarding the specification, tuning and optimisation of search selectivity and search functionality. XML-documents (TEI or XML-Schema) support data independence and the possibility to define user views similar to those in traditional DBMS. With external files added, it is possible to manage overlapping and discontinuous constituents via the intermediate layer in MAFS.

The device for text extraction operates on documents and extracts the documental logical object type (DLOT), in which text is one of them. Further it translates the text objects into a stream of contiguous units (also DLOT)—sentences and words. If the document is encoded in XML-format, the procedure extracts the text with the tags preserved. Some of the filtering options assumes at least XML-tags for very common DLOTs as titles, headers, paragraphs, lists, references, and so on (at a minimum these filtering options require a well-formed XML-document).

The basic elements—sentences and words—are encoded with XML-tags as a data wrapper during transfer of the text between various devices that support a consistent format treatment. A 'minimal XML-encoding' ensures that the same set of transformation scripts can be applied to parts of the collected source texts in one run (without additional tuning).

The device that identifies the documents' structure preferably includes procedures for unsupervised minimal encoding of DLOTs, and also offers options for manual intervention/ validation (annotation-editing mode) in order to ensure the quality of the document collection. (See corpus quality). This unit also provides facilities for the system designer interested in customising the tags and/or the attributes associated with each tag. The present invention stores and manages annotated files organised in layers (abstraction levels). The annotated files (with version control) support more advanced applications (presupposing additional analysis and encoding) and the support for not yet foreseen types of information needs.

Device Document Structure Identification

This device generates document structure information and the process depends on Document Format (plain text or document structured with a mark-up language such as XML, html, or others).

The Document Structure Identification Device receives a document as input, determines the meta-language (e.g. XML) which sets the condition for the automatic identification of Document Logical Object Types (DLOT). These techniques are known in the prior art.

The Document Structure Identification Device extracts the documents Dublin Core Element Set (DCE Set), or equivalents, and stores this information in a separate register (together with the Document Identifier).

Document

A document is considered as a container of several object types (Document Logical Object Types abbreviated DLOT). The present invention approves a wide definition of documents as including all known types of data that can be mediated electronically.

Documents embody a hierarchy of parts consisting of: fixed attributes such as author, date, keywords, and one or several DLOT. Text is a DLOT, which is a natural language text section.

XML is used to represent both the fixed attributes and the DLOTs. The Dublin Core Element Set (DCES) is the template used for representing fixed attributes extracted from the document header (possibly hidden in the html tags). A simple XML Schema is used in order to represent the text structure (a hierarchy of parts).

Both the DCES and XML Schema instances are surrogates, representing the document (container) and the text (DLOT within the container) respectively.

Identifier Document

Identifier supervision is important. The problem with document overlap is constantly reported as a cause of failure in text processing systems.

A certain document collection produced as a result to one user request may contain documents already delivered as a response to an earlier request (from the same or a different User/Customer). Each document extracted from a collection for further pre-processing has therefore assigned two identifiers—an internal identifier (date+serial number or time stamp) and an external identifier (preferably extracted from the original document header). The external identifier, possibly together with information about site (www location), a value stored in DCES, makes it easy to identify document overlaps in a particular document collection.

Identifier Document External

Each document has assigned an external identifier. This is for instance the identifier assigned to the document by the document producer and will preferably be automatically extracted and represented in the document's DCES. In this case the Identifier Document External is the same as the Identifier Dublin Core.

Identifier Document Internal

An internal identifier is assigned to each document and is inherited by all objects that relate to the document. That is, all objects derived extracted from the document or derived as a result from processing the document. Thus text, DCES, picture, table or what ever documental logical object type, has assigned the Identifier Document Internal (via key propagation in the MAFS).

DLOT Document Logical Object Type

Text format (plain text or text marked up with XML or the like) determines the automatic identification of DLOT. Sentences are the most essential DLOT to the present invention. The remainder of this specification therefore focuses on text and sentences as the main textual object type (text constituent).

DLOT Text

The present invention operates on texts extracted from documents preferably from a domain specific document collection. Text is one of the Document Logical Object Types, and in the MAFS the file containing information about the text units 'wraps' the files containing information about the sentences in each particular text. The file connections are established via traditional key propagation.

Identifier Text

If the text extracted from one document is one unit, the text identifier equals the document identifier prefixed with 'txt'. If the text is divided into subtexts, the identifier is extended with a serial number. For instance, if a report is divided into one subtext for each chapter (determination condition is chapter header), the text identifier is <document ID+txt+serial number>.

All text files transformed or pre-processed by the Text Transformation Device inherit the Text Identifier.

DBP Information Document Structure

The device for the identification of document structure analyses input document encoded with determination conditions of document elements and separates the document elements into two main descriptive parts:

1) A description of the document contained in the Document Dublin Core Element Set (DCE Set) (container information).
2) A description of the logical objects in the document (DLOT) from which the text, being a part of the author-focused information, is extracted (content information)

The object type text is transmitted to the CG Parser for analysis.

CG Parsers normally recognises sentences (part-of text) and words (part-of sentence). In addition it is preferred to have a minimal set of sentence descriptors such as Title, Header, etc DBP Information Sentence Sentences are the main logical object types DLOT) processed by the present invention. The Device Sentence Extraction fills a file in MAFS with information extracted from the set of annotated sentences. The file 'Information Sentence' is populated with output from several devices performing various text processing tasks.

The main table has one entry for each sentence identifier (Identifier Sentence).

In the database, different types of information about each sentence and the set of sentences (intratextual and intertextual) are consolidated over the Identifier Sentence (normal key propagation).

The database containing Information about Sentences is divided into several interlinked tables (the tables may be considered as stored views, either temporary stored or stored as permanent tables used in further processing). The approach is thus traditional DB processing known in the prior art.

DBP Information Sentence Occurrence

Each occurrence of the DLOT Sentence has attached a series of Attribute Types describing the sentence occurrence. In the specification document these are denoted as SATOT, Attribute Types attached to the Object Type Sentence DBP Information Word The DBPs containing information about the words that are registered as important for the construction of attention structures, including the construction of content displayed in the text sounding board, which is populated by several devices.

The information about each word in a sentence includes at minimum {Word Identifier, Word lemma, Word Position Relative within the sentence, (part of the Word Identifier), {Word Grammatical Information}, {Word associations to other files}}.

The Word Information is processed in a device for word frequency calculation and a device that produces combined collocations. The Word Information for each sentence is used when calculating the similarity between all pairs of sentences in a text. Word Information <is part of> Sentence Information, which in turn <is input to > the Device Zone Identification.

The similarity calculations can be tuned to identify spans of sentence repetition. This type of repetition occurs frequently in longer reports (a signal indicating that the author judges the sentences as important). This type of author-focused information can be used as one of the criteria when reducing the set of Lexical Chains (used as input when calculating Zone Density and Zone Weight).

A word is a token. There are other types of tokens such as abbreviations, dates, numbers, etc.). These token types may preferably have attached an extra set of attribute types not necessary in the main word information file.

Frequency Word Level

Each word occurrence has assigned its own identifier (Sentence ID+word's relative position within sentence). The frequency information is used when calculating the distribution of the lexical chains and when calculating the density of each chain within each text zone.

Device Text Extraction

The documents in a pre-selected, preferably domain specific, document collection are processed by a device for text extraction in which the textual elements are extracted, and assigned a serial tag, DLOT Serial Tag. The device is interconnected to a separate device that recognises sentences and assigns an identifier to each sentence extracted from the document. A series of sentence identifiers will form a text span that may occur in between other documental logical object types (DLOT) such as tables, figures, audio, video, etc. The aggregates of sentences or text spans are consolidated into a single text file. The DLOT serial tags are input in a device that reconstructs the document (reincorporating other DLOTS in between the identified text spans).

The device is included in the present invention in order for the invention not to be dependent on an explicit encoding of documental logical object types such as Text (Paragraph, Header (all levels), Sentence). In practice this means that if a document is not encoded in XML (or another structure description language such as SGML, HTML, etc), the device for text extraction simply extracts sentences (recognised as textual elements) as parts of text, and equips each sentence with an identifier (Identifier Sentence). The sets of sentence identifiers are used as entry points to information about each sentence occurrence (Information Sentence).

The text extracted from one document may also be divided into subtexts (interlinked subtexts that are not consolidated into a single text file). One possible determination condition for subtexts is sentence descriptors such as Chapter Title or Header. The device for text extraction will also preferably split larger texts into subtexts. For instance, it may be advantageous to split chapters in a report to separate text files.

Other object types in the document are ignored, however these objects (tables, figures, video, etc) are also equipped with a serial tag in order to make it easier to reconstruct the original document structure in the display procedures furnishing the text pane. It is mentioned that text is an interpretative medium that gives tables of data, figures, etc. knowledgeable 'meaning' in an organisational context. For this reason, it is important to also display the objects referred to in the text.

It the document is properly encoded and conforming to an XML-schema, the text extraction device will preferably be replaced by software delivered from XML aware software firms. Alternatively the present devise will be adjusted to just equip each recognised DLOT with a serial tag applied in later reconstruction, and extract those DLOTs marked with XML-tags recognised as signifying textual objects.

Device Sentence Extraction

This is a special-purpose Text Extraction Device encompassing all operations for the automatic extraction of pre-specified sorts of information based on the annotated sentences in a text. In order to distinguish this device from other extraction devices, the present invention refers to the name 'Sentence Extraction' since sentences are the main Document Logical Object Type to be further processed by other interconnected devices.

Sentence Descriptor

Sentence Descriptor contains information about sentence types in text. The number of information items for each sentence varies.

The device for Document Structure Identification identifies whether or not a DLOT is a header or something corresponding to a header. If the document contains no mark-up, the text is simply extracted and sentences are used as the single unit for further processing. If titles and headers are enriched with grammatical tags, these may provide contacts (codes) to the category [cat4 fac0 Subject Matter Complex].

Device Text Transformation

The device for text transformation receives the collection of text objects (Text <is a> DLOT) extracted from documents.

These text objects may occur in various formats (multiformity). The device for text transformation converts all text objects into at least one common format. The present invention has chosen Plain Text Format (PTF) since this format is acceptable in most tools used for quantitative processing. In order to produce as reliable text statistics (text metrics) as possible, all files must exist in one common format, and the files must be checked and cleaned for all known 'junk types'.

The text objects very often contain different types of 'junk', as for instance 'tag junk' or 'typesetting junk' and so on. Information about junk (trash) and routines used to clean the text objects are stored in a documentation system (IRMS). The file 'Information Junk' keeps record of all junk types encountered and the documentation system refers to procedures applied to deal with the specific junk types.

If the DLOT Text is extracted from files annotated in XML, the Text Transformation Device will preferably validate the files according to an XML Schema (well-formed) and store the result as a Text File XML.

A DLOT Text that is not annotated with XML will preferably be transformed to a simple XML version (depending on the format of the input document). In this case the present invention applies a simple XML Schema annotating sentences (assigning a Identifier Sentence). The Identifier Sentence in a Text File XML has to be matched against the Identifier Sentence Set in the versions Text File Plain (PTF).

The Identifier Sentence (aggregated into Text Spans for documents containing other object types) is input to a special-designed scheme for conserving and converting objects (DLOT) in the source documents logical structure (the XML Schema derived during the processing in the device for text extraction.

MAFS Multileveled Annotation File System

The different apparatus includes sets of procedures and devices that are tuned according to what object type they operate on and according to specific features (attribute types) attached to each object type. The procedures and devices operate on the various files stored in the MAFS and combine extracted and derived information with information delivered by other procedures. The combined or derived information is transmitted back into the files stored in MAFS.

MAFS is a file system, which conceptually may be considered as organised in interlinked levels or layers. The MAFS are managed by a DBMS of the prior art. In addition to the DBMS application that is constructed in the present invention, there is a superordinate layer denoted as an IRMS (Information Resource Management System) which includes and manages all sorts of documentation as related to MAFS, apparatuses, user communities, etc.

MAFS allows for advanced filtering options such as realised in grammar based request patterns, proximity searching, collocations and limited according to the words' grammatical class or form, semantic query expansion, locating items within text zones (a derived documental logical object type); within zones with a certain density, and so on. Each filtering option is realised by combining simple instructions applied recursively and where the intermediate results are stored in separate files in MAFS.

A storage and management of annotations organised in layers (abstraction levels) supports data independence and the possibility to define views similar to those in traditional database management systems (including a metadata layer representing the connections between file elements in the various layers).

The need for representing overlapping and discontinuous constituents indicate that a supplementary option is to store and manage these tags in separate external files. Efficiency requirements indicate the embedded option with the files residing in an XML-aware document management system. The proposed system will embody both options with files stored and managed in layers (a multileveled annotated file system, abbreviated as MAFS).

The different apparatus includes sets of procedures and devices that are tuned according to what object type they operate on and according to specific features (attribute types) attached to each object type. The various devices embodied in the present invention operate on the various files stored in the MAFS and combine extracted and derived information with information delivered by other procedures. The combined or derived information is transmitted back into the files stored in MAFS.

MAFS is a file system, which conceptually may be considered as organised in interlinked levels or layers. The MAFS are managed by a DBMS of the prior art. In addition to the DBMS application that is constructed in the present invention, there is a superordinate layer denoted as an IRMS (Information Resource Management System) which includes and manages all sorts of documentation as related to MAFS, apparatuses, user communities, etc.

MAFS allows for advanced filtering options such as realised in grammar based request patterns, proximity searching, collocations and limited according to the words' grammatical class or form, semantic query expansion, locating items within text zones (a derived documental logical object type), within zones with a certain density, and so on. Each filtering option is realised by combining simple instructions applied recursively and where the intermediate results are stored in separate files in MAFS.

The layers defined in the MAFS provide the application designer with a high degree of flexibility regarding the specification, tuning and optimisation of search selectivity and accordingly the construction of attention structures, including the content of the text sounding board. From the bottom layer, the designer (based on user community requirements) can extract a subset of the annotations and store these in an intermediate layer. (The bottom layer constitutes the file system with all tags except tags assigned to same text spans or part of text spans marking overlapping or discontinuous constituents, and tags marking hypertext anchors).

A special purpose device (designer's tool) will provide facilities for the system designer interested in customising the tags and/or the attributes associated with each tag. The designer will be given options for selecting, accepting, ignoring, restricting, editing (for instance renaming) existing annotations within a working space (buffer) and store their final selections as an annotation perspective. The intermediate layer is in fact a stored set of files reflecting different perspectives on the underlying text. The system structure has some resemblance with the 'view option' or 'sub-schema option' in traditional database management systems. When information about hyper textual links between text segments is stored and managed in external files, the link type is added to the search operand set providing the retrieval of pairs of text segments (or bundles of text segments depending on the link type's cardinality). Pragmatic-semantic link types used as search operand (for instance <problem has solution>, <more details in>, <agreement between>, <argues against>, etc.) will retrieve text segments reflecting deeper semantic relations than what is included in each of the text segments in isolation. The intermediate and top layers will be dynamically generated (for each text base expansion or changes in user requirements). Therefore new files with annotations may be added upon 'older files' thus these layers will support future applications (not foreseen types of information needs). In the automatic mode, the texts are annotated (structure and grammar) without manual intervention. If the automatic tools result in ambiguities, these may be corrected by manual intervention by entering an annotation-editing mode (increasing corpus quality). The designer can choose to keep the previous tags or attribute values in one version and replace them with new tags and/or attribute values in a new version.

MAFS Bottom Layer

A storage and management of annotations organised in layers (abstraction levels) supports data independence and the possibility to define views similar to those in traditional database management systems (including a metadata layer representing the connections between file elements in the various layers).

The bottom layer is the set of files with all types of tags embedded, that is, annotations for structural information and also special tags for text span edges. The latter allows for explicit representation of word and sentence identifiers (used to represent text span edges). The bottom layer also contains the file header information.

MAFS Text File Plain (PTF)

Plain text format without annotations is the proper input-format to various data processing programs—such as WordSmith, Document Explorer, and ATLASti, various statistical programs, Part-of-Speech taggers, Constraint Grammar taggers, etc. Recently, it is announced that some CG-taggers also accept texts annotated with a minimum XML tag set.

MAFS Acquisition Information

A tailor-made interface provide support for refining these predefined rules, adding new types of segmentation units, and for performing easy manual interventions and corrections in the segmented files. The segmentation module generates Annotated Text Files (ATF) consolidated and stored in the Bottom Layer of the MAFS.

When tags are embedded (stored in the ATFs), the header (of the file) contains general information about the file. This record kept for version control includes a set of flags indicating whether the file has/has not passed through dictionary lookup, part-of speech tagging, cg-tagging, and information assigned after disambiguation, for instance elements in the Dublin Core metadata records.

This record of information is required in order to supervise the subsequent processing—for instance when converting from one format to another. Since the different types of software used during analysis have special format requirements, each document will exist in several versions. Version control is therefore of outmost importance and is part of the corpus documentation. High-quality procedures and consistent information about elements in the corpus are essential for measuring progress, avoiding data duplication, controlling input data quality for later processing in special-purpose software used when enriching texts with tags or analysing texts, and so on. The format problem may else evolve to be a bottleneck in the corpus processing. A consistent format treatment will ensure that the same set of transformation scripts can be applied to parts of the collected source texts in one run. A XML record format will also serve the corpus documentation and each element filled in will be assigned a signature.

Recent reports proclaim that there are two restrictions that make the use of embedded XML inappropriate for the encoding of syntactic information. The structuring rules for syntactic information restricts the description variety to one relation, the part-whole relation. These structures can represent a hierarchically arranged sequence of embedded segments, but are not capable of encoding syntactic relations or network structures. In this structure any higher order elements (e.g. sentences) must embrace a chain of continuous sub-elements/ phrases or words). It is therefore claimed that discontinuous constituents cannot be represented. The present invention circumvents this problem by applying a special designed structure embodied as layers MAFS consolidated into layered database partitions, in which information about the lowest level documental logical object type wraps a higher level type, as explained in the section 'Apparatus Filtering'.

MAFS Intermediate Layer

The intermediate layer is a set of files containing annotated files (equipped with grammar tags and structure tags), which is generated dynamically generated with subsets of XML-annotations stored in external files (for instance tags for text span edges representing the source and target anchors in hypertext structures). Thus it will be possible to represent different hyper textual perspectives superimposed on the same underlying text base. Overlapping and discontinuous constituents will be managed via the intermediate layer.

MAFS Text File Annotated (ATF)

An ideal of plain text format is perhaps an inheritance from the period when corpora basically were used for linguistic research. Features such as font, font size, tables and graphical images are not considered as highly relevant for linguistic analysis and therefore usually are removed form the corpus text. However, with respect to information filtering application, such information may have its own value. Font size may for instance signal that the author emphasise certain phrases (cue phrases), or signal important points made (lead functions), and so on. Section headlines normally signal content (if they are 'true' macro propositions summarising the text subsumed under it). Units being elements in the documents' logical structure (as defined in a Document Type Definition, DTD) does not pose special problems if they are properly tagged (SGML/XML).

The present invention is based on a document collection with annotations—grammatical annotations and annotations describing the documents' logical structure. The present invention will use grammatical annotations provided by others, either by applying licensed constraint grammar taggers or paid services from 'tagger' companies. The CG-tagger from the Centre for Computing in the Humanities (Bergen, Norway) will be applied for Norwegian texts. Within EU there are many taggers available under licence agreements. The grammatical tags from the various taggers are normalised into a common tag set and converted into XML format.

The present invention will preferably use a special-designed annotation scheme for the documents' logical structure. In a very simple annotation scheme, only sentence boundaries are marked. Annotated texts allow for easier automatic manipulation and there are several annotation standard proposals (there is not yet a generally agreed standard for text annotation). We have decided to use the annotation framework denoted as the Text Encoding Initiative (TEI). TEI provides a set of guidelines of how a large number of annotation types can be encoded in electronic format and uses XML as document mark-up (annotation format). In 2001, TEI launched the concept of XML-schema, which will be adapted for structure specifications. TEI also attends to necessary rules for future conversions conditioned by technological changes. At present, XML is an independent exchange format that allows for maximum portability. It is expected that software producers in the near future will deliver XML-aware software.

MAFS Text File XML

Current standard practice is annotations based on SGML or XML. XML is a subset of SGML (Standardized General Mark-up Language, ISO 8879). XML is a data format for storing structured and semi-structured text intended for dissemination on a variety of media or hardware/software platforms. An XML document can be broken (defined) into its hierarchical components and stored in, for example, a relational database. Current XML/SGML-aware document management systems on the market are usually built on top of an object-relational database. This is essentially an object layer 'placed' on top of an existing relational database product. XML may also be used as an exchange format for data residing in relational database systems. The XML tags are used as a data wrapper during transfer of the text (or other types of data) between systems.

XML (like SGML) is a meta-language and there is no pre-defined list of elements. The user may name and use elements by their own choice. In XML there is an optional mechanism (obligatory within SGML) for specifying the elements allowed in a specific class of documents (the class of documents being specified in ISO 15255:1999). The document instances have to conform to this type definition or more specifically each document (instance) can be validated against the DTD. A document in XML-format is self-describing and information about the document represented in the tag system can be extracted, manipulated and formatted to the requirements of various target software. XML documents can be displayed, queried, and manipulated by using XML tools.

MAFS Top Layer

The top layer constitutes files optimised to specific needs within certain user communities. The layer can be restricted to a subset of the annotated document collection and/or to a limited set of structural, grammatical and semantic tags. If a user community prefer/approve certain grammar based filters and discard others (consider some filters as less useful), this layer can be optimised to user requirements.

Apparatus for Disambiguation

Figure 4:
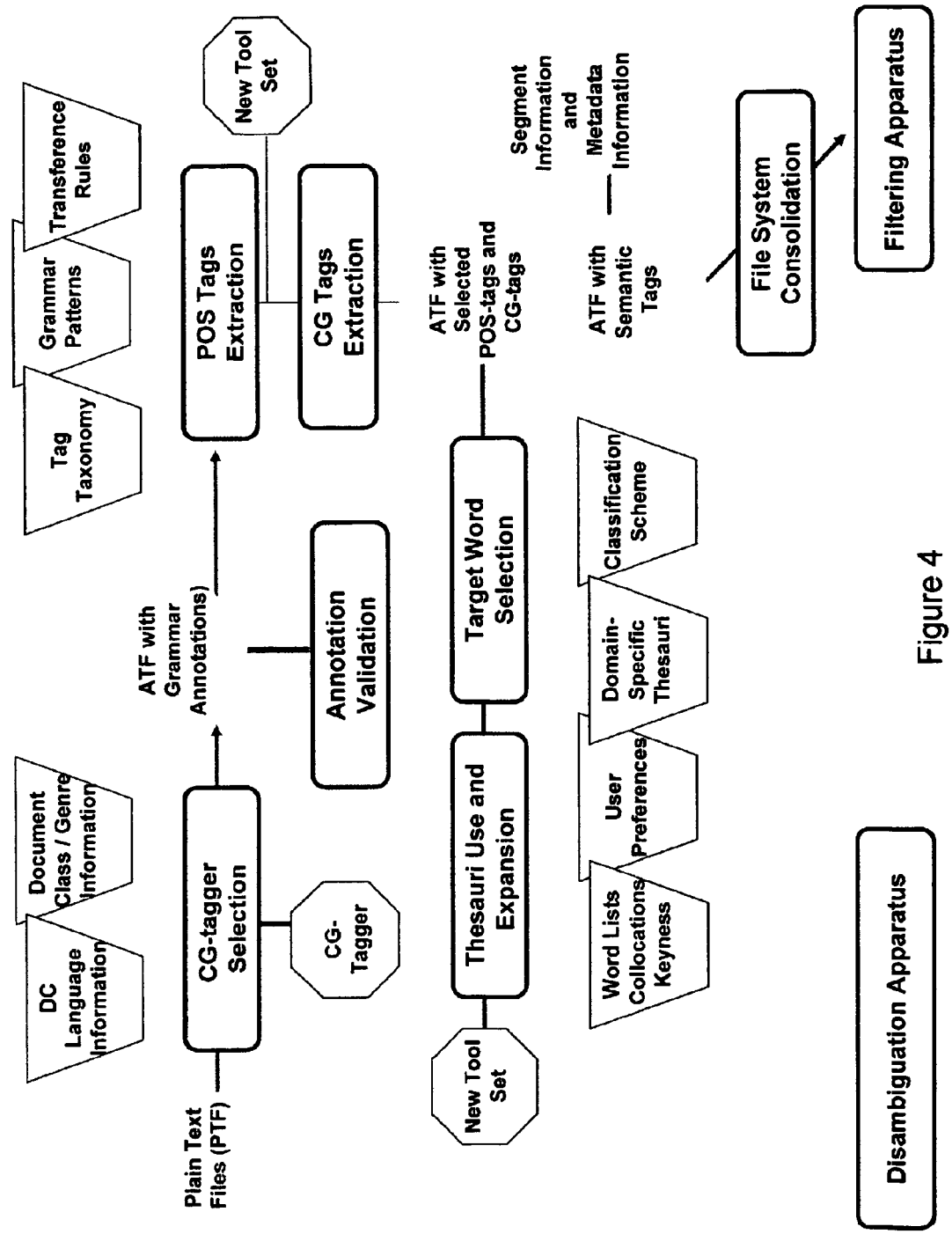
FIG. 4 is a schematic representation of an apparatus for disambiguation according to the invention.

This apparatus embodies devices that perform various types of text disambiguation. FIG. 4 gives a schematic presentation of the 'Apparatus Disambiguation' in accordance with the present invention. Language resources such as corpora, thesauri, lexical databases, grammar parsers, etc represent large-scale investments and the disambiguation of text is therefore based on a reuse and integration of existing resources. The disambiguation apparatus deals with techniques for converting output from Constraint Grammar taggers (CG-tagger) into an annotation format in compliance with the structure/architecture specified for the Multileveled Annotation File System (MAFS). According to the invention, it is preferred to extract a subset of the grammatical tags delivered as output from CG-taggers. These extracted subsets are converted into tagged entries (both embedded and in external index files), each entry linked to the words or word combinations in the text.

The disambiguation process also cover approaches related to a device for Target Word Selection (TWS) in order to improve the strategy of text zonation. (See Apparatus Zonation)

The preferred embodiment of the invention applies extracted subsets of grammatical tags (codes) combined with a selected set of semantic codes. The invention applies existing semantic resources encoded in Domain Specific Thesauri (DST) owned by the user community (or user community is licensed to use DST).

Information filtering applications involving tasks related to natural language processing require annotated texts. As mentioned above, the term annotation refers to the marking of information. With respect to disambiguation procedures this mean special codes describing different linguistic features that are assigned to the words in the texts. The fundamental linguistic annotation is the part-of-speech tagging (POS-tagging). This type of annotation is considered as obligatory for information extraction and semantic disambiguation. Constraint Grammars provide for annotations at a higher level. A Word Sense Disambiguation (WSD) process is based on at least POS-tagging.

Multileveled annotations require a decision on the annotation schemes employed at each level, and how to convert the output from the various processing tools to formats consistent with the annotation schemes. This multileveled approach calls for external storage of annotations (linked to words, word combinations, phrases or other structural units (text segments) in the text files). Text zones may be marked with edge-tags (attribute-value pairs), each tag referencing lower level units (and with pointers to physical addresses).

Text units, defined s series of sentences, may contain words or word constellations that refer to lead functions, e.g. in special purpose sentences as titles, headers, etc. Such features are treated in the apparatus for zonation. Text units may be classified according to the superordinate argumentative function, for instance description of a situation, utterances related to problems, evaluation of problems, problem comparisons, proposed solutions, selected solutions, evaluation of solutions, and so on. Such lead functions vary with text genre, and it is possible to conceptualise superstructures (systems of lead functions) for any genre. Lexical signals for such lead functions are identified and stored/maintained in a separate keyword file (cue phrases). The approach aims at partitioning the content of the text sounding board (i.e., index structure) in that grammar based codes can be filtered according to whether they are derived from text zones (or other types of pre-defined text segments with semantic-pragmatic codes referring to lead function). In consequence of that, the user may request a constrained display of the triple track (referring to a special purpose index structure denoted as APOS) occurring 'within' supposedly 'more relevant' text spans, for instance all zones encoded as dealing with problems related to the domain in question.

The quality of the system's selectivity is the main issue. Text enriched with grammatical and semantic codes (tags) will support better semantic applications, and improve performance of data exploration in texts.

The source text (plain text files) annotated (enriched) with grammatical tags is a prerequisite for constructing search macros with grammar based search operands. In accordance with the present invention, grammatical coding has its weakness in that it leads to 'over-coding'. If the extraction procedure is not restricted to certain grammatical categories, each word in the text will be assigned a series of values referring to grammatical information (the word's grammatical class and syntactical function, and other types of morphological and syntactical information).

A set of transference rules influence the design of a new tool set to be used by the application designer during the extraction procedure. The extraction procedure is also influenced by a set of grammar patterns realised as building blocks in the search macros (components in the filter options).

Tags denoting the different grammatical word classes are utilised in the zonation apparatus. Nominal expressions may indicate certain types of propositional content, verbal expressions may indicate certain actions, and adjectives or adverbial phrases may indicate certain modes of achievement as well as the degree of strength related to the sincerity conditions. POS-tags form an important part of the input to the Word Sense Disambiguation (WSD) procedure. The results from a Target Word Selection (TWS) procedure may, for some user application, be adequate in the construction and strengthening of the text zones.

Grammar based search operands combined in search macros (grammatical search patterns, or grammatical request patterns) will retrieve zones and sentences from the underlying texts. This is however not a sufficient filtering (sufficient according to some criteria framing the information need). The words coded as nouns, verbs, etc., will have to be further filtered and validated in order to assign discriminating descriptors being the constituent parts displayed in the text sounding board. For each validation, either by manual intervention and/or a Target Word Selection procedure (dictionary lookup), the application designer, or preferably the system can assign one or several semantic codes to the words (or other textual units, preferably semantic codes at various abstraction levels). These semantic codes may preferably be assigned to zones and sentences (or other derived object types such as chains). Further, semantic codes at a lower abstraction level are associated to smaller textual units such as a text zones as defined in the present invention.

Part-Of-Speech taggers are classifiers choosing the most likely tag for each word in a context (normally a sentence), and with reference to a given set of possible tags. Each word is assigned a tag (or annotation) indicating its morphological category (noun, verb, adjective, . . . ) and morphological features like number, gender, tense, and so on (singular, plural, base form, past tense, comparative, . . . ). POS taggers have reached a fairly satisfactory level of accuracy and the amount of such resources available on the WWW is steadily growing. Their availability is however highly dependent on the language.

Recent reports confirm that tagger performance to some extent is dependent on the text type (genre). It is proclaimed that there is lack of knowledge regarding performance changes when moving from the training domain (text genre) to other domains. The performance of taggers on a corpus may be uneven (since they represent different underlying theories and therefore have different tag sets with respect to coverage and size) and also may have been trained on different text genres. Information about Document Class and Text Genre will therefore influence the choice of grammar tagger if there are several competing taggers available. The surveillance of tagger performance in relation to text genre accordingly influences the following tag extraction procedure. That is, the rules of transference are adjusted to assembled performance data.

If the texts in document collection are annotated using different taggers, there is no guarantee for consistency between the various annotated texts. When the goal is to make essential grammatical information available in a set of annotated files stored and managed in the intermediate layer of the MAFS, and further consolidated in DBPs, such differences can be minimised by constructing mapping schemes. The differences are systematised and conversion rules integrate the tag sets from the various taggers into one consolidated tag set. The techniques applied for schema mapping is widely known in the prior art.

In the present invention the procedure for integration and consolidation of various tag sets map the correspondences into a 'standard denotation scheme' or 'tag nomenclature'. The set contained in the Tag Nomenclature will be a reduced tag set as compared to the various types of grammatical information delivered from the various taggers applied. The criteria for reduction reflect decisions made about what types of tags should be taken into account in the construction of search macros with satisfactory discrimination ability. The Tag Nomenclature will be expanded for every 'new' tagger used in disambiguation procedures. The expansion is based on data assembled through series of investigation steps, the most important being the conjunction and disjunction of tag types. (For instance, is it satisfactory to define one tag covering nouns singular as well as noun plural, is it necessary to keep all verb tenses as separate tags or will base form, present and past tenses suffice.) Another important step is to see whether there is a need for adjustments according to different text genres. When these investigations are made and the Tag Nomenclature updated into correspondence, the integration and consolidation procedure is to some extent similar to schema integration procedures in traditional data base systems.

However, since each tagging procedure produces an 'ATF with Grammar Annotations' it is possible to store and manage the original and detailed annotations in a separate file system ((ATF <part of> Bottom Layer) <part of> MAFS)). The original set of grammatical annotated texts are stored and managed in the 'Bottom Layer' of MAFS. Detailed annotations in the 'Bottom Layer' support experimentation aimed at finding the 'best' tag set for information filtering to each user community requesting the services.

Grammatical Parsing

The present invention identifies these new, seldom continuous but often overlapping text zones by processing grammatical encoded text. Grammar taggers known in the prior art produces the grammatical information encoded in the set of files stored in a database partition denoted as the Bottom Layer of a Multi-levelled Annotation File System (MAFS). The present invention includes an apparatus for pre-selecting the types of grammatical information to be included in the Bottom Layer, and also including an apparatus for manual intervention in that most grammar taggers still fail to disambiguate texts with a 100% correctness score. For certain application domains, as for instance in medical journals, it is of outmost importance to have an option for manual intervention.

Disambiguation errors are often caused by spelling-errors. Misspelled words are not recognised during lexicon look-up, misspelled words disturb the zonation procedure and disturb the frequency and distribution data, and misspelled words are out of the reach for users transmitting their queries as free-text queries. The present invention assumes a programmed connection between the apparatus for validating grammar tags and a spelling-corrector known in the prior art.

The grammatical encoded texts stored in the Bottom Layer and managed by a customised DBMS known in the prior art, are further processed by the present invention and transformed into a customised XML-format. The XML-formatted files are organised as an interlinked set, each file containing data about different Documental Logical Object Types. Metadata about documents from which the texts are extracted, are stored and managed according to the rules prescribed for the Dublin Core Element Set (DCES), known in the prior art. The Dublin Core Element Set is expanded by a special purpose set of attribute types. A device that calculates keyness and the 'keyness of keyness values' transmits data to some of these new attribute types. The keyness values are preferably restricted to encompass words annotated as being in the grammatical classes of nouns and verbs. The device for keyness calculation can be tuned towards any kind of text segment (portions of one text). Part-of-speech tagging is used for lexical ambiguity resolution.

A higher level of grammatical annotation is syntactic mark-up, where full or partial parsing trees are marked for each proposition. This level of annotation is rapidly developing. A constraint grammar recognises word-level ambiguities, for example, in a phrase like 'the claim', the word claim is marked as a noun since a determiner is never followed by a verb.

The study of verbs is complex due to the lists of arguments the verb takes and the types of nouns or noun phrases in the argument position together forming a verb phrase. The verb ambiguity is related to the differences in the nouns that co-occur in the sentential structure around the same verb. The classification of verbs into transitive, intransitive, and transitive/intransitive is one part of the disambiguation process. According to the grammatical characteristics of verbs, the list of argument nouns is added. Thus the co-occurrence of verbs and nouns are of interest, but also the position of the main verb and auxiliary verbs relative to the main verb and the nouns' positions. Adverbial particles also play an important role in the semantic disambiguation of verbs (at least this covers for the Scandinavian languages, but these patterns differ from one language to another).

The semantic relations of the co-occurrence of verbs and nouns may be used to resolve some types of ambiguity. The construction of search macros is thus dependent on the delivery from constraint grammar taggers, and for each specific user community (typical tasks, typical information needs, etc) the types of grammatical information delivered are carefully considered in order to design a conceptual framework for filter options.

The present invention embodies a particular device that generates triple tracks displayed and operable in the text sounding board. The basic grammatical structure underlying the triple track is the constellation Subject Verb Object Structures (SVOS). These are abstracted into a similar triplet with facets for Agent, Process and Object (APOS) with associations to the occurrence sets for each of them (occurrences with associations to the SVOS being associated to the APOS). Information about occurrence sets must be recorded for each text (that is, text extracted from document being a member of a document class) and for each SVOS selection. These records form the basis for comparisons in order to find the frequency scores of the triplets and their components. Systematic comparisons may uncover triplets or facets with a high discrimination ability, or at least form a ground for selecting essential triplets or facets. The selection of essential triplets/facets will reside on particularly rest on the zone link sets generated by the Zonation Apparatus.

Irrespective of software used during the analytical tasks, the present invention presupposes, to a limited extent, access to resources in which words with similar meanings are grouped together. Linguistic research communities have produced valuable sources of linguistic information, some of the results are made available either as freeware or it is possible to acquire special licenses for further use in new applications. These resources include domain-specific thesauri (thematic thesauri) and more lexicographic thesauri. The important point to be made is that such thesauri represent existing knowledge and will be re-used if the producers or the copyright acts allow it. A device that applies thesauri is described in the section 'Device Target Word Selection'.

Device Target Word Selection

Considering Word Sense Disambiguation (WSD), the procedure is dependent on what is the 'unit of meaning'; see section 'The principle of text driven attention structures'. If the WSD is based on output from POS-taggers, the units are words—and a WSD by simple dictionary lookups will not be reliable (polysemy, several concept matches for each word, etc). A word as an isolated unit has no semantic discrimination ability—in order to make a reliable WSD the word must be classified with reference to the textual context in which it appears. The WSD procedure must therefore be validated in a particular device designed for computer-supported manual intervention.

The present invention is based on the assumption that it is possible to identify a certain satisfactory level of concept abstraction and under the restrictions described in the section 'Zonation Criteria'. Concept abstraction is the procedure that selects a certain set of concepts in a concept hierarchy (thesaurus) and traces the set to one or more upper level (abstract concepts) or lower level concepts (detailed concepts). The starter set of concepts corresponds to words already identified in the text being processed. So instead of using the term WSD, a more appropriate term in the present invention is Target Word Selection (TWS), that is, supplementing identified index entries by selecting words/concepts from a certain abstraction level in existing lexical databases, that is Domain Specific Thesauri (DST). Recall that the target word selection procedures is applied in order to strengthen text zones, as perhaps opposed to the general idea that a particular semantic network can be 'superimposed' on any texts.

Concept abstraction is commonly considered as a mechanical operation that simplifies a concept hierarchy. Concerning index entries, the present invention organises these into triplets in which words tagged as components in SVOS (Subject Verb Object Structures) are extracted from sentences, and thereafter further abstracted into triplets in the form APOS (Agent Process Object Structures). From empirical (small-scale) investigations it seems clear the form of concept abstraction performed is a promising approach for data reduction. Data reduction is necessary in order to reduce the set of words displayed in the text sounding board partitions. This does not mean that the set of words are eliminated or is not available, bit simply that the amount of words displayed can be regulated as to show portions at the time, preferably organised along the dimension from general to specific. The derived semantic relations to other words (also occurring in the text) will be registered and consequently may be displayed if the user selects an option 'display details' for a current selected word. The original word (being a component in SVOS) may preferably be linked to upper level concepts (a component in APOS and mainly through IS_A relations). It is therefore feasible to display the associations (occurrences of a certain association type) in simple structured semantic nets (local to documents, zones or sentences since each word or index entry also implicitly includes references to such units). These semantic relations between words, covering each text individually (intratextual semantic relations) or consolidated to cover several texts that are extracted from documents that share some features in the situational context description. The semantic structures are described according to the syntax defined for XML.

Since the approach is founded on the principle of text drivenness, the present invention avoids some of the known problems commonly denoted as the 'consistency problem of semantic indexing'. Due to the maintenance workload related to classification structures, it is desirable to minimise the concepts and keep the structure as clear as possible. This approach is subsumed under terms as minimalism and coherence. Minimalism must be balanced against requirements as semantic discrimination ability, which in turn must be considered with reference to the application purposes.

Concept abstractions generalise concept descriptions and are obtained incrementally from texts. Concept abstraction via dictionary lookup may contribute to an exact and compact concept description development. However, a too excessive abstraction may lower the system's discriminating ability (wrong 'information' represented).

These mentions of advantages are thus similar to well-known principles within classification theory, and the techniques are in fact a set of classificatory data reduction rules (macro rules) aiming at simplifying concept hierarchies. Human introspection is needed in order to evaluate/validate the computer-assisted operations, including comparisons between variants of the rules applied. This procedure is supported by a device for construction of domain specific thesauri (in this case, thesauri covering words and concepts as related to texts held in a document collection of interest to a user community).

If the concept structure in a thesaurus allows for multiple inheritances, the abstraction procedure can either abstract to either of them, or both of them. Reports on this subject matter discuss problems related to that the first alternatively may cause an abstraction in the 'wrong' direction, while the latter may cause redundant semantic ambiguity (produces 1:m correspondences). In the present invention, however, a concept from a thesaurus will not be captured if the corresponding word does not exist in the text, i.e., in the neighbourhood of the target word in the first TWS cycle. Since each word by its identifier is connected to the underlying texts, it will be possible to restrict the coverage area. It is assumed that it will be rather seldom that the very same word refers to the 'same meaning' within a short text span within on text. The set of constraints can be loosened as more related texts are processed.

Domain Specific Thesauri

A domain specific thesaurus is small or medium-sized, purporting to explain the meaning(s) of a word via a concise definition with reference to a domain of interest. Each entry is commonly connected to other entries, and as broader terms or narrower terms.

List of candidate terms of the domain can be extracted from linguistically processed text corpora. A term is a word that may be associated with a domain specific concept and usually takes the form of a nominal expression. The identification and coding must take into account that the same word (or word constellation) may have different grammatical functions in the texts. TWS is applied iteratively by mapping the concepts in domain specific thesauri (with morphological variants) against words extracted into the SVOS (Subject Verb Object Structures). The concepts in the domain specific thesauri returning with the value 'no match' are then input to a TWS procedure between these 'no-match' concepts and concepts encoded in a more general thesaurus (Lexicon). This mapping procedure seeks for synonyms and/or abstracted concepts, and these 'replacements' are then mapped against the SVOS in a second round. The concept abstraction is restricted to certain subsets of the concepts organised in the general thesaurus, for instance by restricting the search to certain abstraction levels (up). The final decisions about such restrictions will be based on feedback from user communities requesting the filtering mechanisms underlying the exploratory search options.

TWS based on domain-specific thesauri (for instance the Petroleum Affair Base or others) may lead to a deeper semantic classification based on the identification of how a specific word co-occurs with other words held in preferably a set of zone link sets from which the SVOS are derived. The occurrence of two or more words within a well-defined unit (i.e., sentence) is called a co-occurrence. Co-occurrences can be statistically processed by particular tools computing collocation patterns, and based on different types of measures. The consolidated set of SVOS will thus not reveal collocations in this sense. The SVOS extracts will however at least reflect how words co-occur within sentences together with information about the words' grammatical functions. The present invention will preferably realise a programmed connection to software that can produce these combined collocations (grammatical information combined with frequency and distribution information). The combined collocations are stored in the database partition containing data about word occurrences. General XML tools combined with tolls like Document Explorer can produce the frequency information required in certain filter options. The same set of software tools can also be applied when generating proximity information being essential in several grammar-based search macros (Filter Module). For instance, one filter option presupposes the activation of search macros that identify common nouns tagged as object in one sentence occurring as subject in adjacent sentences or sentences within the same zone (distance operator). The search macro realizes an algorithm for computing an adjacency factor (sentence distance between common noun as object and the same common noun as subject) and use proximity measures in weighting procedures. Proximity measures are used as input in filtering options (described below).

General Thesauri

A general thesaurus is medium-sized or large, purporting to explain the meaning(s) of a word via a general description. These general descriptions, depending on the word's semantic type, may include information that classifies the word into a group of similar words, information describing the properties, information about parts, information about the origin, information about functions, and so on. These relations subsume many other relation taxonomies. The procedure for Target Word Selection being a constituent part of the Thesaurus Expansion will take advantage of this taxonomy. This type of expansion procedure is however restricted to words registered in the text's keyword set, i.e., the words with a certain keyness value assigned to a new element type added to the document's Dublin Core Element Set. The abstracted or specialised term from the thesaurus is included and registered if is contained in the text that the keywords refer to, and where the word occurs with a frequency above a certain threshold value. The generated code-to-code-links between words meeting the keyness threshold values are not considered to be a part of the thesaurus structure, they simply reflect an expansion of the set of keywords. There are specific reasons for the restrictions imposed on the use of general thesauri, see section 'The principle of text driven attention structures'.

Triple Track

This section outlines the procedure for the construction of interlinked Triple Tracks made available in one of the modus operandi defined for the text sounding board. In this description the focus is on two basic components—the SVOS and APOS. These components are formalised as a triplet <concept, association type, context>. This triplet formula holds for all textual/contextual levels. For example a document <within document collection, text <with document, zone <within> text, sentence <within> text, word <within> sentence, word <is a> subject, word <is a> verb, subject <precedes> verb, etc.

- The grammatical annotations delivered from a constraint grammar.
- Word level or higher order unit types in the text, specifically derived zones.
- The Subject-Verb-Object Structures (SVOS) extracted from the annotated text or a selected set of sentences, preferably within zones.
- The validated SVOS denoted as Agent-Process-Object Structures (APOS).
- Zones with assigned APOS (zones are series of sentences with defined connection points stored in the zone link set).

The distinction between SVOS and APOS follows the traditional division of syntactic and semantic types. The SVOS are directly associated to the sentences they are extracted from (associations represented by edge-elements in XML-files and word/sentence identifiers). The APOS are a subset of the SVOS and the subset is according to a reduction strategy (semantic and pragmatic criteria). Each APOS is a set of index entries that 'inherit' the edge-elements from the SVOS [APOS <is derived from> SVOS]. The APOS are thus associated to the underlying sentences (or text zones, i.e., sentences <is part of > larger textual units). The index entries in APOS are therefore denoted as 'textual contacts' or simply 'contacts' in order to distinguish them from concepts used in the presentation of ordinary index structures.

The realisation of the association types makes it possible to construct an index system in which the concepts are not only organised in hierarchies, but also in a kind of 'heterarchies' (top-down and also side-by-side that is, hypotactic and paratactic relations). The particular kind of structure is elaborated into detail in Aarskog (1999). The visualisation in an interface will take the form of windows arranged side-by-side, each window with options for expansion/reduction (more general or more specific terms), and options for displaying the underlying words as they appear in the text. A preferred embodiment is shown in FIG. 5. The triple set of panes is denoted a 'triple track'. The figure depicts a prototypical embodiment of the present invention.

The final architecture (interlinked file system, interface, etc.) is to be implemented in a more robust technological platform (Unix, Java, Lisp, XMUXSL). The underlying data structures in the windowpanes outlined in FIG. 5 is generated from a CG-tagger for Norwegian, cost free software in research communities and with normal licence agreements in commercial organisations. As the separate panes (APO) show, the underlying data structures are consolidated in this prototypical version. This means, that if there are several word occurrences referring to the same token (word type), the panes will only display the word type. The present prototype embodies the basic functionality operating on the system selectivity presented in this document. However, the future use of the mentioned technological platform will include state of the art principles adapted from the field of Human Computer Interaction (HCI).

Triplet Formula

Figure 6:
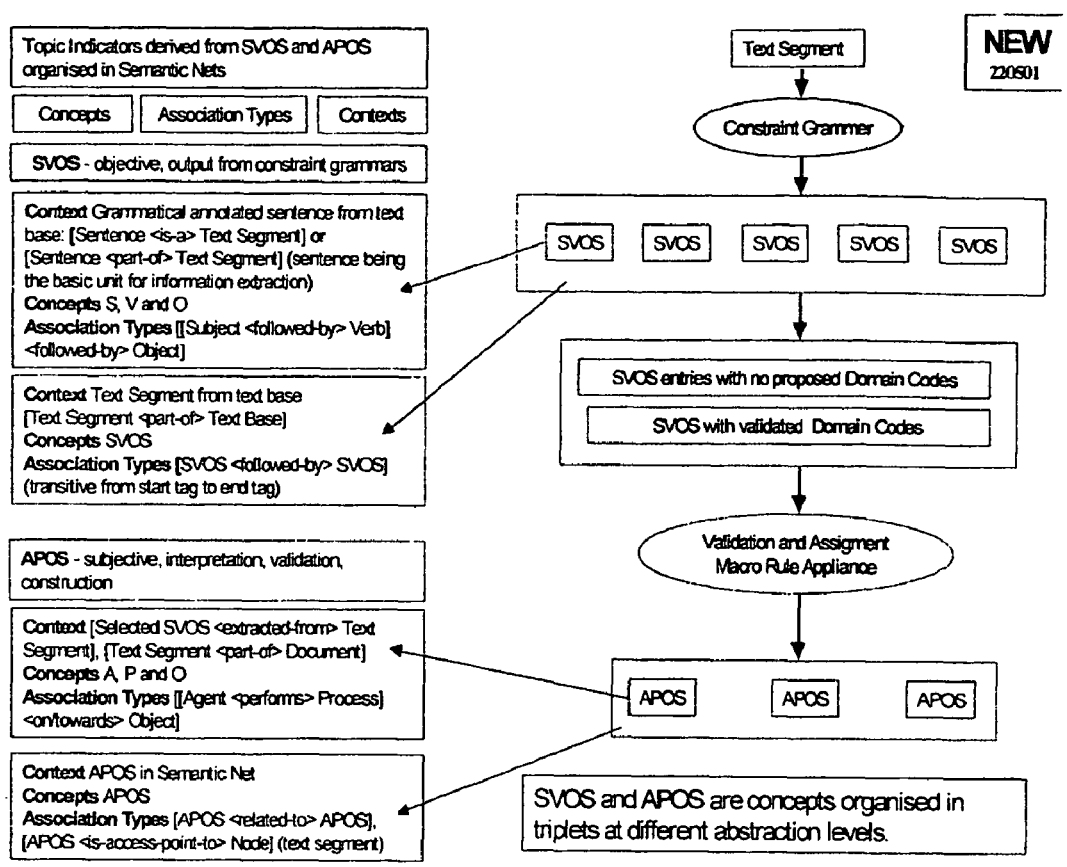
FIG. 6 shows a representation of APOS and SVOS and how these concepts are organized in triplets at different abstractions levels.

As indicated above, the SVO Triplets and APO Triplets are concepts organised in structures at different abstraction levels. The triplet formula is [concept <association type> context]. This is shown in FIG. 6.

The APOS are derived from SVOS and are a result from reduction procedures involving: grammar based extraction patterns, principles within free faceted classification theory (including concept abstraction and the application of macro rules), and Target Word Selection procedures based on Domain Specific Thesauri.

The ground level is composed of Subject Verb Object Structures derived from grammatical annotated sentences, and the sentence grammar is the unit for extraction procedures realised through sets of regular expressions combined in search macros. What a sentence is about is not necessarily what its grammatical subject states, however any formalism underlying the representation of information involves simplification and reduction. Even if the grammar based extraction patterns does not capture lexical units from all the texts sentences, this does not mean that the patterns cannot produce a good information representation for exploratory purposes. Nominal expressions can be said to denote the texts 'world-building' elements and the verb phrases what is said about them. This is also implicit in the free faceted classification theory in that the documents' theme can be inferred from the nominal expressions in the individual sentences. By using an evolving domain-specific thesaurus in the extraction procedures, it will be possible to tailor the APOS to support specific user communities. The APOS refer either to one text or a group of related texts, but can also be constrained to only display SVOS or APOS referring to text zones with assigned discourse element indicators.

The SVO and APO triplets are an important component in the system's selectivity, i.e. content representations. The panes or tracks in the triple track are an important attention structure in that it reflects some of the words nearest inner context. When the user selects a word type displayed in one of the tracks, the other two tracks are immediately adjusted to include only those word types that co-occur with the word type activated. Similarly, if the user activates word types in two of the tracks, the third track will instantly display the word type that co-occur with the word types in the two other tracks. By 'double enter', the text pane will show the word types highlighted and, if the user selects this option, constrained to zones in which the word types occur.

Target Word Lists

Target Word Selection and Domain Specific Thesauri: The semantic nets encoded in thesauri can be searched for concepts and semantic concept relations defined as relevant to a domain.

In the proposed approach, according to a preferred embodiment of the invention, nouns (or nominal expressions) are represented in the S and O components being <part of> the SVOS. The SVOS are extracted from a selected set of sentences annotated with grammatical information, preferably sentences located within zones as part of a reduction strategy. A dictionary lookup makes it possible to investigate whether these nominal expressions exist in already established semantic nets. A mechanical dictionary lookup will however not tell whether the nouns' sense in the text is similar to the sense given to the same noun in the semantic nets. Therefore the set of nouns (tagged as S or O) are also examined with respect to how they co-occur within one or several text zones. Identified co-occurrences (collocations) are compared to the concept relations encoded in the domain specific thesauri applied (consolidated collection of domain concepts).

These target word selection procedures preferably would benefit from pre-processed, encoded information about the domain involving: texts with grammatical annotations and concept hierarchies available either in Domain Specific Thesauri or as on-line lexical resources.

General thesauri contain concepts relevant to all sorts of domains and often also include indirect relations between concepts. This of course influences the semantic precision when mapping words from a text (grammatical annotated words), either single words or words grouped into SVOS, against concepts encoded in a general thesaurus. As an example, a concept in WordNet is an element in a synset (synonym set) and each element may have hyperonyms and hyponyms (except elements in the genus position, the concept having one or several subordinate concepts). In the present TWS approach, concepts encoded in Domain Specific Thesauri are mapped against the words in the SVOS extracted from the files annotated by a Constraint Grammar. That is, the concepts in the thesauri are the source concepts and the words represented in the S and O components are the target for the mapping procedure.

Figure 7:
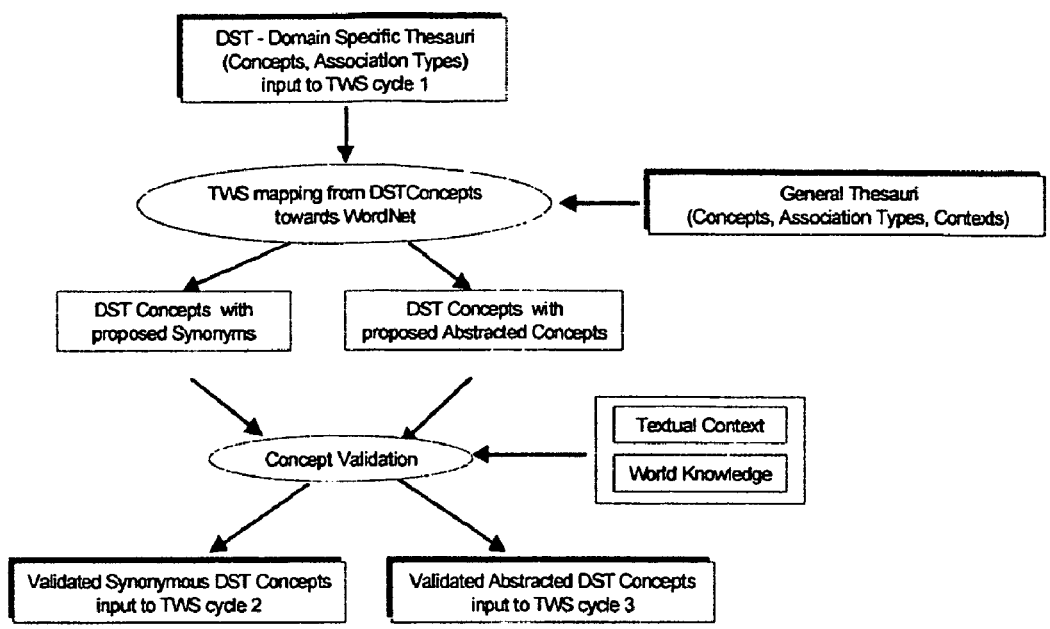
FIG. 7 gives a schematic representation of the construction of target word selection lists.

The TWS will return the values Concept Match or No Match. The present invention is based on the assertion that the direction of the mapping procedure has important practical implications. First of all, it is easier to supervise and manage the mapping results if the direction is from domain specific thesauri, or a domain specific word list, towards the SVOS extracted from grammatical annotated sentences. Secondly, a general dictionary lookup returns too many synonym proposals and abstractions, and the validation procedure accordingly gets time-consuming. An outline of this concept is given in FIG. 7, and in table 2.

TABLE 2

1 Construction of Target Word Lists

For every concept in the selected Domain Specific Thesaurus or Domain Specific Word List (e.g. list of actors, organisations, items, substances, etc.), construct Target Word Lists to be used in iterative TWS cycles. Focus is on nominal expressions:
Type: Target Word List (TWL)
<output from process> Process: Target Word Selection (TWS)
Type: Target Word <is member of>
Type: TWL 1 Validated <is a>
Type: TWL 2 Validated <is a>

TABLE 2-continued

Type: TWL 3 Validated <is a>
The target words are applied on the noun phrases being part of
the SVO Triplets.
Type: Target Word
<is applied on> Type: SVO Entry Noun
<is member of> Type: Target Word List (TWL)
<is applied on> Type: Thesaurus General (GT)
Type: Target Word DST <is a>
Type: TWL Abstracted Target Word DST <is a>
Type: TWL Synonyms Target Word DST <is a>
Type: Value Concept Match <is assigned to>
Type: Value No Match <is assigned to>
The noun entries registered in the SVO Triplets are a subset
of words classified by the CG-tagger as being member of the
grammatical word class 'noun'. The GWC Noun also
includes nominal expressions, derived from applying regular
expressions on the tagger output file.
Type: GWC Noun
<is input to> Type: Filter Noun
<is a> Type: Grammatical Word Class (GWC)
<is part of> Type: GWC Nominal Expression
Type: GWC Noun Common <is a>
Type: GWC Noun Proper <is a>
Type: SVO Entry Noun <is subset of>
Type: SWC Noun <refers to>
2 Construct Target Word list to be used in TWS cycle 1

For all single word concepts, construct a list of all
morphological variations. These are the target words to
be searched for in general thesaurus (GT) in order to
construct lists of synonyms and abstracted concepts.
Type: TWL 1 Validated
<is input to> Process: TWS cycle 1
<is a> Type: Target Word List (TWL)
<is derived from> Type: Thesaurus Domain Specific (DST)
Type: Target Word DST <is member of>
Type: Target Word DST
<is a> Type: Target Word
Since the texts have grammatical annotations, it is possible
to use word lemma (i.e., lemma not being the same as word stems),
considered as an important data reduction technique.
In case of a match, the word is assigned a domain code.
The term 'domain code' refers to a concept encoded
in the DST, and these assignments are temporal
in each TWS cycle.
Type: Value Concept Match <is assigned to> Type: Target Word
Type: Domain Code <is a property of> Type:Target Word
3 Construct Target Word list to be used in TWS cycle 2

For each DST concept, construct a list of synonyms, output
from mapping DST concepts onto concepts in a GT.
Type: Target Word <is applied on> Type: Thesaurus General (GT)
For all synonyms, construct a list of all morphological variations.
Type: Synonym GT
<output from process> Process: TWS cycle 1
<is derived from> Type: Thesaurus General (GT)
<transformed into> Type: TWL Synonym Target Word DST
3.1 Record overlapping DST entry concepts and synonyms.

Separate synonymous concepts that are also main entry concepts
in the Domain Specific Thesaurus. For instance, if
[regulation] is a proposed synonym to the DST entry
concept [law], and regulation is also an entry concept,
put [regulation] into a separate list marking synonymous
concepts that overlap entry concepts.
Exclude these from the TWS list for cycle 2 (they are part of
the word list in cycle 1).
3.2 Record overlapping synonym sets Each DST entry concept has its own set of synonyms. Mark
overlapping synonyms with respect to entry concepts. These
are to be coded as overlapping when the TWS lists are mapped
towards SVOS on cycle 2.
3.3 Consistency analysis Perform automatic consistency analysis. Each entry concept
with synonyms are assigned to separate files, overlaps are
marked by the value 1 in for example a consistency analysis
performed by WordSmith..

3.4 Validate proposed synonym lists

Evaluate proposed set of synonyms against SVO Triplets.
Apply background knowledge and investigate whether the
synonym sense matches the word sense in text files. Record
observations in separate filter list (List for later
exclusions of proposed synonyms).
Type: TWL 2 Validated
<is input to> Process: TWS cycle 2
<is a> Type: Target Word List (TWL)
Type: TWL Synonyms Target Word DST <is member of>
4 Construct Target Word list to be used in TWS cycle 3

For each DST concept, find the nearest abstracted concept
(hyperonym) in the GT (one abstraction level at the time).
Construct a list of morphological variations.
4.1 Record overlapping DST entry concepts and abstracted
concepts Separate abstracted concepts that are also main entry
concepts in the Domain Specific Thesaurus. For instance,
if [law] is a proposed abstracted concept to the DST
entry concept [regulation], and [law] is also an
entry concept, put [law] into a separate list marking
abstracted concepts that overlap with entry concepts.
Exclude these from the TWS list for cycle 3 (they are part
of the word list in cycle 1).
Type: Concept Abstracted GT
<output from process> Process: TWS cycle 1
<is derived from> Type: Thesaurus General (GT)
<transformed into> Type: TWL Abstracted Target Word DST
4.2 Record overlapping abstracted concepts and synonyms for
DST entry concepts Construct list of synonyms for the abstracted concepts and
perform consistency analysis against the validated synonym
lists for cycle 2.
Type: TWL 3 Validated
<is input to> Process: TWS cycle 3
<is a> Type: Target Word List (TWL)
Type: TWL Abstracted Target Word DST <is member of>
5 Register all possible target word constellations
(consolidated Target Word Lists)

For each DST concept, make a register with all variations
for the set <DST entry concept, synonymous concept,
abstracted concept>, that is target words being member of:
Type: Target Word List (TWL)
<output from process> Process: Target Word Selection (TWS)
<is derived from> Type: Thesaurus Domain Specific (DST)
Type: Target Word <is member of>
Type: TWL 1 Validated <is a>
Type: TWL 2 Validated <is a>
Type: TWL 3 Validated <is a>
Each validated domain code has assigned a TWS Cycle Code
(kept in a separate file). Information from validated target
word selection procedures are input to the thesaurus
construction (or expansion) process.
Type: TWS Cycle Code
<is assigned to> Type: Domain Code
For instance
{<law - twscode= 1><regulation - twscode=2>rule - twscode=3>}
{<regulation - twscode= 1><law - twscode=2>rule - twscode=3>}

These steps outline the TWS procedure. In stead of mapping words in SVOS with the value 'No Match' onto concepts in more general thesauri, the mapping of concepts in the domain specific thesauri (DST) onto the encoded concept relations in general thesauri (GT) gradually expands the target word lists. By incrementally processing one DST concept cluster at the time, it is easier to iteratively keep track of the code assignments and have better control in the validation procedures. In these validation procedures, it will also be easier to include 'knowledge' about the words in the SVOS that have assigned codes from earlier cycles. It will also be easier to take into account words co-occurring in larger units such as several sentences, for instance framed in text zones.

The V-component in both the SVOS and APOS is a sort of inner triplet association type, connecting the Subject (Agent) and the Object (Object). These inner associations may give guidelines for which relations to follow in the dictionaries (which are established encoded semantic spaces). However, a TWS directed towards relations will presumably need a more detailed validation and/or human intervention/correction. The identification of semantic relations between a verb phrase in a text and verbs encoded in a thesaurus is extremely complicated. This can be theoretically explained with reference to Thomas (1995): "i) There is no formal (grammatical) way of distinguishing performative verbs from other sorts of verbs. ii) The presence of a performative verb does not guarantee that the specified action is performed. iii) There are ways of 'doing things with words' which do not involve using performative verbs." (1995:44). Based on theory and reported experiences with dictionary lookups, it is decided that TWS procedures for the verbs will not be performed. Rather the verbs encoded in the V component in the SVOS will be replaced by the verb in its base form (representing the P component in the APOS). Thus verb occurrences as {reduces, reduced, etc} will be replaced by [reduce]. These base forms (lemma) must also include adverbial particles (important in the representation of verbal phrases in Scandinavian languages). It may however convenient to group certain verbs in general semantic classes, for instance the class 'express meaning' with occurrences as {say, declare, tell, utter, announce, affirm, assert, claim, etc.}.

In a present embodiment of the invention, it is possible to assign codes representing Tense (aspect of time dimension) and Modality, restricted to the set Past Present and Future. This more detailed grammatical information about verb occurrences encoded in the P-component of APOS, is represented in separate zone link sets (tense zones encoded as properties to each P-occurrence). The content of the links sets can be intersected with other link sets, and the intersected zones in the text pane will be highlighted accordingly. In the same manner, a user can navigate the text by following verb tense chains, moving from one sentence or zone to the next with either an instance of a particular verb tense or bundles of sentences with the same verb tense. This provides for a combined thematic and grammatical text exploration. However it is important to be aware of the fact that tense is related to both the document's production date, and the sentences' inner textual context. For example, a quotation can be in the present tense and the inner context will reveal the actual time of the utterance. Tense chains should therefore preferably be constrained with respect to a further classification of the nouns, for example nouns classified as referring to important actors, organisations, etc. (The document's production date is represented as Logical Now, and Past and Future forms in utterance can be represented as relative to Logical Now. However, this structure will not circumvent representational problems related to the textual context of the authors' utterances. Temporal relations reflect a deeper semantics and a formal representation of these relations must be based on more thorough interpretations.)

Proper nouns may be recognised and encoded during constraint grammar parsing provided that these nouns are encoded in the lexicon processed during parsing. The filter options encompassing search macros identifying proper nouns of interest to a user community must in addition include tailor-made word lists referring to organisations, persons, locations, etc. These collections of special terms will be organised in patterns based on the principles underlying the free faceted classification formulae. Some current constraint grammars are reported having over 90% precision with respect to the recognition of named entities. Nominal expressions (a word group functioning as a noun) do however cause special problems. A TWS will not resolve semantic ambiguities caused by head-words, nouns modified by verbs, etc.

The Target Word Selection and Validation procedure directed towards a domain specific document collections and in accordance with the specified needs in a user community, include routines for the systematisation of the grammatical patterns underlying the selected set of sentences and the extracted set of SVOS. This collection of SVOS will serve one main purpose: They are input in search macros in the form of regular expressions. These regular expressions are more correctly described as 'building blocks' or the components in search macros. The building blocks do not cover the whole SVOS, but they represent regular expressions targeting the S component and the following V and O components. Search macros that are based on these building blocks are also combined into higher order search macros.

It is known that a considerable amount of lexical units are recurring word combinations. Recurring bound word combinations are a typical linguistic feature of any domain, as with specialised terminology (specialised terminology often takes the form of specific word combinations). Signals for specific language that take the form of compound terms should therefore be indexed as complex or compound terms. The free faceted classification scheme gives guidelines for the index entry representation of complex terms. The application of these rules or guidelines leads to the construction of an index subsystem containing complex terms referring to typical phrases used in the domain. An index structure with phrases (phrase register) is an important information filtering tool. The APOS will have higher discrimination ability if they also include associations to at least very common phrases within a domain.

The multileveled annotation file system includes records (in supplementary files) of the associations between APOS and SVOS from which the APOS are derived. The system of identifiers (assigned to Documental Logical Object Types) gives the connection to the underlying text units (annotated in the file system). Phrases also occur in synonym variants, that is, they vary in wording sequence and have transformational variations (e.g. minister of foreign affairs, foreign minister). In the interface structure, users are given the option to display all recorded phrases in addition to the default options.

Bound word combinations cause special problems and research reports seem to indicate that they cannot be treated fully compositionally. If they are considered as coherent building blocks in language use they must be represented as such in an index system. Bound word combinations must be addressed separately, and at present reports indicate progress regarding tagger software and the ability to recognise bound word combination. General-purpose software as WordsSmith or Document Explorer provides computer-assistance (collocations with different cluster size together with frequency data). In the present invention the following approach is applied: Particular program combine frequency information (quantitative criteria) with grammatical information and delivers the result in form of combined collocations. However, knowledge about the domain (qualitative criteria) provides guidelines for term inclusion. The more difficult part of the problem is related to the determination of where to locate (link or connect) complex terms with respect to the basic concepts being the default display option in the triple track (referring to APOS). The most promising solution is to display the 'core term' (preferably a noun) and with options for displaying details about these particular nouns, that is, by activating a certain icon, the display of nouns is expanded to a display of structures resembling short KWIC (Key Word In Context).

Lexical units signalling problems, solutions or evaluations (lead functions or discourse elements) will also occur as word combinations. Some of these lead functions can be identified by more or less unambiguous lexical signals (direct cue phrases). Obvious cue phrases may preferably be stored in separate word lists, and these word lists can be applied in a TWS procedure aiming at identifying an locating other words or phrases in the target words' neighbourhood that also indicate a discourse element. Chains defined over cue phrases and as intersected with other types of lexical or grammatical chains show interesting attention structures that may serve users with the need for profound text exploration. Utterances that implicitly indicate for instance a problem cannot be captured through automatic procedures, i.e., from the field of text linguistics it is known that a negative evaluation of something' may be the only indication of a problem, without using words as (problem, crisis, disaster . . . }.

Assigning Domain Codes

Figure 8:
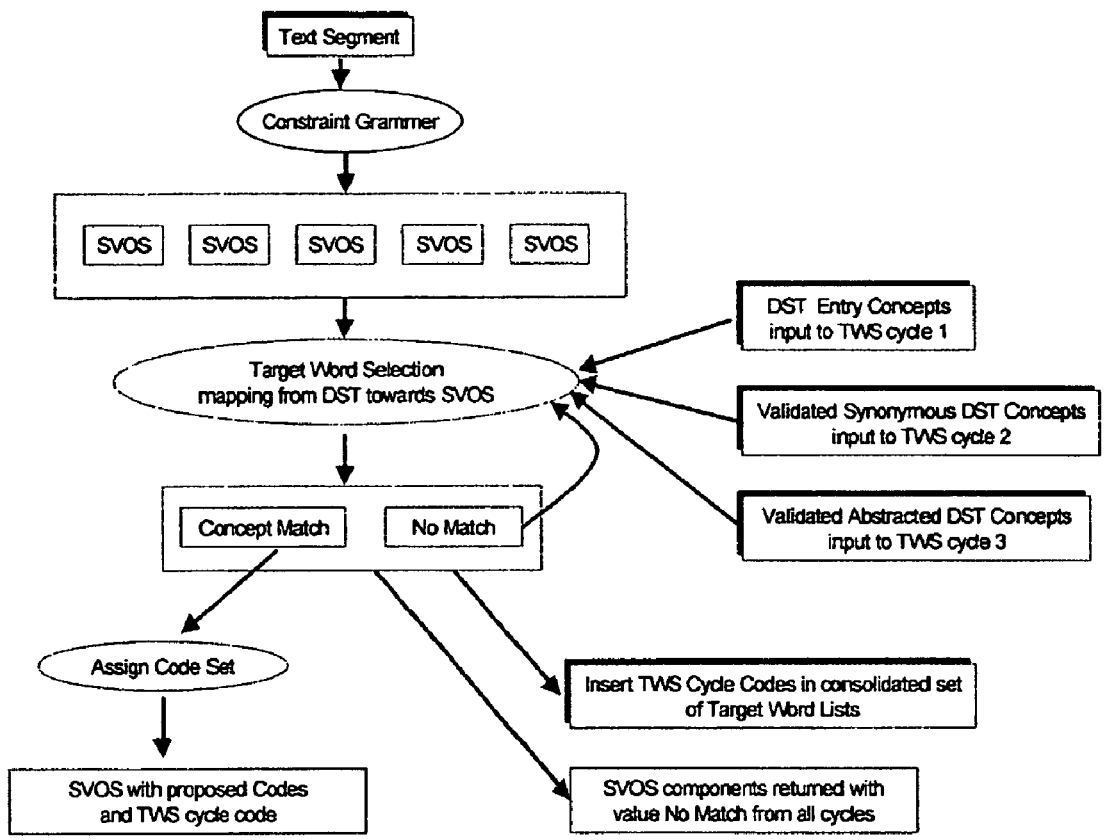
FIG. 8 shows the process of establishing proposed domain codes.

The Target Word Lists are used in a process aiming at assigning Domain Codes to the SVO-triplets, which after a validation procedure is attached to the SVO-triplet transformed to an APO-triplet. SVOS is a structure encompassing the set of SVO Triplets and APOS is a structure encompassing the reduced set of APO Triplets referencing the corresponding subset of SVO Triplets. The APO Triplets referring to sentences in the text are part of a larger representational unit denoted as Theme Representation. The Theme Representation keeps record with links to all Documental Logical Object Types referred to by the theme representations. The Target Word Selection cycles with Domain Code assignment is outlined in FIG. 8 and in table 3.

TABLE 3

CG Tagger Output

Parse text and identify syntactic elements and grammatical functions within sentences.
Type: Grammatical Information
<Output from process> Process: Text Disambiguation
<Is derived from> Type: CG Tagger Output
<Is abstracted into> Type: Grammar Pattern
<Is assigned to> Type: DLOT Word
Type: Grammatical Function (GF) <is a>
Type: Grammatical Word Class (GWC) <is a>
Sentence Selection & Analysis Select and retrieve sentences that are linked to the SVO components.
Type: DLOT Word
<Is a> Type: Documental Logical Object Type (DLOT)
<Is part of> Type: DLOT Sentence
<Is a> Type: DLOT Token
Type: Frequency Information <refers to>
Type: Grammatical Information <is assigned to>
Type: SVO Triplet <refers to>
The grammatical information derived from sentences is abstracted into a set of Grammar Patterns (constellations of regular expressions).
Type: Grammar Pattern
<Gives rules for> cat5 fac0 Subject Matter
<Gives rules for> Type: Search Macro
Type: Grammatical Information <is abstracted into>
Type: Regular Expression <is part of>
Extract SVO Triplets (SVOS)

Each component in a SVO Triplet is associated to the word units and each SVO Triplet is associated to the underlying sentence from which it is derived. The nouns and verbs in SVO Triplets are in addition stored in separate word TABLE 3-continued lists. These words are subset of the total set of words marked as certain grammatical word class in the CG tagger output file. The separate word lists are used in frequency calculations (noun and subject, noun and not subject, etc).
Type: SVO Triplet
<Is input to> Process: Target Word Selection (TWS)
<Is extracted from> Type: DLOT Sentence
<Refers to> Type: DLOT Word
Type: APO Triplet <is derived from>
Type: SVO Entry Noun <refers to>
Type: SVO Entry Verb <refers to>
Type: SVO Entry Noun
<Is subset of> Type: GWC Noun
<Refers to> Type: SVO Triplet
Type: Domain Code <is proposed for>
Type: Target Word <is applied on>
Type: GWC Noun
<Is input to> Type: Filter Noun
<Is a> Type: Grammatical Word Class (GWC)
<Is part of> Type: GWC Nominal Expression
Type: GWC Noun Common <is a>
Type: GWC Noun Proper <is a>
Type: SVO Entry Noun <is subset of>
Type: SWC Noun <refers to>
For later search macro construction and files of phrase collections Systematise the linguistic patterns underlying the selected SVOS and specify grammar based search macros covering these (combinations of regular expressions as search operands).
Type: Regular Expression
<Is part of> Type: Grammar Pattern
<Aspect of> Type: DLOT Sentence
Target Word Selection cycle 1

Apply Target Word List (TWL) for cycle 1 . These are the target words to be searched for in the sentence from which the SVO triplets are derived. Current target words to be search for are fetched from this list.
Type: Target Word DST
<Is a> Type: Target Word
<Is derived from> Type: Thesaurus Domain Specific (DST)
<Is member of> Type: TWL 1 Validated
Type: TWL 1 Validated
<Is input to> Process: TWS cycle 1
<Is a> Type: Target Word List (TWL)
<Is derived from> Type: Thesaurus Domain Specific (DST)
Type: Target Word DST <is member of>
Concept Match: Identify and record matches from cycle 1

Assign and record a pair of codes for each concept match.
Type level description of concept matches:
Type: Value Concept Match <is assigned to> Type: Target Word
Type: Domain Code <is a property of> Type: Target Word
Type: TWS Code Cycle <is assigned to>
[Type: Domain Code <proposed for> Type: SVO Entry Noun]
TWS1 is a code attached to all domain codes assigned in the Target Word Selection Cycle 1.
A word in a SVO Triplet may match with concepts from several domain specific thesauri or concept clusters. In this case, also assign a code for the DST used.
Register all matches at end of cycle 1
No Match Return the value 'no match' for each word in the SVOS not matching any of the concepts in the domain specific thesauri.
Type: TWS Code Cycle <is assigned to>
[Type: Value No Match <is assigned to> Type: SVO Entry Noun
Register all non-matches at end of cycle 1
Target Word Selection cycle 2

Apply Target Word List (TWL) for cycle 2. These lists of synonyms are categories of target words to be searched for in the sentence from which the SVO triplets are derived.
(A category is a list of search operands separated by OR).
Current target words to be search for are fetched from this list.

TABLE 3-continued

Type: Synonym GT
<Output from process> Process: TWS cycle 1
<Is a> Type: Target Word
<Is derived from> Type: Thesaurus General (GT)
<Transformed into> Type: TWL Synonym Target Word DST
Type: TWL 2 Validated
<Is input to> Process: TWS cycle 2
<Is a> Type: Target Word List (TWL)
Type: TWL Synonym Target Word DST <is member of>
Concept Match: Identify and record matches from cycle 2

Same as for cycle 1. Current target words are fetched from
the list of synonyms. TWS2 is a code attached to all domain
codes assigned in the Target Word Selection Cycle 2.
Register all matches at end of cycle 2.
Register all non-matches at end of cycle 2
Identify and record co-occurrences within document or
sections of document: Proposed Synonym
Codes co-occurring with codes referring to DST Entry
Concepts are identified through assigned TWS
Code Cycle (TWS1 and TWS2). Input to thesaurus
construction/expansion.
Target Word Selection cycle 3

Apply Target Word List (TWL) for cycle 3. These lists
of abstracted concepts are target words to be searched for in
the sentence from which the SVO triplets are derived. Current
target words to be search for are fetched from this list.
Type: Concept Abstracted GT
<Output from process> Process: TWS cycle 1
<Is a> Type: Target Word
<Is derived from> Type: Thesaurus General (GT)
<Transformed into> Type: TWL Abstracted Target Word DST
Type: TWL 3 Validated
<Is input to> Process: TWS cycle 3
<Is a> Type: Target Word List (TWL)
Type: TWL Abstracted Target Word DST <is member of>
Concept Match: Identify and record matches from cycle 3

Identify and record all concepts from the TWS Lists not
matching for each TWS cycle. For each TWS cycle, make an
organised list of all concepts encoded in the Target Word
Lists that did not match with any of the words in the SVO
Triplets.
Report on all variations of the set of code assignments
({DST entry concept, synonymous concept, abstracted
concept} AND TWS Code Cycle).

Apparatus for Zonation

Figure 9:
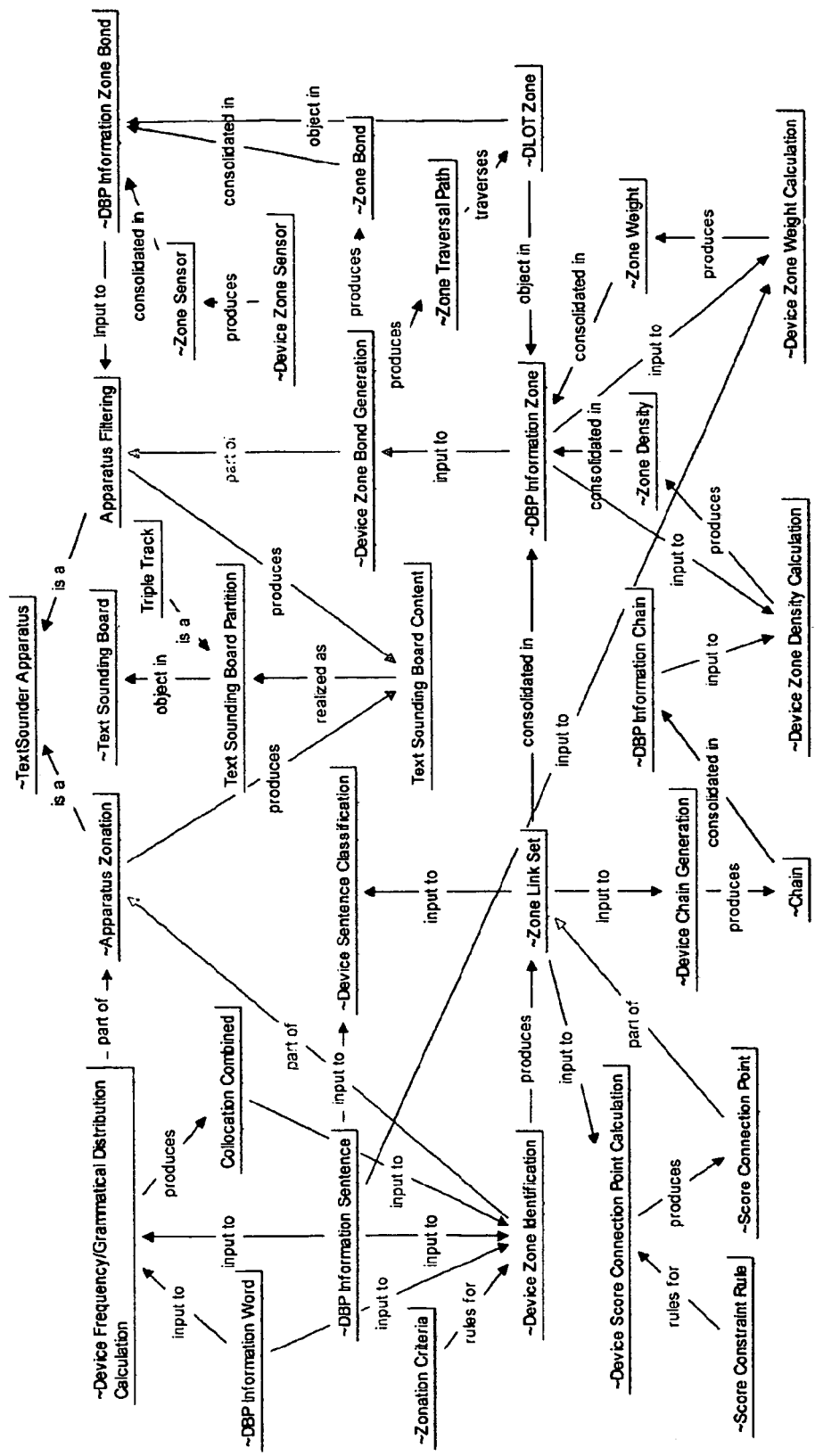
FIG. 9 shows a schematic representation of an apparatus for zonation.

Text zones constitute a fundamental attention structure and are considered as derived Documental Logical Object Types (DLOT). The apparatus delivers compound information resulting from the application of a set of zonation criteria or specifically a set of rules directing the operations performed on the underlying database partitions. The apparatus or module embodies a method and system for text zone identification and incorporates several interconnected reflecting the underlying zonation criteria, which influence the 'importance' assigned to sentences and words in the underlying annotated texts. FIG. 9 outlines the interconnected devices in the zonation apparatus.

In particular the devices generate:

A device that produces combined collocations revealing the set of patterns combining frequency and distribution data with various types of grammatical information attached to each word occurrence. The present invention divides the set of patterns into patterns for the words' lexical features, the words' grammatical class, the words' grammatical form, and for words' syntactical function. The links sets generated for pairs of sentences conforming to these patterns are transmitted to a device that intersects the link sets with reference to the words' identifiers. The device relates to a method performing zone adjustment in which the zones' borders are strengthened. Zones embed other zones and zones are overlapping with reference to the multitude of zonation criteria. Information about the zones is preferably presented in the text sounding board with a set of options that reflect the multiple perspectives overlaid on the pairs of sentences encoded in the zone link sets. The user, being engaged in exploring and investigating text portions, can by applying these options shift her focus of attention and accordingly navigate to text portions reflecting the criteria she activated.

A device calculates cohesion relations between each sentence and all other sentences in the text. Zones determined solely on cohesion relations have weak 'discontinuity borders' and are overlapping. The present invention embodies several devices that strengthen zone borders and zone weights with reference to the multitude of zonation criteria and constraint rules.

A particular device extensively exploits grammatical syntax information related to nouns, and preferably nouns contained in lists of focused words and list of words determined to be of importance to the user community (inventory lists, archive codes, keywords, etc.). In particular the device utilises TAM information (tense and modality) related to verbs in the first verb position following nouns in the syntactic subject position in sentences within text zones. Grammar based request patterns (tuned extraction procedures) identify the relevant syntax information applied in the text zone identification procedure. The device generates the underlying data set to be exposed in the triple track, which is embodied in the text sounding board, preferably in a separate 'modus operandi'.

A device embodies a method for the identification and annotation of important words, preferably as related to requirements in a user community, and cue phrases, which are classified as lexical signals for elements in discourse models, in the following, denoted as discourse elements.

A text zone may in exceptional cases consist of a single sentence if the sentence contains words classified as 'important words', or classified as central 'cue phrases'.

The zonation procedure compares pairs of sentences, and like in any classification the procedure iteratively and for each round (or in parallel) addresses different features, aiming at identifying 'resemblance in some features between sentences otherwise unlike'. The resemblance determined for text zones is however not only based on word stems (often seen as the unit in known approaches). The zonation procedure in the present invention rests on several types of information produced by pre-processing devices. The pre-processing stages are preferably implemented as separate devices in order to regulate costs (cost-performance-benefit issues in different user communities).

Whatever zonation criteria applied, as text zone is defined as a bundle of sentences with two sets of properties:
1—The set of properties shared by a pair of sentences, and
2—The set of properties not shared by a pair of sentences.

In the present invention, the concept 'properties' does not only refer to lexical properties, but also includes properties related to grammatical form, semantic word classes, and cue phrases indicating discourse elements. The set of zonation criteria defines the rules and guidelines applied in order to determine the properties shared by a pair of sentences are, each property set realised in separate zone link sets and chains. Chains are realised as inverted lists of pointers to the sentences classified according to the criteria. The surrogates or 'link sets' defined over the criteria will of course reveal how pair of sentences differs from each other, and taken together a particular device calculates connection points between each pair of sentences in the underlying text. The zones generated embody a structure in which zones identified and marked according to one set of criteria, enclose other zones or overlap with other zones identified and marked according to another set of criteria.

The intersection of zones based on various criteria reveal attention structures that are not immediately available on the text's surface level. The attention structures to a certain extent realizes the intuitive impression one experiences when reading a text—some sentences 'belong together' and at some location the next sentence 'for some reason' is perceived as detached from the preceding sentences. The reference to 'intuitive impression' refers to modern accounts of the concept denoted as 'text coherence'. Textual coherence is taken as an interpretative notion and occurs during the interaction between the text and the reader of the text; see also the section 'The principle of text driven attention structures'. A particular reader may conceive two sentences as 'belonging together' even if they do not share some lexical features, i.e., as defined by lexical cohesion.

For example, given that two adjacent zones are separated due to discontinuity in lexical cohesion features. These two zones may however be similar in other respects. The other type of 'similarity' can be related to bundles of words in a particular grammatical form. Stretches of sentences including adjectives in comparative or superlative form may for example indicate some sort of evaluation or comparison, and taken together with the verbs' tense and modality (TAM) this may well be the 'similarity feature' apprehended by the reader. Consequently, different types of lexical cohesion do not, in isolation, constitute an adequate set of criteria for the construction of attention structures. Readers may perceive and interpret sentences as related based on other features than repetition, or semantic substitution of lexical elements.

Zonation is quite different from segmentation, which denotes the procedures aiming at identifying the structure in a document, i.e. the identification of the documental logical object types and their interrelated arrangement within the document. The zonation of a text is a complex structure of interdependent text spans whose distribution, relations and properties are determined by the similarities between text constituents—sentences and words. Text is one out of many different documental logical object types and the present invention addresses in-depth processing of textual content.

Zones are text areas where lexical chains intersect and where there are bundles of members from each lexical chain. Data about intersections and bundles form a transparent layer of sentence links superimposed on the text. The data is transformed to a representational format and displayed in special-designed interfaces admitting the user to get preferably clarifying impression of the texts' surface.

Certain textual areas are distinguished from surrounding areas and separate elements within the zones can be used as navigational aids to other zones. The textual elements (sentences and words) and their structural relationships are brought to the surface in a text sounding board together with options for text exploration and navigation. The text sounding board is a kind of 'textographic' map showing the way to text spans with certain features conforming to the zonation criteria.

Device Frequency/Grammatical Distribution Calculation

Methods and systems for the computation of collocations are known in the prior art. The device included in the present invention generates col locations combining frequency data and grammatical information attached to each word occurrence. The DBP Word Information is input to the device that produces these combined collocations that are stored and managed in the Intermediate Layer of MAFS. The computed collocations are utilised as support in the apparatus that generates attention structures. The files uncover which grammatical request patterns that are the most favourable in the various sets of text. There is a very wide spectrum of grammatical request patterns, and it is assumed that performance will benefit by knowing in advance which of these patterns to activate, and preferably also in what order since results from one pattern are transmitted to another pattern via intermediate files.

Prior to the generation of attention structures, the collocation files thus provide useful information regarding the activation of grammar-based sets of request patterns. Each set of request patterns is defined with respect to a search intention.

In the example denoted as 'Pattern—modality associated with the word 'company', the collocation file tells that the request pattern in the forms below, should preferably be iteratively applied with the distance operator from 1-3 to the left or right (distance operator is embodied as 'open operator' that iteratively can be adjusted). The captured phrase occurrences with the modal verb 'shall' in the first or second position to the right can be given a higher weight with regard to the rhetorical interpretation of 'obligation' (depending on the sender of the document as encoded in the document's Dublin Core Element set).

[((modal verb AND verb present)<distance-right='open operand'>(noun='company'))] or the pattern

[((modal verb AND verb present)<distance-left='open operand'>(noun='company'))]

The process of calculating frequency and distribution and according to grammatical information can be further specified into subsets as to what logical object types they are to cover for.

DBP Information Sentence

Sentences are the main logical object types DLOT) processed by the present invention. The Device Sentence Extraction fills a file in MAFS with information extracted from the set of annotated sentences. The files with sentence information are populated with output from several devices performing various processing tasks. These files are consolidated in the database partition DBP Information Sentence.

The set of attribute types attached to the documental logical object type sentence, is denoted SATOT, including the set: {Identifier Sentence, Sentence Class, Sentence Density, Sentence Descriptor, Sentence Length, Sentence Length GC, Sentence Length GF, Sentence Length GC Relative, Sentence Weight {Word Set ID}}.

In the database, different types of information about each sentence and the set of sentences (intratextual and intertextual) are consolidated over the Identifier Sentence (normal key propagation). The database partition containing information about sentences is interlinked with the DBP Information Word Occurrence via the identifier given for the set of words being registered constituents of a particular sentence. The DBP Information Word is filled with data generated by the majority of the devices, and where data intermediary are stored in MAFS before they gradually are consolidated in this particular DBP. The DBP contains all information applicable in the construction of attention structures and the construction of portions transmitted to the panes in the text sounding board. The information about each word in a sentence includes at minimum: Identifier Word, Word Grammatical Class (GC), Word Grammatical Function (GF), Word Length, Word Lemma, Word Position Relative, Word Reading, {Word Semantic Code}, Word Stem, Word Weight}. This particular attribute set attached to the documental logical object type 'word' is denoted WATOT 'wrapped' by SATOT via common key propagation. The DBP Word Information Occurrence is further processed in a device that generated combined collocations (frequency and grammar based information). The information is consolidated to an upper lever denoted as DBP Information Word. The DBP approach follows accepted DB design methodology known in the prior art.

Device Zone Identification

The present invention embodies an apparatus for identifying text zones that support the selection of and access to portions of text for explorative traversal and navigation. The zones are bundles of sentences that support the exploration of text when a user seeks to get aware of its 'aboutness'. The main procedure for zone identification, which in its basic form is a kind of cluster analysis, is preferably adequately carried out without needing access to general thesauri.

The text zonation procedure bears some resemblance with known procedures for text segmentation, and literature on this matter very often cites a multitude of research reports addressing the issue of lexical cohesion underlying a segmentation algorithm. Several of the reported applications of text segmentation typically focus on the identification of segment boundaries.

The approach underlying the present invention differs from reported approaches in several ways. First of all, the devices are not related to approaches aiming at identifying structural text segments correlating with the author's segmentation of text into sections, paragraphs, or other units that may be encoded with structural codes (e.g. in XML). Secondly, the devices are not concerned about reaching a result in which all sentences in the text are constituents of a text segment and where the segments are seen as contiguous. Thirdly, the aim is not to localise text segments in order to select a set of sentences or salient topical markers that are consolidated in a kind of text summary.

The purpose is first of all to identify certain areas in the text in which there are 'more lexical cohesion than in other areas' and where there at the same time are other specific types of markers and connection between sentences. The assumption is that by capturing text zones with features as specified in the set of criteria, these zones will serve users that for some task-related reason have to explore, read and interpret the texts. Particular devices direct the users' attention to these areas not only because they various zones indicate thematic shifts, but also because the zones reflect a kind of thematic density. Particular devices generate traversal bonds between zones with specific features and these features are made concrete and offered to the user in a set of predefined search operands, preferably displayed in the text sounding board. When the user navigates along these bonds this may cause her to get aware of central themes and also as intersected with sub-zones indicating for example discourse elements in a text. Areas with 'more lexical cohesion' than other areas and with a zone density above a certain intratextual threshold value, will indicate that the words in lexical chains passing the zones are not only mentioned once but actually form a part of the theme dealt with in the zone. Thematic continuity and thematic discontinuity and other types of continuity and discontinuity are the main issue in the present invention's device for zonation. The particular issues are elaborated in the section 'Zonation Criteria'.

The Zone Identification Device, in its plain form, requires that the text is pre-processed by at least a POS-tagger and that the words in the annotated files also are normalised into lemma form. The preferred embodiment of the present inventions rests on texts pre-pre-processed by a Constraint Grammar tagger (CG-tagger) known in the prior art. The database partition 'DBP Information Word' contains a wide range of grammatical information attached to each word occurrence, and in addition several attribute types containing derived values, i.e., output from other devices. The device operates on the constituents of the documental logical object type Sentence, and the device requires no other types of structural information about the text.

Information about plain lexical cohesion points for each sentence pair in the text is registered in a diagonalized matrix stored in MAFS, which other devices access and manipulate along several dimensions. Since each sentence is compared with all the other sentences in the text, the matrix will also represents 'long-distance' similarities between sentences. During the plain zone identification (a cluster analysis performed on grammatically derived information), several types of information about the sentence similarities are registered in particular zone link sets and these files are further processed in weighing procedures in accordance with the various types of zonation criteria. The zonation procedure is preferably tuned according to text genre.

A previous examination of governmental reports revealed that the number of chapters and number of sentences within each varied greatly. The number of chapters varied from 4 to 27, and in some extreme cases, the number of sentences in individual chapters varied from 3 to about 1250 sentences. This certainly calls for a device that calculates intratextual threshold values applied in the zonation procedure. It is not possible to apply the same threshold values for extraordinary long text and for extraordinary short text. It is important to note that a chapter that contain only 3 to let's say 15 sentences, in the case of governmental report, usually contain important sentence, i.e., the sentences mediating the solution proposals or solutions selected (decisions). The device for text extraction is specialised in that it delivers information about the 'short chapters' because these chapters are a good starting point for determining central themes in the report. The reason for this is obvious—the words and phrases in sentences mediating the governmental focus may strongly indicate superordinate subject matter. However, seen from the perspective of users confronted with these texts with reference to some instruct, it may well be that other parts of the text are of more value, as for example the counter arguments mediated on the behalf of other actors. Conflict and disagreement as reflected in language use is often under-communicated, and for user communities of for example lawyers, indicators of oppositions are of high value. Typical foreseen user needs ground the emphasis given to an apparatus for zonation which embodies a method and system capturing both thematic fluctuations, grammatical patterns, indicators of discourse elements, and intersected with word lists containing information about for words and phrases judged to be of importance in the user community.

An important device in the apparatus for text zonation is the device for calculation of scores or values assigned to each of the connection points between sentences. A connection point has a compound identifier, the identifiers of the two sentences compared. A set of score constraint rules are regulating the calculation device according to parameters such as language, text genre, text length text annotations, statistical text features (average sentence length, number of sentences, etc). The constraints applied cause a tuning of the procedure, and preferably these tuned versions are documented in the IRMS. The documentation of any tuning of any of the devices are essential for reuse and the ability to pick 'the right tool set' in each situation involving a new document collection (text genres) and user community. The calculation of score for connection points between pair of sentences can for instance be strengthened for words that belong to certain grammatical classes or words or concepts that previously are registered in a User Profile. The calculation procedure preferably extracts a set of rules from the rule set specified as Zonation Criteria. The rule set denoted as [Criteria Pragmatic User Profile Spin-Off] gives a prescription of how to extract words or concepts from a User Request previously ascertained as convenient by a user or user group.

DLOT Zone

A zone is a derived documental logical object type. A zone is defined as a text span consisting of at least two neighbouring sentences with a connection score above a certain intra-textual threshold value. A zone may also embed subzones according to specialised criteria such as thematic variations, grammatical information, discourse elements, important words, etc.

Zones are considered as horizontal virtual layers superimposed on the underlying texts and visualised in accordance with certain rules directing a preferred ergonomic display also taking into account modern principles of HCI.

A zone as seen in the present invention, may include 'in-between' sentences without the lexical cohesion property. These sentences may however relate to the surrounding sentences according to other criteria. That is, the present invention departs from the issue of contiguity. A zone is a text partition or area created for a particular purpose—or in other words—a zoned text span (sentences) being distinct from surrounding or adjoining parts (sentences). The zones can be said to have an 'aboutness' and this 'aboutness' may appear in other zones (with short or long distance between the zones). The other zones, not necessarily adjacent zones (or sentences in between zones), may reflect the same or related thematic issues and at the same time reflect thematic discontinuity. In addition there may be 'extraordinary zones' characterised by having no connection points between adjacent or near-adjacent sentences, and possibly without 'long-distance' similarities. Such extraordinary zones' can for example signal quotes in different languages, or quotes from particular genres as laws, etc. In the present invention zones are a kind of 'text block' and when realised as a special-designed focusing device, the zones provide a 'window onto text contents' and gives the user a possibility of getting aware of the 'aboutness' of text.

A zone is defined as a text span consisting of at least two neighbouring sentences with a certain degree of connections between them (including lexical cohesion features). The present invention's concept 'zone' is not related to the more common concept of 'text segment', which normally are considered to form contiguous parts of a text. A multitude of research reports describes cohesive lexical links as manifested through lexical repetition, lexical substitution, co-reference, paraphrasing, etc. The present invention does not impose the restriction that the zones have to be connected along a boundary or at a point or that the bonds generated between them follow a certain sequence. Zones are identified across sentences and some zones may match author-determined logical object types as paragraphs and include or do not include section headings. The match between zones and author-determined segments in a text is not an important issue in the present invention.

Zone Link Set

The files denoted 'Zone Link Set' contain the link sets for all sentences processed in the device for Zone Identification. When the scores are calculated, weighed and tuned, the files are consolidated in DBP Information Zone.

A particular interconnected device computes connection points between sentence 'S' and 'S+1' as CP (S, S+1), where S ranges from 1 to the number of sentences extracted from the text (eof) minus 1. A connection point is the score for number of words in each sentence that is related to words in other sentences and according to the score specifications given in the set of zonation criteria.

Each point CP (S, S+1) is a candidate for a zone border, and a particular device examines the scores (weighing scores) before they are transmitted for further processing.

S is a variable-length vector listing the word's position within a sentence, the word, the word's lemma, grammatical information, and other types of information depending on the zonation depth (for instance the word's semantic category or codes referring pragmatic criteria). The scores for the connection points are recorded in a diagonalized matrix for each text.

For example:

((Sentence-ID=23) {(pos-1, government, government, noun singular, det, subject), (pos-2, disapprove, disapprove, verb present, _), (pos-3, Statoil, Statoil, noun proper, object)})

((Sentence-ID=24) ((pos-1, Statoil, Statoil, noun proper, subject), (pos-2, disapprove, disapprove, verb present, _, (pos-3, government, government, noun singular, det, object)})

SCORE (23, 57)=5 (two sentences that are not adjacent, but with registered similarities weighed according to the zonation criteria.

1 for government +1 for Statoil, 1 for disapprove, and +1 for verb in the present, +0.5 because government is in the subject position in sentence 23 and in the object position in sentence 24, +0.5 because Statoil is in the object position in sentence 23 and government is in the subject position in sentence 24. The value 0.5 is a simple weight measure. Each class of criteria includes simple rules for adding weight to the scores (scores for each connection point). In this example the weighing rule is shown as simply adding values to the connection point's score depending on criteria. For details, see section 'Zonation Criteria'."

Identifier Zone

A zone identifier is compound and consists of the edge sentences' identifiers, i.e. the first and last sentences in a zone.

Zone Border

A zone border indicates a transition point or a 'discontinuity' between one zone and adjacent zones, or between one zones and enclosed zones, i.e. sub-zones, or overlapping zones.

DBP Information Zone

Zones provide 'virtual horizontal windows' superimposed on the underlying text and reflect aspects of the texts' features under the notion that text is an interpretative medium.

The DBP containing Zone Information encompasses all relevant information about the zonation criteria applied during processing of particular texts. For each zone, the system registers the sentence identifier and the number of sentences in the zone (frequency measure used in one of the filtering options). The DBP Information Sentence is interlinked to the DBP Information Word Occurrence. The DBP Information Zone includes all information applied during the generation of zone traversal paths, i.e. bonds that interconnect zones according to preferably user specified criteria. The DBP provides the basis for identifying what's new in a zone as compared to a preceding interlinked zone (Zone Traversal Path Default) or between two zones 'preceding each other' according to user requests (Zone Traversal Path Adjusted). The files with zone link sets are consolidated into this DBP, which is vital for the filtering options that regulate the content displayed in the text sounding board.

Device Zone Density Calculation

This particular device calculates the density of each chain crossing each Zone.

The density of a chain in a zone is defined as: the number of members (word occurrences) from a chain appears in a zone divided by the number of members (words) classified as belonging to one of the four grammatical classes appearing in the zone. The density measure can preferably be further constrained so that it reflects only those words that are in the same grammatical class as the words being a member of a lexical chain.

The density is calculated for each chain in each Zone. If the text is short or if the device for zone identification produces few or no zones, this device can be adjusted to sentence level (sentences are constituents in a zone). A zone sentence has (of course) the same identifier as initially assigned to the 'DLOT Sentence' and the number of sentences between first and last zone sentence is a derived value. The Sentence Length GC contains data about the number of words within each grammatical class appearing in each sentence.

A zone sentence is input with connections described as: Zone Sentence: is a> Sentence Class, <is derived from> Zone Border, Zone Sentence First <is a>, Zone Sentence Last <is a>, in which Zone Border: <is derived from> DBP Information Zone, is input to> Device Target Word Selection (TWS), Zone Proximity <is derived from>, Zone Sentence <is derived from>, and where Frequency Sentence Level: <is consolidated in> DBP Information Sentence Consolidated, <is subset of> Frequency Text Level, Device Frequency/ Grammatical Distribution Calculation <produces>, Frequency Zone Level <is derived from>, Sentence Length Average <is part of>, Sentence Length Standard Deviation <is part of >.

Zone Density

Each Zone Identifier is linked to a vector (inverted list) containing data about the density of each Lexical Chain intersecting the Zone.

Zone Identifier {Lexical Chain Identifier, Zone Density}.

The Zone Density can be further weighed by including a measure for Text Density. Text Density is defined as the Lexical Chain Length divided by the sum of Sentence Length GC.

The vector (one for each Zone Identifier) including the Lexical Chain Identifier makes it possible to identify crossing chains within a zone as well as the chains zone density. In addition it will be possible to identify the appearance of 'new chains' in an adjacent zone thus indicating a thematic shift. When the user navigates from one zone to the next zone, the 'new information', as compared to the chains intersecting the preceding visited zone, may be marked (for instance by simply increasing the intensity factor (I) in the preferred colour display scheme.

Zone Proximity

Zones as marked by zone borders, which are defined by the set of edge sentence identifiers, are in the proximity of each other in different ways as listed: Zone A<encloses> Zone B, Zone A<within> Zone B, Zone A <overlapped by> Zone B, Zone A <overlaps> Zone B, Zone A <follows> Zone B, Zone A <precedes> Zone B, Device Score Connection Point Calculation The frequency and distribution data are calculated for content words (covering the grammatical word classes noun, adjective, verb and adverb). The set of words classified as 'Important Word' is preferably applied for the purpose of adjusting the zone borders that are automatically determined in the first round of the zone identification procedure. A specific device calculates the connection score for each pair of sentence in the text. A set of constraint rules regulates the score calculation process. The specific set of rules applied depends on criteria such as: text length (number of sentences, average sentence length), text genre (law, report, etc.), grammatical information (word lemma, word stems or word reading), language information, and stop lists applied (the latter depends on language). Tuning of the score calculation by applying various sets of constraint rules is essential in that for example one set of constraint will perform satisfactory for long texts such as reports, but will yield a low performance on short texts or texts belonging to a different genre. The constraint rules specify weighing functions with reference to grammatical information, e.g., matches between nouns in pairs of sentences are given a higher score than matches between high-frequent adjectives, and so on.

Each sentence has assigned a Sentence Identifier (part of the Attribute Type set attached to sentences defined as a documental logical object type (DLOT). The sentence identifier is compound with its first element inherited from the text from which it is extracted. The first sentence in a text (with a Text Identifier) is assigned the serial numbers so that the identifier reflects the sentences' relative positions within a text. The score for connection points between sentences is calculated for each pair of sentences in the text. That is, the first sentence is compared with all other sentences. The device generates individual matrixes and a matrix containing the consolidated scores for each connection point. The criteria applied in the zonation procedure determine the calculation of the connection points, some scores reflect lexical cohesion features, other scores reflect grammatical information such as word class and word form, and others reflect methods applied for marking discontinuities.

The score identifier is the sentence identifiers for the pair of sentences processed, thus the score identifier for the pair of sentences 1 and 2 is (S1, S2). SCORE (Current S, S+1 (until EOF)). Increment Current S (get next sentence while not EOF).

Device Zone Weight Calculation

The device for the calculation zone weights operates on the DBP Information Word (related to the DLOT Word). The importance of a word (or phrase) contained in a text is determined first (importance is calculated based on frequency information and weighing functions, both calculated intratextually and then consolidated intertextually). The weighing function takes into account the notion of words unifying the text (general and high-to-medium frequent words), and diversifying words (specific medium-to-low frequent words). The weighing function also takes into account the distance between words being general and specific words in cases where the specific word is a concatenated word and its constituents are related to neighbouring general words. The weighing function operates iteratively on DBP Information Word and words with certain syntactic functions, or other types of grammatical information, can be assigned a higher weight as a preferred reduction strategy influencing the content in the text sounding board.

If the text is short or if the device for zone identification produces few or no zones, the same weighting function may be applied at sentence level. The rules for calculating weight follow the guidelines as specified for the zonation criteria.

Zone Weight

Some chains (lexical or grammatical) are assumed to be 'stronger' than others. The present invention includes a device for calculating the zone weights based on the notion that Zone Density combined with Zone Distance preferably will support options for the generation of Zone Traversal Paths. The calculation operates on data derived from the Zone Density file. The Zone Identifier is composed of the identifier of the first and last sentence in each zone. The distance between Zone-1 and Zone-2 is therefore the distance between Zone-1-Last and Zone-2-First (sentence identifier is the sentence number within each text), Zone-2-Last and Zone-3-First, and so on.

Zones with high density with respect to an intersecting chain and low distance to the next zone (with a density value for the same lexical chain) indicate the weight to the word on which the lexical chain is based. The weight reflects chains (with many members) intersecting zones that appear close to each other (see Zone Proximity).

The present invention applies the weighing function on a derived documental logical object type, i.e., sentences interlinked through the identification of connection features, including lexical cohesion, grammatical information, and preferably semantic information and information reflecting pragmatic criteria, thus forming discontinuous and overlapping groups of sentences denoted as a text zone.

An important point to be made about zone weight is that they support text exploration as an inside-out navigation. The 'inside' is the central parts of texts as marked out by the zones and their embedded sub-zones. The 'out' is the zones with lower weight or sentences that are not included in any zones. However, there is made an exception for important sentences in that they can constitute a zone based on the sentence's discourse features, i.e. of which some are related to the communicative acts that took place in the document's situational context.

Device Chain Generation

The device for generation of chains is interconnected with the device for identification of text zones, in which the latter transmits information about the zone link sets to the first mentioned device.

The content of the zone link sets naturally depends on the criteria applied during the zone identification procedure in that the content may vary in levels of exhaustively and specificity.

The application of the different classes of criteria depends on the availability of lexical resources know in the prior art, such as grammar taggers, domain specific word lists, domain specific thesauri, etc. Additionally and most important the application of the advanced options specified for some of the criteria, depends on a decision on whether the procedure is to be unsupervised (fully automatic) or semi-automatic with manual intervention (validation of semantic relations between words).

The present invention separates the set of underlying criteria due to cost issues. The more advanced criteria applied, the more resources required, including the need for manual intervention and validation.

The basic method for zone identification simply recognises lexical cohesion between words in pairs of adjacent sentences, and the words have to at least be annotated with tags for the four main grammatical classes, and preferably normalised into lemma form. This basic zonation procedure is not sufficient for the present invention's purpose of construction attention structures virtually superimposed on the underlying text.

The reason for this is that the basic method produces too large text zones with a low discriminating value. Some very high-frequent words, especially nouns and adjectives function as words unifying the text and influence the zonation procedure negatively. Words with these features are known to cause a failure of discrimination and this also applies to zones generated with reference to general words. In that several zones will have some or many of the same words assigned to their link sets, these words will not discriminate 'useful' from 'useless' zones with respect to the notion of attention structures. Attention structures are to reflect how the author's focus of attention moves across the text, and theses general words do not signify thematic variations or argumentative variations (discourse elements). The thematic and argumentative variations surround these unifying words and the present invention relates to a method for capturing these thematic and argumentative variations considered as overlapping sub-zones within zones (i.e. zones enclose overlapping sub-zones, see Zone Border).

The overlaps are not only detected with reference to word occurrences commonly organised in a continuum from very general to highly specific words (ref Zipf law of distribution). Particular devices also detect overlaps with respect to words classified as for example important words with reference to user communities, and zonation criteria based on grammatical information such as verb tense and modality, etc.

The generation of chains can be totally based on the output given in the zone link sets generated by a basic zonation procedure, that is, one chain for each different word (word type) that are registered in the zonation procedure. This will eliminate all words occurring only once in each text. Principally these word types (low frequency) will not be displayed in the text sounding board. However, exceptions are mentioned below.

If the zonation procedure operates on the word types and not their lemma forms, word types with a frequency of 1 will typically cover 40-50% of the word types, about 75% of the word types may have a frequency of 1 to 5 (Norwegian texts, governmental reports). However, attention must also be paid to these word types because they typically also include words that in the user's perspective may be the most specially searched for and accordingly in the user's perspective have a high discriminating ability, i.e. words that within the inner context diversify the language use of the author. Word types with a low frequency tagged with 'unknown' means that the word is either misspelled (not encoded in the lexicon), or it may be a 'new' word not registered in the lexicon. In the latter case the word type may be highly significant for a particular user. A programmed connection to lists of commonly misspelled words will support the identification of misspelled words. Iterative consistency check against a special designed domain, and genre partitioned corpus will yield the frequency profile in large collections, and gradually it may be possible to circle these possible significant words that preferably must be captured. For Norwegian texts (and other languages) a great many of the low-frequent words will be captured by a device that links the constituents of concatenated words to a 'core word' that is similar to any of the constituents.

When a user activates one of the word types displayed in the text sounding board, a device for visualisation in the text pane will pick up the current chain and highlight words registered in the chain. Most likely, some of the word types covered by the chains will be considered as more useful than others within a user community and consequently a device controlling a wide variety of filter options operate on the 'DPB Information Chain'. The filtering options or reduction strategies are made available to the user as buttons in the text sounding board.

Chain

A chain is defined as the interlinked set of word occurrences in a text sharing some specified features (word type (reading), lemma, syntax, form, relative position, etc.). At the lexical level, lemma is the preferred default representation form.

The Zone Link Set, from which the Chains are derived, contains information related to all grammatical classes that are involved in the zone identification procedure. The lexical chains are primarily based on the grammatical class nouns, but can be further restricted to a specific word (noun) appearing in the syntactical role as Subject.

Chain can also be formed on the basis on word collocations, for instance a specific adjective followed by a specific noun (within a specified distance), or a frequent occurring noun constellation, etc. See under Device Frequency/Grammatical Distribution Calculation.

The device for zone identification identifies and marks text zones based on author focused information, i.e., information which an author has communicated through the text being of potential interest to the user wishing to explore the text content by traversing the zones. The user can constrain the zone traversal by giving navigational instructions through several options offered in special-purpose panes preferably displayed in the text sounding board.

Information selected by a user is denoted as user requested information and the present invention registers the information in a User Profile. The user can reactivate a stored Profile when entering a new text in the collection processed and prepared for exploratory discovery. In this manner, the present invention supports a zone traversal according to the user's stored preferences. The user can edit or discard the stored Profile.

Identifier Chain

Each word participating in a chain has assigned a Chain Identifier, which is the Word Identifier of the first occurrence of a specific word in a text. This chain identifier is the access point to a file (inverted list) with entries for all members of a chain.

By using the Word Identifier of the first word occurrence in a text, information about sentences (nearest inner context) text (inner context) and document is 'inherited' through the identifier structure.

Chain Length

The Chain Length is defined as the total number of members in the chain. For chains formed on lexical criteria the chain length is based on the words' lemma, and differs from Word Frequency (See Frequency Word Level).

Another reason for separating Chain Length from Word Frequency data is that a chain may be edited (removal of members or expanding the chain with members via the establishment of semantic relations between words etc). Members can for instance be removed if the member (identified by word identifier) appears in a sentence classified as Sentence Marginal. Members can be added so that the chain reflects semantic relations between words. This means that the chain length will be the sum of the chain lengths of the words for which there is defined a semantic relation.

In many research reports of the prior art, long chains are claimed to reflect major topic in a text, and in addition chain length is used as a factor that contributes to a notion of 'path strength'. However, long chains in their simplest form is nothing else than a interlinked list of high frequent words, and have a very low discriminating ability with respect to the construction of options for text navigation or text exploration. It makes no sense to traverse let's say 550 occurrence of the word 'Hydro', (an oil company), because it is the surrounding words that give 'meaning' to the 'Hydro' occurrences. However a chain interlinking 'Hydro' intersected by a chain interlinking 'subject' (grammatical function), will provide for a substantial reduction.

In accordance with the concept of inner context, the chain length (either initial chain length or the length of an edited chain) is input to the calculation of Zone Weight. The Zone Weight however also includes the factor of distance between chain members. Closeness between chain members gives a stronger indication of themes or grammatical/semantic features in certain areas of the text. Or, in other words, the chain members' distribution pattern combined with the notion of text zones supports the text exploration facilities in the present invention.

The user may of course choose to navigate through all the sentences containing members of a Chain. Or the user may activate an option that only highlights words that are members of a particular chain. She will then get aware of the occurrences at the same time as she may select other options for the display of the high frequent word's nearest neighbours, and preferably within zones. The triple track can also preferably be used in order to examine the nearest neighbours of high frequent words that are classified as focused words, and preferably constrained to those annotated with the syntactical function 'subject' or 'object'.

DBP Information Chain

Content in the DBP Information Chain includes references to content in other DBPs: {Chain Identifier, Word Feature, Chain Length, First Occurrence ID, Last Occurrence ID, {List of Chain Members}}. The List of Chain Members is a vector (inverted list) containing the identifiers of the word occurrences. The Word Identifier is constructed as compound, i.e. the Sentence Identifier+Word Identifier+Word Relative Position (within sentence).

The DBP Information Chain makes it possible to trace all the words signing a theme and/or a feature in a text. The information is used when calculating Zone Density and the resulting file will yield information about patterns of how chains intersect each other within zones.

Intersection points that co-occur through the text may indicate main themes, and shifts in co-occurring intersection points may indicate thematic shifts. Chains that intersect these intersection points more 'occasionally' may indicate signs of a more fine-grained 'aboutness of the text', i.e. thematic nuances or other feature nuances.

Device Zone Bond Generation

The device for zone bond generation generates bonds, which are registered as links between the zones' link sets (long distance textual links).

An important technique for data reduction is to identify text zones implying that some sentences are classified as more important than other sentences in the text. Besides, it is essential to take into consideration the user's requests and these are preferably pre-processed and accordingly adjust the generation of zone bonds. Persistent or regularly occurring user requests are stored and managed in the DBP User Profile.

The present invention generates zone bonds based on mainly two kinds of input: Information derived from the DBP Information Zone and the DBP User Profile. If the bonds are generated only according to the information registered in the consolidated zone link sets, the present invention generates a default intratextual path (Zone Traversal Path Default), which may be further connected to form intertextual paths.

If the bonds are generated according to information derived from the DBP User Profile or directly from a pre-processed User Request, the Zone Traversal Path is adjusted to the user's preference (Zone Traversal Path Adjusted). For instance, if there is identified 45 text zones in a text based on the Zoning Criteria, the user will have the possibility to only visit, let's say' 10 of these zones that in some way match information given in the User Request.

Zone Bond

The concept of 'Bond' has a particular meaning in the present invention. Bonds are superordinate chains defined over zones or sentences that intersect several types of features as registered and assigned to the attribute types attached to the derived documental logical object type. The consolidated information is managed in DBP Information Zone. The nearest idea association is that of a 'track' or 'furrow' the user can follow when navigating through the text. If a user approves one of the generated Zone Bonds, she may store it as a part of her User Profile.

The concept of bond in the present invention is used differently form the use commonly seen in research literature. The concept is often used in order to describe certain types of cohesive features existing between two adjacent sentences.

Identifier Zone Bond

The Zone Bonds are generated dynamically. Each bond has associated an internal identifier, which is the entry point to a vector keeping track of the set of zones interlinked in a traversal path.

DBP Information Zone Bond

A particular device constructs bonds between text zones. The threshold value for bond establishment is determined intratextually, and several bonds may intersect each zone.

Bonds may be determined in advance (pre-processing of texts based on word occurrences in the text zones).

Bonds may also be generated dynamically based on input from the user wanting to explore the text content (pre-processed based on user focused information).

A bond is defined as sentences that are interconnected to other sentences and at least with and average connection score, preferably higher, and where each sentence are embedded in different zones ('long-distance links'). The input to the device for bond generation is consequently the database partition containing zone information.

Zone Sensor

The concept Zone Sensor denotes a wide set of filter options that extracts nouns from text zones (as registered in DBP Information Zone), arranges the nouns in order of frequency (or in order of first appearance or alphabetically), and/or in semantic classes (based on pre-specified criteria), and transmits the result for display in the text sounding board. The results are stored in an intermediate file, 'Zone Sensor' managed in the Top Layer of the MAFS. The Zone Sensor can accordingly operate on all feature sets registered and consolidated in the interconnected DBPs.

See section 'Zonation Criteria' and 'Apparatus Filtering'.

Zonation Criteria

Zonation denotes the process aiming at identifying and marking the edges of text spans in which bundles of sentences are arranged in zones. The zones are derived documental logical object types, i.e. they do not 'physically' exist in concrete terms, but they are present and can be identified by combining multiple surface signals, grammatical information, and information related to discourse elements. The apparatus for zonation embodied in the present invention requires annotated text files (ATF), at least including the mark-up of sentences and POS-tags. Preferably the zonation procedure shall operate automatically and unsupervised, but this on the other side depends somewhat on the availability of foundational resources that must be balanced in a cost—benefit perspective. Whatever supplementary resources available, the zonation is regulated by a set of clearly defined and applicable set of Zonation Criteria. The set of criteria incorporate a rather wide range of criteria that for the sake of clarity is grouped into four broad classes, here denoted as 'Grammar based zonation criteria', 'Semantic zonation criteria' and 'Pragmatic zonation criteria'. On the other hand, many of the individual rules relate to more than one class, especially they all are to some extent, related to the pragmatic class. This is due to the stance that the present invention emphasises the attainment of practical approaches but yet in balance with the principles of text drivenness and the quality of the attention structures generated.

The three classes, each with subclasses reflects initial concerns and spin-offs from empirical testing and validation. Some of the criteria assume background knowledge about the texts' domain, others relate to reflections on compositions of texts and variations with respect to text genres. The pragmatic approach is also influenced by experience in how texts are processed in relation to interpretative tasks as investigations, inquiries, etc., i.e. working methods prevailing in information-intensive organisations. The pragmatic approach is also inspired by reflections on the etymological aspects related to the word 'text'. 'Texture' can metaphorically be conceived as a 'weave of meaning' with closely interwoven constituents. The texture embodies items that are directly perceivable from the surface characteristics, and also items not being as perceivable as lexical signals. The latter group 'do exist' and therefore can be registered and captured by computer systems, and further manipulated so that the 'deeper structures of texture' are made more explicit and where visualisation facilities can make them appear at the surface level.

The present invention embodies a device related to a set of reduction operations applied iteratively on the database partition (DBP) with information about each word occurrence in the texts. The device exploits the frequency information and grammatical information consolidated in these files and from which the derived results are transmitted back to the next cycle involving the application of reduction operations. The final word lists are transmitted to a device for inclusion in the text sounding board, from which the user can explore the word sets organised according to the information exploited in the device for reduction.

Zonation Criteria Grammar Based

Zonation Criteria Grammatical are the criteria relating to words or the vocabulary of a language as distinguished from its grammar and construction, or relating to a lexicon or to lexicography. This class of criteria is further divided into two broad subclasses:

Criteria Lexical Frequency and Distribution

Information about each word's (canonical form and lemma form) frequency and distribution, both intratextually and intertextually, is applied in many of the devices embodied in the present invention. The 'importance' of a word (or phrase) contained in a text is determined by combining quantitative information (frequency, distribution, weight), grammatical information and semantic-pragmatic information.

Words that are classified as focused words, initially based on metric data can be chosen to affect the reduction strategies and may be used in order to constrain the zone identification (intratextually).

Criteria Lexical Cohesion

The input file (ATF) contains information about each word's grammatical class and its lemma form. This information is utilised in the plain zonation procedure that registers and calculates similarities between each sentence and all the other sentences in the texts. The result is transmitted to a diagonalized matrix in which each connection pint marks the score between each pair of sentences. The score is further adjusted and strengthened in accordance with many other criteria manifested as constraint rules.

Zonation Criteria Syntactic are the criteria relating to, or according to the rules of syntax or syntactics. Syntax denotes the way in which linguistic elements (as words) are put together to form constituents (as in phrases or clauses). Syntax information manipulated by the devices in the present invention is first of all related to nouns and TAM (Tense and Modality) and information related to verbs relative position in adjustable distances ('open operands') from nouns in the syntactic subject position in sentences. The present invention will preferably adopt advanced syntax patterns in sentences in accordance with results from genre specific tests and validations. The grammar-based patterns are applied iteratively in reduction strategies denoted as 'filtering options' being the building blocks directed by the apparatus for filtering. Testing and validation of advanced grammar patterns in various collections of genres are one of the most cost-driving factors.

The present invention rely on cyclic application of small building blocks transmitting the result to intermediary files that are examined and combined by particular devices which in turn transmit the results to weighing procedures and in the end transmits the result to partitions in the text sounding board.

Criteria Lexical Chain

When a text is parsed by either a POS-tagger or a CG-tagger known in the prior art, it is possible to fully automatize the generation of lexical chains that interconnects all repetitions of the same word type. It is preferred to apply a tagger that includes information about the words' lemma, which improves the zone identification procedure considerably. An automatic generated lexical chain does not aspects of the semantic relations between words that occur throughout a text. It is well known that authors, seemingly dependent on genre, tend to avoid repetition by using a variety of noun phrases (among others) to refer to the same notion. The present invention applies a specialised target word selection procedure in order to identify semantic relations between words that are in a near distance from each other. The point is not to define or declare explicit semantic relations between words, but to strengthen the zone borders, if necessary.

The criteria adopted and (pragmatically) adjusted in the present invention are commonly described in literature within the field of text linguistics. The theory postulates the general assumption that bundles of repetitions indicate a form of thematic unit.

Lexical chains based on lexical cohesion do reflect some of the words' repetition patterns (a lexical chain is in fact a distribution plot manifested as an inverted list containing the words' identifiers). The length of lexical chains is of course dependent on the text length, i.e., for short texts as texts, e-mails, memos, notes, etc.; it might not be worthwhile to generate lexical chains reflecting repetition. In this case the text will neither have any text zones that are distinguished from other parts of the text if lexical cohesion features are the only criteria applied for the construction of attention structures. There will always be some kind of connections between sentences in short texts, therefore one option is to accept zone sizes of for example only two sentences, and add a weight to the zone with reference to the text length.

A particular device examines the distribution of chains within a text, and determines their intersection points. Text exploration is promoted when the user follows one lexical chain or combines several chains during text traversal. In fact the identification of text zones is based on the same principle, but refined according to a wider set of criteria including in particular semantic-pragmatic aspects as for example related to the notion of discourse element indicators. A text zone can in its basic form be considered as a sequence of sentences in pairs intersected by several chains.

If two zones share two or several chain intersection points, this indicates a Zone Bond candidate. This accounts intratextually as well as intertextually (in the present invention with the assumption that one particular text is in some way is related to other texts with reference to situational context). See Zone Density.

The present invention utilises information registered for the chains and the discontinuity of chains. A discontinuity is simply defined as a point in the chain where one or a small set of sentences contains no chain words included in the current chain.

A chain discontinuity may occur within a zone, sentences in between the zone borders or between zones. A discontinuity of a lexical chain can in the outset be considered as one sign of change in the author's focus of attention or a departure of the theme. (Referring to the notion that a sentence can be considered as theme-opener or a theme-closer). If several chains share discontinuity points and other chains start at the same points, the indication of a move in the author's attention is stronger. In the case that a chain or a discontinuity ends at sentence S, OR begins at sentence (S+1), add the weight 1 to SCORE (S, S+1). Further detailed specifications are included in the program of the present embodiment of the invention.

Criteria Syntax

If a word (noun) is in the Subject position in sentence 'S' and in the object position in sentence 'S+1' (or adjusted to distance 2 or 3 between sentences), or vice versa, the weight 1 is added to the score of the connection point between the two sentences.

Constraint: The sentences should be adjacent or near adjacent (distance max 3).

This set of criteria covering for syntactical functions is wide. The example above is included just to illustrate the idea of how syntactical information combined with information about the word occurrences can be utilised in order to strengthen the zone borders. Likewise such rules are applied in order to assign higher weights to zones in order to discriminate between zones with link sets defined over the same word occurrences. This simple rule reflects a general assumption that subjects and objects may be considered as more author-focused than other words. General knowledge about textual patterns are adopted and adjusted in several devices that tune the scores by intersecting zone link sets defined over various types of grammatical information. The devices for zone identification generates link sets for each type of information and these link sets are transmitted to the device that calculates the scores (see Device Score Connection Point Calculation).

As a simple example: In three governmental reports, words as 'oil', 'gas', and transport' are high frequent. If sentence number 10 to 40 in one of these reports all contain the word 'oil' in one of its grammatical forms, this would possibly yield an 'oil-related' zone provided that the sentences are linked by other lexical signals. Assuming that two of the link sets include the words {oil, transport}, then the link set for the pair of sentences in which the words are classified as subject or object gets a higher score. Likewise, if the word 'oil' re-occurs in either the subject position or object position in sentence 20 to 30, this embedded sub-zone will be given a higher weight assuming that it more strongly indicates that 'oil is discussed'. If the sub-zone also includes important words, such as actors classified as important, preferably with reference to a user community, and several verbs are in the present form, this would likewise add weight to the zone.

Criteria Subject Omitted

If the subject is omitted in sentence S+1, add the weight 1 to SCORE (S, S+1).

If the subject is omitted in a sentence, this may indicate that the sentences is 'dependent on' the previous sentence.

Word List

Word lists intended to serve the purpose of precise diversification require, for each new domain and preferably also user community, procedures for manual intervention and validation. Each step involving manual intervention adds costs to the application however, by persistent expansion and tuning with respect to domain and/or typical requests in a user community, the lists will add value to the applications as seen from the perspective of performance and benefit. Many years past, it was predicted that the future would be characterised by 'the organisation of knowledge specialists'. At present in the year 2002, generally speaking, the greater part of information is mediated through documents (wide definition of documents with a diversity of enclosed object types due to digitalisation of all data types such as audio, video, etc.). The present invention will preferably install a programmed connection to a preferred embodiment of a special-purpose device supporting the need for manual intervention and validation in order to reach a higher degree of precision with respect to the words' discriminating value in the words' inner and outer context.

The device that generates word lists operates on DBP Information Word and outputs various types of word lists that are utilised by other devices for filtering purposes. The word lists can be reduced to include only words within particular types of sentences, particular zones with some shared features, etc. If the text structure is properly XML-tagged, the device can also construct word lists with words that occur in the first sentence of all paragraphs. A complete word lists minus stop-words constitute the free-text index. A grammar based word list is lists of words constituting one particular class, e.g. nouns and verbs. Grammar based lists are used in various consistency checks.

So-called 'stop lists' usually contain very high frequent words. Modal verbs are typically very high frequent in some text genres, and for instance sections with a high score for the form 'shall' may signal legislative texts; whereas the form 'should' more often signals an argumentative text zone. Similarly, high-frequent adverbs and adjectives characteristically may cause a modification of the meaning as interpreted by a human judge (during reading). For instance, a request pattern like [adjective followed by adjective with proximity=1] (adjacent words) and where the first adjective is in its comparative form, may signal an assessment, no matter what the word occurrence are. If several word sequences match this pattern within a limited text span (a stretch of, let's say 20 sentences), a procedure can locate this text zone and visualise (by the use of colours) this zone as an 'indication of evaluation'. That is, many words that within the setting of Information Retrieval technology may be considered as 'uninteresting words' are highly interesting within the application area of the present invention.

Word Fan Structure

In a very reduced perspective, language use may be described as having to broad classes of words (especially as related to nouns and verbs, and lexical relations between nouns and verbs) to work efficiently. Zipf described the two broad classes as mirroring two competing forces in language use, that of unifying language use and that of diversifying language use. In the Zipf law of distribution, vocabulary balance occurs where language use contains a spectrum of words from the very general words of high frequency and the very specific words of low frequency, and a middle range of words that balance generality and specificity in varying levels.

For concatenations that have nouns as their constituents, the present invention embodies a device that generates fan structures superimposed on word sets organised along the dimension of general-specific. (Explained below). The device splits the fan structure into frequency classes, and constructs links between words if they are related by lexical similarity between the components in concatenated words. The words classified as unifying language use are placed in the centre of link sets (forming unfolding fans in the text sounding board when displayed from the centre and then left and right). These are typically (in Norwegian) low or middle length words and the selection criteria is that the tagger has not classified them as concatenated and that they have a frequency above a certain threshold value determined intratextually. The constituents of concatenated words, and if the constituents are similar to words in the set of unifying words (centre words), the constituents are denoted as convergence words and linked to word types that are equal to the constituents. The link type is either <is a> or <aspect of>, depending on whether the constituents are the first part or last part of the concatenated word. Fan structures are generated intratextually, and subsets of encoded fan structures can be transferred to cover for new texts if both sides (word types) in the fan structures are registered as occurring in the new text.

EXAMPLE

For example, a few adjacent sentences may contain the word 'eieraksje' and another 'aksjeeier' (with different meanings) and, these sentences may also contain the very general words of 'eier' and 'aksje'. The structure generated will organise this word set along lines like ('eieraksje' <is a> 'aksje') and ('eieraksje' <aspect of> 'eier'), ('akjseeier<is a> 'eier') and ('aksjeeier' <aspect of> 'aksje'). The guiding principles for the design of these structures are, in addition to grammatical information, to divide the structures with reference to the specific words relative frequency within each text, or the relative frequency consolidated across text extracted from documents with defined interrelationships. These 'fan structures' are of high value for a user that enters a new text and wishes to explore the text from the general level to the more specific level. If the user selects the word 'eier' from one of the panes in the text sounding board, and the system has registered that this general word has attached a fan structure, the present invention preferably will embody the display of a button (with the icon of a 'fan'). If the user chooses to activate this button, one set of more specific words will be unfolded to the left (the <aspect of> set), and another set unfolded to the right (the <is-a> set). The user will preferably get an immediate impression of what are the specific themes as related to general themes. The present invention emphasises that the set of constraints exerting control over the generation of fan structures is according to the principle of text drivenness. Consolidation of fan structures across several texts will preferably depend on the relations between documents from a domain-specific document collection. The signals of diversification tend to get concealed if there is no control with respect to the relations between documents from which the texts are extracted. Without control the device for generation of fan structures will produce sets that probably will confuse the user, rather than inform her about possible themes. The particular device of the present invention aims at informing the user about content with reference to words organised in fan structures as from general to specific with respect to the current texts that the user are exploring.

So-called 'specific words' are often postulated as having a more precise meaning in that they have few relevant contexts. Agreement or disagreement regarding this issue depends on the definitions given for concepts as 'specific', 'meaning', 'relevant', and 'context', (see section 'The principle of text driven attention structures'). The present invention is founded on the convention in which 'meaning' is considered as an interpretative notion and that the interpretation of meaning differs with respect to what type of context the word appears in. More specifically, the present invention is founded on the differentiation between inner textual context, i.e., intratextually, outer textual context, i.e., intertextually, and situational context, i.e. affairs in the so-called real world outside the texts. According to the generally accepted apprehension of vocabulary balance, as described by Zipf, the continuous range of words from highly general to highly specific corresponds to Zipf's distribution of word occurrences from high to low frequency. The device for generation of fan structures deals with grammar based aspects, which may be seen as a specialisation related to this 'law of distribution'. In the advanced modus operandi of the text sounding board, the user can explore texts via the triple track. The individual yet interconnected panes in the triple track can be considered as a kind of 'moving concordance regulated by underlying grammar patterns'. When words are activated in one of the panes, words not co-occurring with the selected word is subsequently removed from the to other panes. The size of the tracks (width) in the present invention is regulated according to word length, and in the preferred case, it will be possible to activate details about the words displayed. For example if the word in one of the panes has attached a fan structure, a button with the icon of a fan will appear, and by activating the button the user can gradually be aware of specific theme signs in the underlying text.

Criteria Agent Process Object

One facet in the classification scheme (Subject Matter of Expressed Opinion) requires the identification of syntactic information such as Subject and Object. A preferred restriction is that both Subject and Object are nouns (if they are not nouns and in the head of the sentence, these words registered and utilised in a device that strengthens zone borders). By applying this rule, the number of sentences transmitted for further processing is substantially reduced. The main principle for the generation of the content displayed in the triple track is to make the user aware of details about words with respect to the words nearest inner context. The tracks are denoted as Agent, Process and Object and give an attention structure that preferably will not cover all sentences in the text, most preferably for a subset of sentences within pre-identified text zones. However, if the user considers it as advantageous to let the triple track cover for all sentences conforming to the grammatical patterns underlying the triple track generation, they will be offered this option. In case, this option will in some respects give the user a 'total and at the same time reduced' set of grammar based and grammatically organised entry points (contacts) to the text. The text sounding board is based on the principle of 'zooming in' and zooming out'. This means that current constraints on the display in the triple track can be loosened, or further constrained, for example by activating discourse element indicators.

Criteria Anaphora

One factor that is often discussed in segmentation procedures known in the prior art is the problem of co-reference resolution and the management of anaphoric expressions. An anaphoric expression is defined as relating to anaphora, being a word or phrase that takes its reference from another word or phrase and especially from a preceding word or phrase (Webster dictionary, 1996). The problem is considered as important in for example tools for text summarisation. The problem is to accurately determine the preceding words or phrases that the anaphora refers to since this affects the determination of the sentences' significance with respect to the summarisation process.

The present invention does not consider anaphora and co-referencing as a problem in that the text zonation procedure operates at a different level of exploiting grammatical information encoded in texts. The various forms of grammatical substitutes are in stead regarded as beneficial in the procedures that strengthen and condense the zone borders. Anaphora in the form of for example pronouns or adverbs of specific types occurring among the first few words in the first quartile of a sentence, adds a score of 1 to the 'Score Connection Point' assigned to the link set representing the current sentence and the preceding sentence. The pragmatic stance taken is that an anaphoric expression at this position refers to 'something' in the preceding sentence, but without trying to analyse or determine what this 'something' is. The present invention thus exploits anaphoric expressions by specific rules that 'push' the zone borders for inclusion of sentences starting with an anaphoric expression. The present invention does not make any attempts to identify the antecedent of anaphoric expressions. Since the sentence with the anaphoric expression is displayed in its inner textual context, the user will easily understand what the proper antecedent is.

In a similar way, a noun in the determinate form occurring in the sentences' first position is assumed to refer to a related noun, phrase or clause in the preceding sentence, but with no need to exactly determine the co-reference. This type of noun occurrences adds a score of 1 to the link set for the pair of adjacent sentences.

The present invention to some extent treats words with an anaphoric function, but in a rather pragmatic way as compared to technology for text summarisation. In case one of the types of anaphoric expressions appear in the head of the sentence (S+1) subsequent to the current sentence, the weight 1 is added to the score of the connection point between the pair of sentences, SCORE (S, S+1). See Device Connection Point Calculation.

The present invention aims at operating unsupervised and therefore only focuses on a few types of anaphoric relations between sentences. The problems with anaphoric expressions are not sought solved by identifying what word or phrase in the preceding sentence the expression (grammatical substitute) refers to. Rather, if the anaphoric expressions appears in the head of a sentence, the present invention assumes that it refers to the preceding sentence 'in some way or the other', and therefore simply adds a weight to the linkage score between the two sentences. ('head of sentence' is normally the first 1-5 words of the sentence, but this unit is calculated depending on the sentence length, including the intratextual average sentence length and standard deviation)

Pronominal anaphoric expression are easier do deal with if the nouns in the sentences are identified and checked against a 'known list' of important word (actors, actions, etc). These words are identified and classified in the first processing round, and the lists of important words or known concepts are iteratively reapplied intratextually (a pronoun refers to 'something' within the text being processed). For instance, if the word 'government' is the last mentioned actor in a preceding sentence, and 'government' in subject position), the pronoun 'we' may refer to the 'government'. However, texts extracted form several document genres differ also in this respect. The word 'we' may as well signal a kind of general collective unit meaning 'we all . . . '.

The present invention therefore treats pronominal references in the same manner as with other types of referential expression, i.e., the linkage score between two adjacent sentences is given a weight depending on the referential expressions relative position within the sentence. The rules applied are highly pragmatic. For example, there is a rule for position based on if the referential expression appears in the head of a sentence partition before the midpoint or in the head of a sentence partition after a midpoint. This rule is further dependent on the average sentence length and other constraints related to author-determined sentence partitions (clauses starting with a relative pronoun, commas, etc). When the aim is to construct attention structures, it is not seen as necessary to exactly tell the user what word or phrase a referential expression refers to. Rather these textual features are utilised in order to identify, determine and strengthen text zones by adding scores to pair of sentences identified to have other types of connections (e.g., lexical cohesion).

Criteria Conjunction

In a sentence configuration with two adjacent sentences, a conjunction in the head of the second sentences does not imply or indicate an 'obvious' separation. The content in two sentences could as well be expressed in one sentence with a conjunction for instance placed within the third quartile. Sentence structure is a sociocultural phenomenon and grammatical rules only apply within the sentence borders. Authors use conjunctions to join sentences or to join clauses within sentences. If the head of a sentence starts with one a conjunction that by type refers to a precedent, the present invention adds a score of 1 to the connection point covering to adjacent sentence. Ref. principles described in 'Criteria Anaphora':

Criteria Conjunction Sentence Head

In case a conjunction appears in the head of the sentence (S+1) and adjacent to another antecedent sentence (S).

The concept 'head of sentence' is very imprecise. The present invention will preferably incorporate a device that determines the 'head of sentence' based on statistical sentence information covering each individual text (sentence length varies a lot across various genres, authors, etc.). If this device is not applied, 'head of sentence' with respect to conjunctions, is restricted to cover the first 1-3 words. 'See also under 'Sentence Quartile'.

The specifications for the device calculating and determining 'head of sentence' is based on results from an empirical investigation of two equal sized document collections covering text from different genres. It was found promising to apply information about average sentence length within each text as a means to determine the notion of 'head of sentence' more precisely. Based on statistical information derived from these two document collections, the following rules-of-thumb illustrate the pragmatic approach.

For example: If the sentence is of average length or above average length and average length is more than 16, the head of the sentence is the first sentence quartile.

If the average length is 12 (or less) the head of the sentence is composed of the first and second quartile.

Sentence separation is not always (or, rather never) apparent. If a conjunction is located in the 'head of the sentence' and preferably a device that considers average sentence length in each text treats a conjunction treated by increasing the weight for the link set covering two adjacent sentences. The value 1 is added to the score of the connection point between the two sentences.

Constraint: The sentences should be adjacent (distance=0).

Note: Phrases including adjectives or adverbs referring to subsequent sentences are treated differently but by following the same principle. For example, if a sentence head contains 'In the following', this adds a score between this sentence and the first subsequent sentence. This as opposed to for example a sentence starting with 'further', indicating that the content of the sentence is related to one (or possible several) of the precedent sentences.

Criteria Conjunction Sub-Sentence Join

Conjunctions joining sub-sentences (clauses) may cause a tuning problem. One simple tuning technique is to compute the average sentence length for the sentences in a text or subtext. If a conjunction appears after the midpoint of sentence of average length or above, the weight 1 may be added to the score between the sentence and the subsequent sentence, and under the condition that the longer sentence already has some lexical cohesion with the subsequent sentence. The two sub-sentences may be considered as two 'individual' sentences (the use of separate sentences or the use of sub-sentences joined with a conjunction is often seen as rather arbitrary in a text, especially if the text is produced by several authors (various styles).

Collocation Combined

There is a vocabulary balance in texts, and the widely known Zipf (1945) claimed that the statistical regularities in language were the result of two competing forces of language use, that of unification and diversification. These features are examined in detail and as related to the words' grammatical classes in order to identify the set of words within each class that will provide useful information applied by the Apparatus for Filtering. In every text of a certain length, the theoretical and empirical studies underlying the present invention confirm that words in the grammatical classes of nouns and verbs may be grouped into two broad classes. These broad classes are known as general words with a low discriminating value and specific words with a higher discriminating value.

Prevalent words are words that language users relate to a wide range of propositional content and that may be viewed upon as having a kind of all-round feature set. These words differ in 'meaning' as to which context they appear in (intra-textual appearance), and may also differ in 'meaning nuance' from one text zone to another in one text (a text of some length and where there is a certain distance between the zones). This calls for precaution for such words to be included in the lists of 'focused words' as realised in the present invention. When it is clear that the inner context of such common words affect the interpretation of them (human interpretation), it follows that these words have a low discriminating value. These words however, unify language use in a text and are therefore a vital constituent in the zonation procedure—the part of the procedure that operates on grammatical lemma. Due to the low discriminating value of these words, the present invention employs frequency data combined with grammatical information in order to give more specificity to these general words. For example, collocations can be ordered according to frequent adjectives that are precedent to nouns (with a distance up to 2 between them). These noun phrases (adjective followed by noun) are often appearing as concatenations (nouns) in neighbouring sentences, for example 'lokal organisasjon' (local organisation) and 'lokalorganisasjon' (concatenation with the constituent adjective+noun). By splitting the concatenations into their constituents, the resulting lexemes will strengthen the identification of text zones (giving a higher score to each connection point defined for each pair of sentences in the text).

For texts in Norwegian (and in many other languages), concatenated words are treated by a special-designed device again utilising combined collocations. Specifically, the examination of distribution patterns takes into account the distance between the occurrences within a text and, preferably with well-designed constraints when crossing documents that do not share some features describing the documents' situational contexts.

Collocation Noun and Modifier

The words in chains change in various ways, and in particular with respect to language. In Norwegian, and many other languages, adjectives preceding nouns typically may sign changes in 'meaning' of the noun.

For example, the noun 'selskap' (company) in governmental reports related to oil affairs in a rather high frequent noun. The reports contained 950 occurrences of 'selskap' in different grammatical forms. The total word set was 110 337. This means that the word 'selskap' is of no practical value for the user wanting to traverse the text by activating this particular noun displayed in the text sounding board. The present invention therefore includes a device that calculates collocation patterns with according to the words grammatical class. Further a particular device examines these collocation files in order to decide a set of grammatical request pattern that most likely will give the best performance in the identification of chain discontinuities caused by changes in the nouns' nearest modifier. In order to illustrate and with reference to the example mentioned above: The combined collocation file, and in particular for adjectives to the left of the noun 'company', revealed several different adjectives that clearly modified the 'meaning' of company as an isolated term. It is worthwhile recalling that the concept of 'meaning' is taken as an interpretative notion, and consequently that the users background knowledge influences this judgement.

The combined collocation file revealed that 58 occurrences of the 950 occurrences of the noun 'selskap' were modified by the adjective 'nye' (new) in the 3 positions to the left (out of which 49 in the first position). The immediate association is that this text in some way deals about 'new companies', and the situational context is about problems related to 'oil company fusion'.

In order of total frequency, and frequency to the left (position 1-3 left to noun 'selskap') in parentheses (translated):
{1—new (58), 2—other (35), 3—norwegian (23), 4—foreign (13), 5—participating (9), 6—international (8), 7—all (11), 8—large (14), 9—competent (5), . . . }

The re-occurring modifiers mean that changes in the particular noun's modifier reflect a discontinuity in the lexical chain generated for 'selskap' (company).

The device controlling the zonation applies the following general rule:

The current sentence is S: If a lexical chain shows a feature of discontinuity caused by a modifier in sentence S+1 (the next sentence), this indicates a discontinuity or that the main chain has a local thematic variation that begins in S+1. Add the weight 1 to the score for the connection point between the two sentences, (score (S, S+1)).

In a similar way, if the new thematic variation ends in the current sentence (S) or a discontinuity ends in the current sentence (S), add 1 to the score between the current sentence and the following adjacent sentence.

This simple rule strengthens the zone borders with respect to features as continuity and discontinuity indicating shifts in thematic variations. For example, if several chains end in the very same sentence and other chains start in the preceding sentence.

Let say that the current sentence is number 13 and number 13 has a score of 2 as related to the preceding sentence number 12, the score set is [12, 13=2]. If 3 chains ends in sentence number 13, the score between sentence number 13 and the subsequent sentence is increased by 3 {13, 14=3}. A further if 2 new chains start in sentence number 14, the score between sentence number 14 and the preceding sentence is increased by 2. That is, the total score will be {13, 14=5}. Further, let say that sentence number 14 has two chains intersected also in sentence number 15, giving {14, 15=2}. Thus the score for the sentence pair {13, 14} will demarcate the edges of two adjacent zones, one ending in sentence 13 and the other starting in sentence 14.

The score just indicates that there is a shift in theme, and the content of the link set, in which the score is only one of the attribute types, include the necessary information utilised by the devices that generate traversal paths, zone bonds, and so on.

Different rules apply for other variants of patterns stored in the combined collocation files. See also word relations organised in fan structures of <is-a> and <aspect-of> for Norwegian texts."

Collocation Proper Noun

The concept of 'phrase' refers to a word composition of two or several words corresponding to one of the predefined grammar based request patterns. A phrase refers to NLP phenomena and in a particular user community 'phrases of interest' may be encoded in inventory lists, lists of persons, organisational divisions, etc. Several taggers known in the prior art, seem to not be reliable with respect to the identification if proper names. Some of the problems seem to be related to composing proper name phrases with abbreviations. A preferred combination of proper name lists, proper name elements as recognised by the tagger, and grammar-based patterns superimposed on the combined collocations may capture more instances than if just exploiting the tags as they are. For example the set of request patterns:

[(proper name<distance=0> proper name)] OR
[((proper name<distance=0> abbreviation)<distance=0> proper name)]

will give phrases such as Øyvind Enger, Nina Raaum, Brit H. Aarskog, Persona N. Grata, etc.

Each set of request patterns is defined to have a certain search intention, in this case to locate and register named persons, organisations, etc. The lists generated from these request patterns are denoted as 'phrases'. i.e. series of words in a text in accordance to commonly known grammatical patterns.

Criteria Noun Collocation

A multitude of research reports within linguistics propose algorithms in which the problem related to nouns phrase co-reference resolution is considered as a clustering task. Many of the proposals depend on the application of general thesauri (specifically WordNet) where nouns are classified into broad semantic classes. The clustering approach is based on the generally accepted assumption that all noun phrases used to describe a specific 'entity' will be 'near' each other, that is, their distance will be small. The dependence on thesauri and semantic classification of words is considered as a debatable constraint, and in particular when the training corpus contains short texts.

The present invention does not seek to accomplish a solution to the co-reference problem as such, but incorporates the general assumption related to 'nearness' in a Device for the calculation of Noun Collocations, (<is part of> Device Frequency/Grammatical Distribution Calculation. The noun collocations are further utilised in the Target Word Selection (TWS) Procedure.

The present invention manages a DBP with Chain Information in this file includes a list of chain members (a vector), that is pointers to the occurrences of each word type forming a lexical chain (lemma form) in the text. Word identifiers may be used as pointer values, or the pointers refer to word identifiers, which are entries to a separate database partition (DBP) for Word Information. This DBP includes grammatical information, originally extracted from the annotated files produced by a POS-tagger or CG-tagger, and then consolidated due to efficiency issues. The attribute types attached to the documental logical object type Word (the set WATOT) realized in this particular DBP, also includes an attribute type for the potential inclusion of semantic codes (optional). Instead of processing all words with respect to all possible semantic relations between words near by each other, the present invention provides for several reduction strategies. The DPB Word Information is transmitted to the device denoted 'of Device Frequency/Grammatical Distribution Calculation', which produces combined collocations, for example collocations that only include nouns, or nouns and adjectives, i.e., information corresponding to a preferred set of grammar based search patterns.

For example if the noun 'eier' (owner) co-occurs 120 with 'selskap' (company) (total frequency of 870), in a distance up to 3 to the left or right, this regular co-occurrence will indicate that in this particular text it seems to exist a theme about owner as related to company. Further, if both these words are classified as focused words, i.e., an author-focused word with certain frequency characteristics, the words are entered into a Target Word Selection (TWS) procedure. That is, 'eier' and 'selskap' are examined with respect to words in the neighbouring sentences in order to determine if there are any semantically related words. ('eier' (owner)->{'innehaver'}, 'selskap'->{'firma', 'konsem', 'bedrift'}. The validated matches are registered as 'TWS Domain Code' and each code refers to the word occurrences in the text initially forming the target word lists. This secures that the semantic relations cover for relations as captured intratextually, and that the relations are defined for words within a certain distance.

The set of 'TWS Domain Codes' are linked to the word occurrence Word Type (a separate file referring to the text identifier and a list of pointers to all word occurrences of a particular type). The gradually evolving domain specific thesaurus will thus become data independent in that it is possible to invoke that part of a thesaurus structure that covers for one particular text, or a group of texts. The TWS Domain Code will be assigned to the field 'semantic code' in the DBP Word Information. First of all, these relations are used in order to strengthen the zone borders i.e., the score for the connection point between two related sentences is increased. Secondly, the text sounding board will give an option for 'expansion'. For example, if the word 'selskap' (company) is displayed in one of the panes in the text sounding board, the user may preferably select an option 'display together with related words'. This causes the word occurrences of the type 'konsern' (concern), 'firma' (firm), and 'bedrift' (enterprise) to be highlighted as either co-occurring within zones, or generally for all occurrences of the whole set.

In the first run, the device for the calculation of noun collocations can preferably be constrained to operate on nouns occurring within sentences in a zone. Variants of Device Frequency/Grammatical Distribution Calculation operate on the different grammatical classes, i.e. grammatical request patterns are input in a kind of filtering operation. A lexical chain treading nouns and with the highest density value (see Zone Density) may be selected as the first 'current noun' and the procedure calculates the distance to other nouns forming a lexical chain passing through the same zone. The file Zone Density includes a Lexical Chain Identifier which in turn is the access point to another file containing the entries to all members of a chain (Word Identifier which is composed of Sentence Identifier (intratextual serial number) and Word Position within the sentence)). When the distance to all nouns forming a lexical chain passing the zone is calculated, the procedure calculates the distance to other nouns in the zone (if any (nouns that for some reason are excluded from the Chain Generation). In case the text has no zones (short texts) the procedure operates on sentences (See Sentence Density). The procedure can be constrained to only operated within a distance of a specified number of words, for instance 5 words, and for all grammatical classes or specified grammatical classes to the left or right to the 'current noun', within a sentence. It is of no interest to cross sentence borders.

The procedure is not dependent on thesauri resources, but will support the construction of intratextual thesauri structures. Recall that the present invention is founded on the idea or principle that word relations should be established intratextually sine the word's context constrains the usability of general thesauri relations. However, this principle does not exclude the use of thesauri look-up. If nouns being members of lexical chains passing through the same zone (or near-by sentences) returns with a distance value below a certain threshold value, and these nouns are listed in each others synonymy list in a thesauri, the procedure will construct a semantic relation between these two nouns. In this case, the Zone Identification Unit has to check on the sentences adjacent to the identified zone borders as well as the sentences within the zone borders in order to recalculate the Zone Link Set.

The semantic relations will be registered in the vectors that are valid intratextually. The present invention serves the idea that such automatically established semantic relations should be calculated for each text. Since the procedure operates intratextually, the problem of semantic relations not being valid across several texts will be avoided. The vectors with semantic relations are however supposed to be of value within a domain-specific document collection—and perhaps especially for sets of documents that are task-related and in addition produced within a limited time span. If the texts are verified as sharing a specified set of features related to the situational context, the present invention does not oppose the consolidation of individual semantic nets across several texts.

The density and distance data can be used as input to a concept map generation unit (visualisation of concept relations). The procedure can operate incrementally by also including sentences (calculating noun collocations from the inside of zones towards the sentences in the vicinity of borders identified in the first run). The procedure can also operate on more advanced linguistic surface patterns in the form of compound noun phrases (possessive form, adjective preceding nouns, series of nouns, etc.). These linguistic surface patterns will be adopted from published research reports and tuned towards the purpose of the present invention.

The direction of processing may be influenced by language. It is for example reported that it may be advantageous to process English texts' backwards by comparing each noun with preceding nouns and with a certain distance. This is based on the simple assumption that any noun phrase possibly will refer to a preceding noun, either within the same sentence or in a preceding sentence. The present invention will preferably perform a test to see if concatenated nouns are processed more efficiently if the zonation procedure operates from end-of-file to start-file tags.

The preferred approach is to first include the words' classified with respect to a notion of importance, which is definitely influenced by requirements in the user community (e.g.

Word Signature). Furthermore, the approach considers the notion that some sentences most likely are more important or central than other, e.g. sentences with particular actors in the subject position. Nouns occurring within zones with a high density value (Zone Density, or alternatively Sentence Density) may also provide valuable information regarding the assumption that some words (nouns) are more important than others, i.e., they participate in stronger chains (noun chains intersecting several zones).

Zonation Criteria Semantic

A text zone consists of two or several sentences that are interlinked through lexical cohesion, grammatical information about word classes and word form, to a limited extent semantic information, and information indicating discourse elements. The realisation of semantic relations is dependent on the quality of either general thesauri or domain specific thesauri. A wide spectrum of late reports (2002) reflect nuances in approaches aiming at establishing semantic relations between words, within and across documents in small to large collections. Several reports indicate that the automatic application of 'concept space approaches', 'vocabulary networks' and 'general thesauri' meant to cover several domains have not shown the results as expected in terms of performance. The explanation to the rather low performance level announced in reviewed reports may relate to problems with the foundational theoretical framework. Several reports convey a rather weak understanding of the concept of contextuality with respect to text. There seems to be no differentiation between the text units' inner context, outer context, and situational contexts, at least this covers for approaches based on advanced mass-computation of statistical proximity measures. Many reports convey an over-optimistic belief that by determining an external system of interconnections between words, this may provide for better precision in the users' search effort and reduce the problem of so-called information overload. The criteria subsumed under the class Semantic relate to 'meaning' in language use. The assignment of semantic relations between words is strictly governed by a set of constraint rules in the devices embodied in the present invention. An extensive encoding of semantic relations between words without taking into account the difference between intratextuality and intertextuality, may cause a situation of 'semantic overkill'. Even a restrictive establishment of semantic relations requires access to thesaural resources, and preferably resources with a rather simple and controlled structure. The restrictive approach is performed and ruled by a particular device for target word selection. The device embodies a method and system for the construction of domain specific thesauri with subsets virtually attached to particular texts or texts extracted from documents that share some features from the situational context. Evolving domain specific thesaural resources add value to the applications of the invention in particular organisational settings. The persistent thesauri structures are never superimposed on texts without passing the device for target word selection. The value added will be in form of lesser dependence on manual (computer-supported) intervention.

The set of constraints is primarily related to the assumption that semantic relations between words may hold intratextually, but not necessarily intertextually. There are several practical reasons for the restrictive perspective on the establishment of semantic relations between words occurring in a text relatively far from each other and in particular for words occurring in different texts. This is explained into more detail in the section about the principle underlying text drivenness. If one refers to the general meaning given to the concepts of precision and recall* (commonly used measures for the evaluation of IR systems' performance), and extensive assignment of semantic relations between words heavily increases recall. The application of search operators that activates semantic relations between words expands the search space accordingly (the operator OR carried out in a concept hierarchy or net). The user may evaluate the precision as more satisfactory when such semantic relations are activated, however there is another important concern—that of the user's futility point. Higher precision may be of less value if the recall exceeds the user's capability (resources such as time) of investigating the number of elements in the result list. This effect is widely known as related to the 'scaling problem'. Semantic relations between words conflict with the reduction strategies that form an important part of the present invention's 'awareness' perspective.

*Measures as precision and recall are undoubtedly of interest when evaluating the performance of IR systems in closed laboratory experiments, but are not the right goals to pursue in the perspective underlying the present invention.

Some text zones may be highly specific and of significance to users engaged in interpretative tasks. Zones with specific content can be 'overruled' by simply adding weights to connection points between sentences with assigned semantic relations. The old measure of 'fallout' refers to an essential aspect of all methods and systems related to making textual content available, either via search engines, or as in the present invention, as representative samples presented for exploration in a text sounding board. The term 'representative' by definition also embraces extraordinary specific text spans. Extraordinariness must be treated as certain type of feature reflecting how the author's focus of attention moves across a text. Therefore zones enclosing sentence pairs with a low score for connections points or zones with low weight score, either on the lexical or semantic level or both, should not be neglected. Low scores can be treated as exceptional cases by simply providing for an option that displays zones registered as extraordinary.

A particular device applicable for many languages embodies a method for treating concatenated words and their constituents. The resulting structure is denoted as 'Word Fan Structure' in which the centre word is a focused word and the constituents can be unfolded on both sides via semantic-pragmatic relations denoted as <is a> and <aspect of > (not to be understood as absolute terms). In the present embodiment the prototypical version of this procedure operates on texts in Norwegian. The procedure can be adjusted for texts in other languages with concatenated words as one of their features, and for English preferably combined collocations will provide for the necessary support (especially for nominal expressions. i.e., a word or word group functioning as a noun).

Criteria Synonymic Relation

It is commonly recommended to allow only one level of semantic relations as encoded in thesauri. For instance, if 'company' is related to 'firm' and 'firm' is related to 'enterprise' and 'enterprise' is related to 'business', only the relations from 'company' to 'enterprise' should be allowed for inclusion. That is, if a to b, and b to c, and c to d, then only a to c is allowed. If the user transmits a request with the term 'company' a system for automatic query expansion can include the interlinked terms, either as a category search or iteratively. The underlying assumption is that these links will refer to words supposed to have a related 'meaning'. Automatic query expansion in this general sense aiming at expanding the search span is not an issue in the present invention. The reason for this is shortly explained in the section 'The principle of text driven attention structures'.

In the present invention, to the extent general thesauri are applied, a related kind of preferably automatic linking between different words will be applied with great caution and constrained by already identified text zones. A zone identification procedure that solely operates on lexical items often results in zones covering too many sentences, i.e. they are too continuous either because series of sentence pairs have the same connection score, or because enclosed sub-zones have weak borders. The use of lexical resources as general thesauri is therefore applied in a second round of zone identification, i.e., a round that involves zone strengthening. The device for Target Word Selection (TWS) operates on a subset of the DBP Word Information, i.e. the set covering sentences within zone borders (derived from the file Zone Border) plus a minor expansion of 2-3 sentences adjacent to zone borders. If the TWS procedure returns a validated TWS code, this code is assigned to the attribute type 'Word Semantic Code' which is an optional element in the DBP Word Information. The device for zone identification operates on the revised DBP resulting in a revised Zone Link Set in which the score for connections points reflects validated relations between words in sentences already identified as interconnected. For short texts without any zones, the distance can be constrained to a certain number of sentences in a sequence. See Criteria Noun Collocation.

Semantic relations between words will be realised, first of all, intratextually and under the constraint that the words must appear 'near' each other up to a certain distance, an preferably within zones reflecting plain lexical cohesion. The resulting 'semantic nets' as encoded in a thesaurus structure covering each text individually and to a certain extent consolidated to cover for related texts, materialises the underlying conception of 'context' as different with respect to 'inner context', 'outer context', and 'situational context'.

The present invention incorporates a detailed classification scheme describing semantic classes of words or phrases in a system organised as facets. The facet structure is designed with reference to speech act theory, juridical norm theory, workflow considerations, and grammatical constructs. The classification scheme is elaborated in Aarskog (1999). The particular scheme also conceptualises the communicative aspects of the document's situational context.

Criteria Verb Relation

The assignment of 'semantic codes' reflecting identified relations between words in the text, is preferably restricted to nouns or certain word constellations identified via the device that produces combined collocations (See Device Frequency/ Grammatical Distribution Calculation). The construction of semantic relations between verbs is more discussible due to many factors. The 'meaning' of a verb is dependent of which arguments the verb type takes, and is also influenced by tense and modality (TAM). The arguments 'attached' to the same verb type or semantically related verb types will differ from one sentence to the next. In addition the 'meaning' of verbs differ with respect to the close inner context, whether they are used in order to express acts or opinion. In the latter case, the occurrences of the same verb type may differ with reference to qualification criteria as sincerity condition, modality, sentence structure, and so on.

Given thesauri resources that explicate semantic relations between verbs, the target word selection procedure applied in the present invention rests on very restrictive rules with respect to the assignment of semantic relations between verbs in the text. Instead, the present invention relies on a text driven construction of broad semantic classes and only if the verbs appear within the same zone, or between zones and near-by adjacent sentences outside the zone borders. The rule in addition takes into account whether 'near-by' words are substantivized verbs, i.e. verb types have a correspondent noun type within a short distance, see Criteria Synonymic Relation.

This implies that semantic relations can be defined across grammatical word classes if verbs and corresponding nouns appear within a short distance. The close examination of the set of governmental reports showed that this particular feature of language use was a regular pattern (Norwegian texts). Rules for the establishment of relations between verbs depend on language. Regarding for instance the Scandinavian languages, the adverbial particles (among others) have to be taken into account when representing verbal phrases and distinguishing between them.

In short: The 'meaning' of words in its textual context is diverse and cannot be fully disambiguated even through an advanced dictionary look-up. The underlying assumption is that the constantly renewal of language and language use within 'contexts enclosing contexts' is a problem that cannot adequately be dealt with by the unsupervised application of thesauri.

Verbs are Highly Polysemous

Verbs may signify a complexity of information. Therefore verbs are probably the lexical category that is most difficult to exploit with respect to the generation of attention structures. The present invention applies a theoretically founded, yet pragmatic approach regarding these issues.

In the present invention the division into broad semantic classes of verbs is based on speech act theory and the invention relies on the definition of a set of broad semantic verb classes due to the fact that verbs are highly polysemous. Verbs may change their meaning completely depending on the kind of noun arguments with which they co-occur. In addition, the verbs' positions within the sentence also influence on their meaning. Due to the existent state of the art, the present invention proclaims to omit the application of fine-grained semantic verb classes as inscribed in general thesauri as for instance WordNet. The broad semantic classes of verbs are preferably formed for verbs being in a subsequent position to nouns that occur in the subject position. One of the criteria applied for the division into classes are the five primitives known from classical speech act theory, i.e., assertive, commissive, directive, declarative, and expressive illocutionary forces, which when expressed in explicit forms subsequent to nouns, are the simplest illocutionary forces of utterances. Other criteria relate to physical action however, care must be taken because such verbs are often used in a metaphorical sense in argumentative texts. In the present invention the most important sets of criteria for content words (grammatical classes of nouns, adjectives, verbs, and adverbs) are those related to domain and genre covered by the document collection.

A particular device will deal with concatenated verbs (first constituent being a noun or preposition) and verbs added up with adverbial particles. For example in Norwegian, ('innkalle' <same as> 'kalle inn'), ('sammenkalle' <same as> 'kalle sammen'), and ('bygge ut' <different from> 'bygge ned'). This device will adapt results from linguistic research within the EU research programs. (Norway is not a member of EU, meaning that the results referred to are related to languages as Danish, which is very similar to Norwegian, and German; English has another feature set for verbs).

As mentioned, several of the devices in the present invention are founded on theories that at present may be subsumed under the field of 'Integrational Study of Language and Communication' established as an international association in the year 2000. The theoretical framework underlies series of small-scale empirical investigations and where results have influenced the cycles of design, construction, experimentation, redesign, reconstruction, i.e., experimental design.

The following brief presentation gives a simple example for the purpose of illustration. One particular investigation examined the details behind the distribution pattern of verbs in two equal-sized (number of words) collections of documents, the genres of laws and governmental reports (in Norwegian). 5 663 different verbs were detected, of which 2 514 verbs were present in the reports but not in the law collection. The very high-frequent verbs were typically general verbs, and by studying the occurrences in their inner context, they also typically served as unifying the text (as claimed by Zipf). An in-depth analysis of the medium-to low frequent verbs, resulted in a set of 1 124 verbs that seemed to serve the purpose of diversification, and of course based on subjective evaluation (errors such as misspellings removed, etc.). Further, the very high-frequent verbs also showed to be the most frequent constituents of concatenated verbs, and in which the first constituent was a noun. Furthermore and with respect to the inner contexts, these nouns (classified as general nouns) also appeared in neighbouring area of the verbs, either as individual words or as constituents in concatenated nouns. Patterns were also revealed for verbs added with an adverbial particle (preposition) and nouns with a prefix similar to the adverbial particle, and the constituent being prefixed similar to the verb. Information derived from experimental observations is realised as guiding rules in the apparatus for zonation. That is, since the patterns are relevant for the comparison of pairs of sentences, it is worthwhile to construct grammar based search macros that capture these similarities. The particular devices capturing these interweaving features are of course dependent on underlying files encoded with grammatical information, and preferably grammar taggers that mark concatenations. The rule set positively affects the zonation procedure. Among the 1 124 different verbs found to be of potential value for diversification, about 80% of them occurred two or several times in the subsequent position after nouns occurring in a subject position. A review of this new subset of verbs seemed to give an 'immediate sense' of understanding, i.e. they evoked an association (subjective judgement) when seen together with the nouns in question (nouns as subjects). The next step was to further reduce, or diversify, the set of verbs by including information about their grammatical form. In argumentative texts, such as governmental reports, verbs in the present may sign the logical now, that is the time of the utterance mediated through text. The patterns revealed were promising, in that this step-wise reduction from the initial set of 5 563 different verbs, now showed a set of verbs (in the present) that to a surprising degree reflected opinions, reflections, evaluations, viewpoints, concerns, standpoints, etc.

In scene of the present invention it is important to recall that argumentative texts and many other genres, are an interpretative medium that gives other data (statistics, figures, maps, pictures, etc) 'meaning' within the situational context (explaining the reason for the production of the document, or the document's background information). A special-designed device constructs collocation patterns that exploit frequency information combined with grammatical information as encoded in the DBP Information Word. As for verbs, useful patterns related to the three other main grammatical classes gradually evolved by the iterative application of the more or less same reduction operations. Some of these patterns are realised in particular devices seen in the present embodiment of the invention. The adjustment of these devices will be conditioned by results from these iterative applications of reduction operations. These operate on information about the words' frequency and distribution patterns and combined with information about the words' grammatical class and grammatical form, as well as the same information about the subsequent and precedent words.

With reference to the example and description above, it is mentioned that the set of verbs subsequent to nouns can be further restricted according to tense and modality (TAM). Verbs signalling utterances (the expression of viewpoints, meanings, thoughts, appraisals, etc) are for example of particular interest in argumentative texts if the preceding noun refers to a specific actor or group of actors juridical persons, either denoted individually by proper nouns, or denoted collectively). These filtering options follow modern theory within the field of text linguistics (a field proclaimed to significantly differ from orthodox linguistics, formal semantics, computer linguistics, etc.). Regarding modality, the present invention follows the theory on illocutionary force as signed by restricting the mode of achievement of the illocutionary point by imposing a new special mode.

For example, Werth (1999) gives a list of modals, groups them according to tense, thus proposing a continuum of the utterances intentional strength (probability, possibility, and predictability). Bundles of the same TAM across several adjacent or near adjacent sentences may indicate one aspect of the deeper semantics in a text zone. Taken together with cue phrases indicating the superordinate rhetorical or argumentative function in zones, and preferably as conjunct with nouns referring to mediators (nouns in the subject position), the present invention provides indicators of deeper semantics that may provide useful attention structures for professional text explorers. The theory and approach grounding the present invention states that frequency information cannot tell anything about the deeper semantics about for instance the types of utterances, types of arguments (whether the issues are moralistic, ethical, juridical, etc.). This statement applies regardless of complexity in the computational statistical-proximity models, see the section 'The principle of text driven attention structures').

The present invention applies grammar based request patterns, and in addition to the words grammatical class, also may incorporate information about the grammatical form. For instance, it shows that text fluctuate from verbs in the past to verbs in the present. An author may typically refer to 'something' in the past and thereby evoke the reader's cognition about the background situation. A new stretch with bundles of verbs in the present, may indicate a shift in the author's focus to the 'matter dealt with' or 'opinions about 'what is' in the logical now time zone' (logical now being the author's date of utterance'.

Zonation Criteria Pragmatic

Zonation Criteria Pragmatic is the criteria that shall embody matters of practical affairs as seen by a user community. Elements in some discourse models may be identified through 'important words' or special cue phrases being lexical signals for such elements. The use of pragmatic criteria requires a list of words recognised and validated as reliable cue phrases. A special-designed classification scheme includes a set of categories (with further refinement into facets) for the assignment of codes referring to text zones in which 'these sentences deal with a problem', 'these sentences deal with an evaluation of a solution or comparison of solution proposals', etc."

The present invention considers information about frequency and distribution as supportive for the diversity of weighing functions that in most of the devices are combined with grammatical information about the words in the texts selected by the user for exploration.

The frequency of word form provides useful information about the themes in a document, or the thematic profile. The nouns and noun phrases are signals of the text's themes and sub-themes. In the present invention nouns are grouped according to their co-occurrence patterns in adjacent or near adjacent sentences, and weighed according to the syntactical function and position within the sentences. This provides for a thematic profile of text zones where text zones are conceived as derived documental logical object types. Preferably nouns, above and below certain threshold frequency values, are classified into broad semantic classes in which both the exhaustivity and specificity of each class are according to criteria within the user community.

This is according to the stated intention that each application of the invention is tuned towards specific user communities or several user communities with shared features as related to professional domain, tasks at hand involving text exploration, sizes of domain specific document collections, persistent goal-oriented information needs, etc. Threshold values for the noun frequency are determined intratextually (within one text at the time), and balanced or weighed against the text length, number of nouns in the text, number of nouns in the identified set of text zones. The particular device that performs these calculations, and again with reference to the words' grammatical information, produces density values.

The intratextual perspective is based on the conception of each text as a weave of meaning where the text provides the inner context. Each text (and thereby words within the text) has an outer textual context if the text is extracted from a document that is workflow related to other documents in the collection. Texts extracted from several documents that are related (as seen by the user), can be treated as a whole, thus involving an intertextual processing. Documents that are related within the domain are seen to provide for one aspect of the situational context, that is aspects of the situation or event in the world outside the text that caused or motivated the document to be produced and mediated.

The present invention embody several filtering options for an exploration facility denoted as 'incremental aboutness' and these options are preferably also tuned according to requirements that reflect specific relations between users, tasks and documents.

Device Word Classification

The 'DBP Word Information' is used when calculating word adjacency matrixes with respect to certain grammatical patterns. Word adjacency information is applied in the identification of re-occurring word constellations as well as variants in language use (collocation patterns). The important issue is that frequent occurring collocation patterns support the apparatus for disambiguation. Collocations with a low frequency may indicate either 'marginal' expressed opinions or 'central' opinions. In the latter case, the collocation is intersected by words classified as Word Important, for instance cue phrases indicating problems, decisions, solution proposals, etc. (i.e., lexical signals referring to discourse elements or superordinate argumentative functions).

The application of the device in particular addresses focused word, which may be conceived as a representative for focused themes in the text. The concept 'focused word' must not be confused with other terms such as 'core term'. A focused concept preferably refers a noun or phrase (i.e., a word constellation which is according to a predefined grammar based request pattern), occurring above a certain threshold value for a given text. The value is determined intratextually, or intertextually for a small set of texts if they are work flow related), and where the occurrences also can be constrained to appear within text zones (occurring in several adjacent sentences identified a zonation procedure that also takes into account variations in wordings). The focused word is seen to reflect 'author-focused information', and the idea is to lead the users' (readers') attention to these. Notions like 'core theme' or 'important word' are rather diffuse because what obviously will be an important word or core theme to one user, need not be regarded as such to another user. Since the device applies a text-driven approach (leading attention to what actually occurs in the text), the user is free to select from a displayed list of focused words according to their own perception of what is essential in the specific information-seeking situation.

The device for word classification produces information utilised in the construction of specific-purpose thesauri with arrangements of 'important words' or 'cue phrases'. The concept 'cue phrases', here, refers to for example explicit linguistic signs of discourse elements (mapped onto a specific set of criteria applied during the identification of particular text zones), for instance words signalling or indicating that utterances have specific superordinate argumentative functions, (see Device Zone Sensor). The classification of cue phrases necessitates manual intervention and validation, and the efforts invested into this type of thesauri construction depend on the issue of Cost-Benefit-Performance within each user community. However, general and explicit words signalling problems, conflicts, risks, etc., are typically abstract words being of value in filter options applicable across domains.

Cue phrases systematised with reference to discourse elements can be associated with notions as 'classes of meanings'. The device for target word selection can be applied under the assumption that 'classes of meanings' as related to cue phrases, also may tend to repeat in neighbouring sentences. For example, the very general word 'problem' is an entry in a general thesaurus. This word is picked up as the current target word and the TWS device examines all the link sets for zones and displays all content words in the adjacent sentences. The set of words displayed can be further restricted to the words in the same grammatical class as the entry word selected from the general thesaurus, i.e., Current Target Word), and/or combined with information about lemma or word stems. This particular device thus supports the needed manual intervention and validation reflecting the words inner and outer context. The identification of cue phrases reflecting argumentative functions or discourse elements may also be based on matching according to grammar based request patterns.

EXAMPLE

A simple grammatical request pattern as (adjective followed by noun) will produce 'statlig selskap' as one of its results (state company, i.e., two nouns in English). In the collocation patterns covering 23 governmental reports related to oil affairs (when expanded with grammatical annotations and filtered accordingly), the file shows that 'statlig' co-occurs 117 in the first position to the left of 'selskap'. Since the grammatical word classes in 'statlig selskap' conform to a known simple grammar pattern, and due to the co-occurrence frequency, 'statlig selskap' will be determined to be a phrase, (and treated as a 'single term'—that is a contact to the underlying text). Thus the combined use of grammatical information and frequency of proximity information increases the precision regarding the determination of focused words or word constellations in the texts.

In the Norwegian language 'statsselskap' may be considered as near-synonym to 'statlig selskap' (a paraphrase). A grammar parser will recognise 'statsselskap' as a concatenated word ('sammensetning') with the two lemmas 'stat' (noun) and 'selskap' (noun). A stemming of the phrase 'statlig selskap' will produce the set 'stat' and 'selskap'. Thus, if one sentence contains the phrase 'statlig selskap' and a near by sentence (distance can be regulated) contains the word 'stats-selskap', the zonation procedure will capture these and add a score to the link set covering the pair of sentences. Other variations that may occur close-by, are for example 'statens selskaper', 'selskapene til staten', which also will be captured by iterative applications of grammar based request patterns.

Small variations in 'meaning' is ignored when the goal is to locate or detect a relative small set of documents out of a collection comprising millions of documents. In the present invention the goal is quite different—the variations in wordings are captured in order to strengthen the score (weight) assigned to certain text zones within each document. The text zones are a fundamental component in the method aiming at directing the users' attention to zones where the link set for the constituent sentences indicate a bundle of focused words or several co-occurring focused words. More specifically, the idea is: When the user selects a document for exploration, a text sounding board will signal information about zones in the document. With reference to the highly simplified example above, the board will inform the user that the current text (selected by the user and displayed in the text pane) contains 7 identified zones dealing with [stat/statlig <associated with> selskap] and preferably with indicators for discourse elements attached to the entry.

In the example below, let say that the user has selected the entries marked in boldface (Thematic association AND Discourse Element Indicator). The zones satisfying both criteria will be highlighted in the text pane. The criteria are grammar based, based on frequency (link set) and based on semantic-pragmatic information, (zones with several adjectives in the comparative form signal evaluations). HCI factors are not determined in the present embodiment of the invention, However, text zones are highlighted in light grey, the words signalling the selected thematic association (focused topics) are marked in blue, and the signals for discourse elements marked in another colour (green).

The reader can explore these zones and judge whether they provide information useful for the task at hand, and further activate an option for navigating to the next zone with the same focused theme, or shift to another focused theme. The display of zone information can be adjusted to text zones with the highest weight (score in link sets covering the zone and zone tuned against density measures) or display the zones in the order they appear in the text. Each zone has its own identifier (identifiers of edge sentences, thus making it possible to manage overlapping zones) and the traversal paths are defined over these identifiers (stored in separate files in the MAFS).

TABLE 4

| Zone Themes Thematic Associations <is associated with> | Discourse Element Indicator |
|---|---|
| stat OR statlig     selskap | problem |
| ... | evaluation (high frequency of adjectives in comparative form within the zone) |
| ... | solution |
| ... | |

A zone with several repetitions of the same noun (or phrases/paraphrases) over let's say 20 sentences (not necessarily so that the noun occurs in each sentence), will be assigned a higher weight if the noun also occurs with the syntactical function 'Subject' (tag produced by CG-taggers).

The link sets are based on the known text linguistic theory that bundles of the same word (or paraphrases) over some few sentences indicates a thematic zone. Increased precision may be obtained with words signalling discourse elements, for example by cue phrases for problem, solution, evaluation, etc. The idea is simply: If a set of nouns co-occur with one or several cue-phrases signalling a problem (indicates utterances about problems), this will evoke another interpretation than if the noun set co-occurs with cu phrases signalling a 'solution'. It is important to stress that the present invention uses the concept of indicators. Minor variations in language use, sincerity conditions, illocutionary force, etc. makes it impossible to state semantic relations in absolute terms.

The combined collocations reveal how often instances conforming to a grammar pattern occurs in the text. Since the invention is based on grammar patterns it is possible to discern (capture) nuance of utterances (text is seen as mediating communication between actors in a social context).

Thus the pattern (adjective comparative <followed by> noun), (and with options for regulating the distance as known in GREP searches), may give a result as 'better company' which may indicate an evaluation. The pattern (adjective positive <followed by> noun) resulting in 'good company' might in turn indicate more like a viewpoint (evaluation completed). A set of grammar based request patterns will be able to capture several types of wordings in evaluative utterances. The pattern (adverb <f-b> determiner <f-b> adjective <f-b> noun) may give the result 'not a good company'. In many systems words like 'not' and 'a' would have been eliminated by the stop list, although 'not' indeed changes the 'meaning' of the utterance. The combination of grammar patterns and collocations allows for a flexible extraction of information applied in the construction of attention structures.

Word Cue Phrase

Cue phrases are words or phrases that signal information about the discourse structure. A separate part of the classification scheme describes classes of cue phrases with reference to their role as indicators for discourse elements, and a set of criteria prescribing guidelines for the assignment of hyper textual links between text zones annotated with discourse indicators. The underlying assumption about discourse structures encompassing main lines as Situation-Problem-Solution-Evaluation is widely known within the field of text linguistics.

Generally, cue phrases are ambiguous and highly context-dependent. The present invention focuses on a rather small set of cue phrases (nouns and verbs) that may be said to send inscribed signals for the superordinate argumentative function in a text span. For instance, the noun 'conflict' is regarded as an explicit signal of some sort of problem being discussed. The specific type of signal used vary across genres, i.e., a word like 'crisis' is frequent in news reports, but when used in a governmental report it may be considered as an extraordinary signal and classified as an important word. Implicit signals for problems or solutions must be identified and interpreted by humans. The devices applied should preferably make it possible for a reader (user) to assign codes for discourse structure, and a set of code proposals related to text genre may support the user in this task. This calls for a device serving user-added codes and may be seen as a preferred facility connected to options for user-added text. The device for target word selection supports the identification of explicitly inscribed cue phrases.

Identified text zones (defined by zone link sets capturing certain lexical and grammatical information associated with pairs of sentences) can, in the present embodiment of the invention, be intersected with cue phrases (words or word constellations) that signal or indicate discourse elements. This covers for one of the elements in the notion that text reflects how the author's focus of attention is moving Cue phrases indicating how the discourse evolves are considered as essential for the classification of text zones with respect to the notion of discourse elements. Cue phrases that indicate discourse elements are words and word constellations that signal description of situations, background information, negative evaluations indicating problems, explicit signals of problems, solution proposals, solution comparison, solutions selected (decisions), evaluation of solutions, and so on. Some of these indicators are directly inscribed in text, others are subtler and needs in-depth analysis in order to be captured and if users are willing to accept the costs involved. It is important to note that other types of combined information adds to the cue phrases in the process of identifying or indicating discourse elements. These other types of information include verb tense, broad semantic classes for verbs, broad semantic classes for nouns (e.g., juridical persons, physical entities, events, etc.) and the nouns' grammatical form, characteristic use of adjectives indicating evaluations, and so on. The present invention separates devices capturing the different information types, thus making it possible for the user, or preferably by pre-defined search macros, to combine contacts displayed in the text sounding board that refer to the information types captured from the underlying texts.

Organised sets of cue phrases have to be constructed for the purpose and by manually intervening computer-supported procedures that apply 'link cycles' in a Target Word Selection Procedure (TWS). The procedure starts by extracting known cue phrases and synonyms (or related terms) in preferably general thesauri. Any language includes words (nouns, adjectives, verbs, adverbs) referring to, or immediately evoking associations to for instance problems. Some simple examples may illustrate the point given; a noun set as {pollution, disturbance, crisis, crash on exchange, trouble, etc.}, and similar for adjectives as {declining, insecure, failing, difficult, laborious}. Based on a start set chosen from a general thesauri by following links of term relationships, the TWS procedure's first cycle identify and locate matching word occurrences in the text and identify content words in the adjacent sentences (preceding and subsequent with options for regulating distance). The application designer examines the results from the TWS procedure's first cycle, and marks words or phrases of interest, and which may have a discriminating effect for the identification of discourse elements. The new detected cue phrases from the inner context in the neighbourhood of matching words from the first TWS cycle are transmitted to the second TWS cycle. Likewise, again new detected cue phrases are transmitted into the third TWS cycle, and so on. At present, attempts to locate word lists organised according to the principle of discourse elements have been unsuccessful. If located, such available word lists may preferably provide for the initial target word set transmitted into the first TWS cycle. However, potential available word list must be tuned according to the prevailing genre in the current document collection selected by the user for review/exploration. It is well known from sociolinguistics that style and vocabulary differs between professions, level of authority, level of norms (legacy or other social norms), level of competence, and so on.

Criteria Pragmatic Author Focused Information

Author-focused information is information emphasised by an author of the document. The generation of word lists comprising focused words, may start by including nouns and noun phrases specifically signalled by the author in for example titles, headers at all levels, sections with particular lexical signals, particular chapters, or other lexical signals by which the author presents important points of the document. The device for generation of particular word lists includes series of criteria, which may be characterised as pragmatic, i.e. features related to the documents' situational context, and features related to the user community.

Word Focus

The concept 'focused word' or author-focused word refers to one type of textual signature, i.e. the set of words registered in the set 'Word Focus' shares some characteristic qualities reflecting aspects of the author's attention when writing the text. In particular, the devices grouped as mostly related to the 'Apparatus Zonation', operate on the DPB Word Information and derive sets of author-focused words in each intratextual context. Each set is further consolidated to cover for intertextual contexts, i.e. the same word type occurs in several texts extracted from a document collection in which the documents' share some features referring to the situational context.

In the first round the relative frequency of the main grammatical word classes are calculated and word types occurring above a certain threshold value (determined intratextually, for example from 0.03 to 0.05) are stored in a temporary file. In the next round this set of words are intersected with the combined collocations in order to identify how and to what extent the words in the temporary file are regularly modified by other words also registered in the temporary file. The detection of word constellations that regularly co-occur causes a weight score to be assigned to the word types constituting the regular word constellations. The regularity is assumed to signal one aspect of the author's attention. The Word Weight value will preferably also be increased if the device for word classification conveys that the word is to be considered as an important word. For example in cases where the word matches with entries in a list of user-focused words or other existing word lists, or words/terms encoded in domain specific thesauri.

Additionally, the word weight can be increased in the word is re-occurring in sentences classified as important sentences. Another option is to assign an added score if the word frequently appears in sentences where the main verb is in the present tense. These sentences may indicate a higher significance than other sentences in that some of the author's opinions will be uttered in the present tense, i.e. referring to the logical now in the author's situational context.

Author Focused Words and Redundancy

Author-focused information is information emphasised by an author of the document. The generation of word lists comprising focused words, may start by including nouns and noun phrases specifically signalled by the author in for example titles, headers at all levels, sections with particular lexical signals, particular chapters, or other lexical signals by which the author presents important points of the document. The device for generation of particular word lists includes series of criteria, which may be characterised as pragmatic, i.e. features related to the documents' situational context, and features related to the user community.

Redundancy in the form of the same nouns highlighted in all the zones in which they occur, can affect the users' perception of 'newness' or the ability to distinguish the moves in the author's focus. The present invention gets around redundancy by providing predefined focus chains and highlighting 'new words' (nouns except those forming focus chains) within each zone intersected by the focus chain. The words in focus chains are displayed in special-designed exploration panes (text sounding boards) from which the user can select preferred chains for text traversal.

In order for the user to select a text (from a document) from at set of texts (from a document collection), the present invention informs the user how the author of a text deals with a theme by providing several options for navigating through the text zones. The user traverses text zones and can preferably at any point give instructions for explorative directions (pass all zones hastily and/or consider only zones with certain word occurrences). At each cursor point, the user may preferably shift from one navigational option to another.

In the text sounding board, the author-focused information is visualised in panes making it possible for the user to apprehend or conjure up a mental image of themes in the text. The pane content may be restricted to show only words within zones with strong cohesive link sets, words within zones that contain certain words (for instance as specified by the user), only zones that are bonded or all zones. It is also possible to show word collocations from all sentences (in all cases the pane content is restricted to content words and with specific syntactic functions within sentences). One particular pane is denoted as the 'triple track'. From this pane, the user can select (activate) on or several words in one of the tracks, and the zone traversal path is accordingly restricted to those zones containing the user requested information. After selection, the panes will inform the user of the number of zones included in the traversal path. When a author-focused word in for example the left-most track is activated first, with the word in the first track, and in accordance with words in the roles of subject, verb and object. The apparatus underlying the triple track gives a grammar based attention structure that makes it possible to comprehend features of the selected words' nearest inner context. By moving up, down and sideways in the triple track, the user gets a theme view of the texts. At all times, the text displayed in the text pane will be adjusted in line with the words that the user selects/activates from the triple track. A special device is designed for the automatic alignment between the content of the triple track and the content of the text pane. Preferably the direction of alignment can be switched, in that when a user moves the cursor downwards or upwards in the text pane, the triple track captures and reflects information stored in the links sets for the text zones passed over.

User Focused Information in the Vicinity

In addition to the apparatus for identifying zones in the texts, there is an apparatus for presenting user-focused information in a text pane interconnected with the content displayed in the text sounding board, in which the user is given flexible options supporting text driven exploration and navigation. The Top Layer in MAFS contains files in XML-format, and the present invention applies well-known techniques for visualisation in accordance with XML-tools known in the prior art. User-focused information is transmitted via the text sounding board, that is, when the user is exposed to the content in the various panes in the text sounding board, she may select/activate parts of the content. The content selected/activated at a point in time is denoted as the 'current user-focused information'. The user-focused information, i.e., a set of particular words or particular words in combination, is highlighted in the interconnected text pane. The user-focused information may be highlighted in the whole text or the highlighting may be restricted to appear within the zones that enclose all or parts of the user-focused information (the zones themselves being highlighted in grey tones). The user-focused information is thus displayed in its inner context (the text from which the content presented in the text sounding board is derived).

The present invention supports options for the display of words in the vicinity of user-focused information and the present embodiment of the invention supports flexible options that can be tailored to meet the needs of particular user communities. For example, if a user has selected and activated a distinct noun or sets of nouns displayed in the text sounding board (nouns referring to one specific actor (Statoil) or group of central actors, e.g., oil companies), these nouns are highlighted in the text pane. As mentioned above, the user can restrict the visualisation device to only highlight nouns that occur within the zones where the particular nouns are included in the zones' link set. In the case of nouns in this example, the user can request for the display of immediate subsequent verbs for each occurrence of the noun or group of nouns in question. The set of subsequent verbs can further be restricted according to tense and/or according to broad semantic classes (see Word List Semantic Class Verb). Such broad semantic classes include verbs that commonly and explicitly refer to certain types of utterances or acts. Thus, the user can determine details with respect to the plain attention structures, and in conformity with the underlying grammatical information transformed into a specialised XML-format stored in the Top Layer of MAFS. Preferably the users are supplied with a wide assortment of pre-defined and preferred search and display macros because it cannot be expected that users master the grammatical information concealed in the underlying file structures.

Criteria Pragmatic Sentence Type

Successive sentences may be evaluated as being of the same type. For instance, sentences or sub-sentences that are list elements. In other cases a feature may be that sentences do not contain any subjects, verbs, etc.

It is expected that most documents will be produced according to an XML-schema, know in the prior art. This will relieve the design work, and these issues are therefore not dealt with in any detail. However, at special detector locates sentences without verbs, as is often the case of lists. If the texts are well formed in conformance with XML, the device that calculates zone borders can easily be adjusted to cover for such more typographical features.

Sentence Class

The Sentence Class information may be used when identifying and representing superordinate semantic structures in texts i.e., discourse structures.

For instance, if the sentence contains words classified as 'Actor Important' or words or phrases classified as indicating discourse elements, this attribute type in the DBP Information Sentence can be assigned a code (or a set of codes) representing such classes of superordinate argumentative function or discourse elements. The set of code types is inscribed in a classification scheme. The codes are further utilised in the zonation process, specifically the device that calculates zone weights. The zone weights are further transmitted to a device that generates zone traversal paths, see 'Device Zone Bond Generation'. The criteria based on sentence class influence the ranking of zones to reflect one aspect of 'importance' (pragmatic weight.

Word Position Relative

A particular device subordinated to the device for zone bond generation utilises information about the words' relative position within sentences, information that is also preserved in matrix consolidated into the zone link set. The device also takes into account the words' grammatical class and for nouns also their syntactical function. The calculation of similarity is a simple vector comparison. However, if the sentences, or alternatively are within zones marked with a discourse element indicator, the display of otherwise similar sentences can be notified as different.

The following elements constitute parts of the information in the link sets and the words listed in order of appearance in the sentences. Sentences marked as 1 and 2 share 4 noun elements. The 4 noun elements are in the same order. The 4 nouns have almost the same weight (government <is a> important actor, petroleum fond <is a> focused word, Norwegian <is a> important word (determines location), welfare state <is a> focused word). Shared subsets of words and with almost the same weights assigned indicate thematic relations. However, sentence number 2 also includes a clear sign classified as 'Problem indicator', and sentence number 1 correspondingly includes a clear sign of an expressed opinion (ascertain). A clear sign diversifies two sentences, which share another feature—four identical words in the same order. If such discourse signs are differentiated, it will accordingly be possible to distinguish between otherwise like sentence surrogates (i.e., representative extracts from a sentence) and this information can furthermore be signed in the text sounding board. Sentence 3 and 4 show an example from two political party programs, the same political party, from 1993 and 1997. Long distance comparisons, across texts with a considerable time span in between, can yield content transmitted to the triple track that may be of interest to user engaged in a in-depth comparative text exploration. The two texts in this example share some features related to the situational context—they are both extracted from political party programs, and related to the same political party, and surely indicates difference in opinion. In the latter two cases the noun 'government' is also encoded as subject.

S1 {government, ascertain, petroleum fond, secure, Norwegian, welfare state}
S2 {government, petroleum fond, Norwegian, welfare state, danger
S3 {government, await, gas power plant}
S4 {government, support, gas power plant}}

The present invention relates to a method and system for the construction of attention structures that lead the users' attention to certain parts of the texts. There is made no attempt to calculate a 'similarity of meaning'. If 10 or 100 different sentences contain exactly the same set of nouns, and even in the same order, the present invention does not suggest that the sentences have the 'same meaning'. Minor differences, for instance related to adverbs, adjectives in superlative form or more advanced variations related to rhetoric phenomena, may give raise to dissimilarities in 'meaning'. Degree of similarity based on the notion of 'content as a string of words', may indicate that items (sentences or larger text spans) are thematically related.

Device Pragmatic User Profile Spin-Off

The User Profile Spin-Off is simply a set of words or phrases based on a processing of the User Profile aiming at providing criteria applicable in for instance the device for constructing lists of user focused words. Subsequently, lists of user-focused words can be transmitted into the set of grammar based request patterns, in which some of the grammar based operands iteratively are substituted with user-focused words.

In this setting, the grammar based request patterns are made more specific. The particular device selects the grammatical search macros iteratively, and for each of them, also iteratively, replaces fixed operands with operands referring to the content of the User Profile. The fixed operands thus change their role to be 'open operands' and where these open operands successively are filled in with words known to be of interest to a particular user or a group of users. In the device mentioned, the open operands will preferably be automatically adjusted, for example by iteratively increasing a distance operator allowing 2 or more 'not specified words' in between the sequence of words extracted from the User Profile.

The particular device requires that the User Profile be pre-processed by a grammar tagger, at minimum POS-tags covering the four major grammatical word classes. The set of grammar based search macros can accordingly operate on the content of the User Profile and preferably register bundles of frequent pattern occurrences. The User Profile may include stretches of texts that the user previously has marked out as noteworthy. In a similar way as mentioned above, the operands within the pattern occurrences identified can be replaced by open operands, thus functioning as a iteratively changed search expression operating on the texts that the user finds of relevance to explore. The pattern occurrences are iteratively transformed to changing generalised patterns in that the open operand can be 'moved' one position at the time within the pattern.

This particular device can, presupposed the existence of a User Profile, relieve the user from many tasks related to text exploration and navigation. The applications of the present invention can adapt to the User Profiles and for example only generate zones and contacts displayed in the text sounding board that into some detail matches information held in the User Profile. The system can thus automatically deliver attention structures, which to some degree, reflects information that the user previously has experienced as convenient in a text exploration task.

Apparatus for Filtering

The previously described apparatuses in the present invention (acquisition, segmentation, disambiguation, zonation) generated the information stored and managed in the present inventions database partitions managed by a DBMS and IRMS. The integrated set of database partitions constitutes the present inventions's selectivity.

Figure 10:
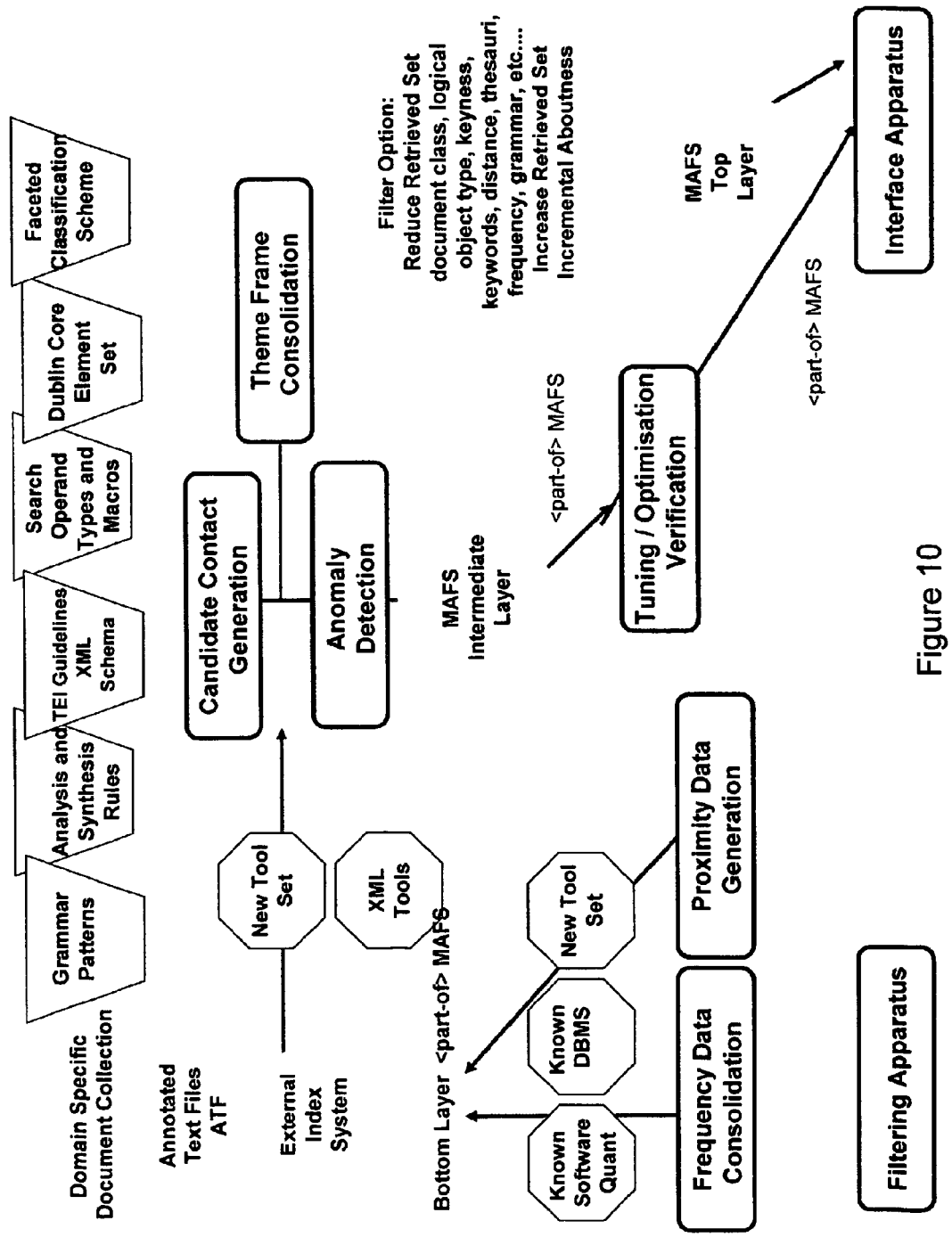
FIG. 10 gives a schematic representation of elements comprised in an apparatus for filtering according with the invention.

The selectivity of the present invention incorporates and supports:
grammatical information derived from CG-taggers
semantic information and the transfer of techniques related to thesauri construction
pragmatic information related to text understanding and features related to the situational context
statistical information derived from applying a reference corpus and computing keyness, and keyness of keyness
frequency information combined with grammatical information in relation to interconnected documental logical object types
zonation and filtering realised as intersecting chains, which embody the various types of information, outlined above The present invention aims to enhance the exploration of text through various filtering options that operate on the database partitions. Text exploration involves a variety of tasks ranging from problem definition to the assessment of to what extent the presented results in the preferred interface is useful with respect to the particular interpretative task the user is engaged in. The present intends to support the user in these tasks. Basically, the approach is based on a predefined set of filtering options specifying rules for reducing and extracting information from the database partitions, as illustrated in FIG. 10. The filtering options organise the contacts (arranged either in simple panes, and/or in the most advanced option, which is embodied in the triple track) and accommodate these to various types of moves performed by the user operating on the text sounding board. The term move refers to the users' actions (selections and activations of displayed contacts).

Traditionally, there is made a distinction between three kinds of moves or selections based on how the user evaluates the search result:

there are too many text units or contacts in the result (futility point exceeded)

there are to few text units or contacts in the result, or the text units or contacts are considered as not relevant or off-target The anticipated user moves are accordingly that the user will try to apply filtering options in order to:

reduce the retrieved set of text units or contacts (with the intention to increase precision), increase the retrieved set text units or contacts (with the intention to increase recall), However, the selection of a new constellation of contacts or the activation of a filter or predefined search macro will not necessarily reduce the retrieved set. Instead a completely new set is retrieved. The underlying search selectivity determines in what ways it is possible to construct search expressions aiming at satisfying the user's search intentions.

The present invention's preferred selectivity rests on the principles within the free-faceted classification scheme, which prescribes guidelines for the organisation of the set of chains that are generated in the apparatus for zonation. The filtering options are, in principle, predefined search macros that are structured in layers, from general to specific where the most specific involve iterative intersections between chains. The detailed description below explains the organisation of search macros in layers, in which the lowest level are denoted as building blocks, the next level comprises constellations of such building blocks (denoted as functions), and the level above comprises groups of functions, denoted as constructions.

When a user perceives her retrieved set as too large or too restricted, the underlying selectivity makes it feasible to construct a system that depict useful search directions by providing an orderly set of predefined search macros. That is, the links between search macros and the displayed information shall tell the user whether a superior or subordinate macro will increase or decrease the retrieved set. In the preferred embodiment of the present inventions, the names assigned to the macros, together with short explanations will provide information about the available set of filtering options. The exact realisation of these facilities is dependent on the HCI perspective adopted.

Classification Scheme

The classification scheme is a tool used when the propositional content of a text unit (sentences) is analysed, reduced and represented into a chain as explained in section 'Apparatus for zonation'. The classification scheme preferably applied in the present invention is further elaborated in Aarskog (1999). The principles underlying the free faceted classification give guidelines for the organisation of the various chains generated with reference to the set of zonation criteria. The chains are classified as members of one or more facets as specified in a classification scheme. In that each chain or subset of a chain can be a member of more than one facet, the present invention embodies a structure allowing the same word type to appear in different semantic roles. For example, the contact 'oil company' may be a member of a facet for 'organisation' and may at the same time be a member of a facet 'oil affairs'. The classification scheme also determines the association types between categories and facets, in which each member in a facet may embed another facet. A theme frame is a constellation of contacts, i.e. subsets of chains, organised as interlinked facets. The filtering options can capture these facets and intersect them with the information that is stored in the database partitions (DBP Information Zone Link Set, DBP Information Word, DBP Information Chain, etc). The present inventions' arrangement of subset of chains according to the rules or guidelines in the classification scheme supports the notion of data-independence. That is, it is possible to change the facets, or introduce new facets, or relate set of facets to the interests of particular users and without subsequent changes in the filtering options. The main structure in this classification scheme is simple—it consists of five categories. Each category is further divided into facets, which in turn may be divided into more detailed facets. This evolving structure is based on free faceted classification principles in which the final set of facets reflects the classification performed. The subsets of chains assigned to each facet, and how these subsets are arranged within a facet, gradually determine whether a facet should be divided into subordinate facets. The simple structure and the guidelines for use reflect an important perspective on the content representation—it is possible to construct very general theme frames and also theme frames with high specificity. The decision on level of generality-specificity will be based on what a certain user community perceives as relevant to include in the system's selectivity.

Modus Operandi

The present invention embodies sets of devices that operate on the database partitions in order to construct attention structures, which are organised in various 'modus operandi'. The design of the modus operandi is inspired by theory from ancient rhetoric, specifically Cicero's 'De Oratore I.xxxi', and each modus preferably supports the activities known as Inventio, Dispositio, Elocitio, Memoria and Actio. The design model based on ancient rhetoric is further elaborated in Aarskog (1999). Predefined sets of filtering options will preferably be arranged in different levels of 'modus operandi' and the preferred embodiment of the present invention includes five partitions that each preferably will be put in conformity to modern HCI known in the prior art. The various 'modus operandi' are seen as conceptual model that guide the structuring of the interconnections between the wide set of filtering options. Each level gives access to certain predefined compositions of basic building blocks (any kind of composition must be based on a preceding decompositions). The set of filtering options operate on the series of interlinked database partitions described in previous sections, as well as the Top Layer of MAFS which keeps record of all the intermediate files generated dynamically during the filtering. Basically the filtering options comprise a set of iteratively applied reduction functions (each composed of a rather small set of basic building block, or search patterns with 'open operands'). This design preferably opens for parallel processing. The reduction functions transmit the results in intermediate files that are captured and composed by another set of functions. Finally the reduced and composed result is transmitted to a device that sorts, ranks, styles in accordance with HCI guidelines and displays the product in the text sounding board.

The filtering options in the present invention embody a particular design in which recursive applications of reduction functions are 'grouped' together in higher order constructions. These constructions are in turn is divided into five main 'modus operandi' These 'modus operandi' manifest the complexity of the attention structures that are generated during the users' interaction via the text sounding board. The middle level constructions constitute ordered sets of filtering options in which group number 2 is more complex than group number 1, and where number 2 compensates for disadvantages or failure of discrimination or diversification encountered via group number 1. The term 'disadvantage' in this setting means that the displayed result in the text pane and in the panes of the text sounding board does not satisfy the users' intention. The particular design involving modus operandi enclosing groups of constructions, which enclose functions, which enclose basic building blocks opens for a highly flexible and yet efficient filtering. The building blocks constitute search operators known in the prior art, and a set of aggregated search operands, which in the present invention refers to the documental logical object types (DLOT) and the set of attribute types attached to each type of DLOT. At the generic level the set of attribute types is denoted ATOT, the set defined for text is TATOT, the set defined for zones is ZATOT, the set defined for sentences is SATOT, and the set defined for words is WATOT. Each set is realized in separate interconnected database partitions according to the notion that each DLOT encloses another DLOT, and in which zones are considered to be derived documental logical object types.

The principle of enclosure guiding the design in the preferred embodiment of the invention provides for a system's model and implementation that may be conceived as an 'ever expanding matrix'. That is, the specification is based on the principle of rounds and levels in the free-faceted classification scheme. A design following the guidelines of a free-faceted scheme allow for parallel processing which is preferred in the present invention.

The set of Modus Operandi is considered as 'conceptual models' for what is to be included (or displayed at one point in time) in the present inventions interface, preferably denoted as the Text Sounding Board, which is interlinked with a Text Pane. The adaptation of HCI factors will preferably make the interface comfortable in that it is considered as important that not too many options available at 'all times'. HCI factors will preferably guide the transition from one modus operandi to another more advanced modus. With respect to the users' need for depth in their exploration and navigation, the interface should preferably display a minimum set of necessary 'buttons' attached to the text sounding board partitions.

The present embodiment of the invention constitutes 5 Modus Operandi given the preliminary names: Plain Modus Operandi, Crafted Modus Operandi (qualified), Quizzed Modus Operandi (multi-qualified), Commix Modus Operandi, Virtuous Modus Operandi.

The following section briefly describes the structure of enclosure involving both DLOTs and the main principle for the arrangement of filtering options underlying the various modus operandi.

Conceptualisation of Building Blocks in Search Macros

At the conceptual level, the filtering options may be conceived as a collection of building blocks that are interconnected in a multi-layered system of predefined search macros. The search macros are organised in networks following the same principles as in the construction of thesauri, which is the principles underlying the free faceted classification theory. The inter-linked search macros form an important component in the system of logical access points (system's selectivity) to text units. The idea behind the construction of a predefined set of search macros is to build a tool set for information filtering. The focus is on the use of grammatical information extracted from the output from CG-taggers that are transformed into codes embodied in APO-triplets (part-of Theme Frame). Nominal expressions are separated into two facets denoted as 'Agent' (nominal expressions with the grammatical function Subject within a sentence) and 'Object' (nominal expressions with the grammatical function Object within a sentence). A Theme Frame differs from other types of word lists in that words with certain grammatical functions are displayed (default option) in their order of appearance in the text. The main grammar pattern model is composed of two sets of regular expressions:

One set operates on two main search operand classes, the grammatical word classes of nouns and adjectives. These regular expressions give access to the texts 'world-building elements'. The other set of regular expressions operates on the grammatical word classes of verbs and adverbs, giving the indicators of 'function-advancing elements' in the text. These two sets, together with other regular expressions operating on other word classes, provide a grammatical grounded selectivity. Combined in search macros made available in special designed window panes (with all the functionality that follows), the user can explore underlying text and further make moves that reduce or increase the search span.

The overall structure at the highest abstraction level is outlined below:
Type: Grammar Pattern
   <gives rules for> cat5 fac0 Subject Matter
   <gives rules for> Type: Search Macro
   Type: Grammatical Information <is abstracted into>
   Type: Regular Expression <is part of>
Type: Grammatical Information
   <output from process> Process: Text Disambiguation
   <is derived from> Type: CG Tagger Output
   <is abstracted into> Type: Grammar Pattern
   <is assigned to > Type: DLOT Word
   Type: Grammatical Form <is a>
   Type: Grammatical Function (GF)<is a>
   Type: Grammatical Word Class (GWC)<is a>
Type: Grammatical Function (GF)
   <is a>Type: Grammatical Information
   Type: GF Object <is a>
   Type: GF Subject <is a>
   Type: GF Transitivity <is a>
   Type: GF Verb Tense & Modality <is a>
Type: Grammatical Word Class (GWC)
   <is a>Type: Grammatical Information
   Type: GWC Adjective <is a>
   Type: GWC Adverb <is a>
   Type: GWC Noun <is a>
   Type: GWC Verb <is a>
Type: GWC Noun
   <is input to> Type: Filter Noun
   <is a> Type: Grammatical Word Class (GWC)
   <is part of> Type: GWC Nominal Expression
   Type: GWC Noun Common <is a>
   Type: GWC Noun Proper <is a>
   Type: SVO Entry Noun <is subset of>
   Type: SWC Noun <refers to>

The main set of search operand types is outlined below, and the next section describes these into more detail with respect to how they are related to basic building blocks, functions and groups of functions.
Type: Search Operand
   <is input to> Type: Search Macro
   Type: Association Type <is a>
   Type: Attribute Type attached to DLOT (ATOT)<is a>
   Type: Category <is a>
   Type: Chain <is a>
   Type: Code <is a>
   Type: Code Family <is a>
   Type: Contact <is a>
   Type: Documental Logical Object Type (DLOT)<is a>
   Type: Dublin Core Element Set (DCE)<is a>
   Type: Facet <is a>
   Type: Free-Text Index Term <is a>

Type: Frequency Information <is a>
Type: Open Operand <is a>
Type: Search Macro <is a>
Type: Documental Logical Object Type (DLOT)
    <is an object in> Type: Document in Collection
    <output from process> Type: Search Macro
    <is a> Type: Search Operand
    <is a> Type: Text Unit
    Type: DLOT Header <is a>
    Type: DLOT Identifier <is assigned to >
    Type: DLOT Paragraph <is a>
    Type: DLOT Sentence <is a>
    Type: DLOT Title <is a>
    Type: DLOT Token <is a>
    Type: DLOT Word <is a>
    Type: DLOT Zone <is a>
    Type: Theme Frame <refers to >
Type: Frequency Information
    <refers to > Type: DLOT
    <is a> Type: Search Operand
    Type: Frequency Chain Level <is a>
    Type: Frequency Document Level <is a>
    Type: Frequency Grammar Level <is a>
    Type: Frequency Sentence Level <is a>
    Type: Frequency Zone Level <is a>
    Type: Sentence Density <is a>
    Type: Sentence Weight <is a>
    Type: Zone Density <is a>
    Type: Zone Weight <is a>

The specification of search operands shows that search macros also are search operands (recursive). This means that an active search macro at any time can be combined with search operands referring to the content of the various types of categories and facets being specified according to the rules given in the classification scheme. The category Agent is by default divided into facets for persons, organisations, social/work-related positions, and other types of subject matter divided into facets based on semantic criteria. These categories/facets can be activated as additional filters operating 'on top' of the grammar based search macros. The search macros and filters are further organised in layers, and interlinked in a semantic net.

The codes assigned to the categories/facets in the second layer are results from the target word selection procedure, but also includes wordlists extracted from public available information (register of job titles, register of companies, etc.). These filters will of course have to be tuned according to what a certain user community may find interesting to make 'more' retrievable.

The search operands, including search macros, organised in networks, in fact represent a kind of 'concept abstraction'. The degree of abstraction when these concepts are used as search operands will of course have an effect on retrieval results. A proper realisation of this structure should therefore include options for query modifications. A search macro represents a conjunction and/or disjunction of several search operands, each referencing a certain level in a concept hierarchy (index terms organised in abstraction levels). The user should be given options to select 'moves' for each of them separately—for instance by providing options for moving up one or several levels (query expansion aiming at higher recall) or down (query reduction aiming at higher precision). Each search operand is considered as an object with options for showing embedded codes (index entries) or embedding codes. When a user selects a replacement, this new index entry is the current search operand within the modified current search macro (and the modified search macro can be stored for later use).

The upper layer of predefined set of grammar based search macros are directed towards the component APO Triplet (part of Theme Frame). When a user has explored the results from activating these search macros, she can then activate components in a system of more 'specific grammar based search macros'. These are regular expressions preferably with names that give a meaningful signal to the user. The option has some resemblance with traditional KWIC indexes; however, they are made available on top of more forceful grammar based reduction devices as explained in the section 'Zonation Criteria'. Combined properly and according to specific needs in a user community, and not at least, given names that signal their characteristic features, the user will have a forceful and sophisticated exploration tool at hand.

An interpretative layer of search macros is founded on issues related to discourse described in the section 'Zonation Criteria'. Within text, there is a kind of superordinate communicative function and it is possible to identify cue phrases (or lead functions) for portions of the text. For instance, when reading a text, the reader experiences that segments concern 'a certain actor expressing opinions about 'something' considered to be a Problem', 'an actor argues against proposed solutions', 'solution proposals are evaluated or compared'. These lead functions are discovered during an interaction between the reader and the text (the text being a delegate on behalf of some author). However, highly structured text from professional authors (and markedly within some professional domains as for instance law), the text contains structural signals as well as lexical signals that mark out some sections in the document. In order to identify and encode these text portions, it is necessary to record phrases (word constellations) that signal lead functions. Cue phrases are phrases with lexical signals (words) indicating some aspects of the thematic matter dealt with in a text span (sentence, zones) may be registered in a separate facet (cue filter). However, lexical signals to for example problem may be explicit or implicit, in the latter case for instance expressed as negative evaluations of the situation described (including a negative evaluation of a proposed or selected solution). The establishment of such contacts is thus considered to be of semantic-pragmatic nature and an exhaustive encoding will by necessity require human intervention/validation. If this is of interest in a user community (balance between cost and performance), cue phrases that have a high score from validation procedures will be included in 'Type: Filter Cue Phrase'. These filters will vary with respect to document genre (laws, reports, etc).

When encoded, a search macro giving the user options for selecting a facet as filter, will retrieve these text units (the address of all types of units may be derived from the documental logical object type DLOT Identifier).

Since the main search macros operate in a rather limited set of grammatical tags, they will not avoid the ambiguities in the text. However, compared to the traditional free text searches (even with neatly designed interfaces and user support), the present embodiment of the invention shows that filtering based on quite simple regular expressions is promising. When realised in full scale, this set of techniques has a prospect of interest to users within various types of organisations. Different user communities must preferably be supported by tailored search macros based on the combination of grammar based search operands (rather static) and semantic search operands (dynamic/evolving). The arrangement of search macros can be tuned to serve typical information needs within a 'user community'. The question is what could be seen as a minimal and necessary set of search macros and what is the 'best' way of arranging these in layers. The present embodiment of the invention will preferably be transferred to an experimental setting where user representatives within a certain domain will provide feedback in the process where the present embodiment of the invention is to be converted into a robust technological platform. Representatives from the chosen user community will be exposed to different sets of grammar based search macros, filter options, interface design, etc. By interviewing the representatives, the goal is to identify how the components should be interlinked in a detailed design in order to maximise the system's potential exploratory capacity.

Overview of Functions and Groups of Constructions

The descriptive overview of basic building blocks, functions, constructions and modus operandi is given in a simplified version of the meta-language BNF.

There are three important, yet simple and basic functions that operate on the database partitions (DBP). These are:

Reduction Function (ReFun): Denotes the basic set of functions that reduces the files/tables according to reduction criteria (see section 'Apparatus Zonation'). The reduction functions detect matches between external values (given/selected in the text sounding board) against all internal values (stored values in the set of DBP) thus producing a set of entries denoted as Logical Access Points (LAP) that are further processed in the Extraction Function.

Extraction Function (ExFun): Denotes the set of functions that extracts one current text or part of text (one or several sentences, one or several words, etc) as specified in the text sounding board.

Attention Function (AtFun): Denotes the set of functions or compositions of ReFun+ExFun. The compositions produce text-driven attention structures in the more advanced Modus Operandi.

```
<Text Sounding>::=  ( <AtFun> ) | ( <ExFun> )
<AtFun>::=          <opecal> ( <ExFun> ) | <opebol> ( <ExFun> )
<ExFun>::=          <atot> | <atot> (<ReFun> )
```

Object Types and Attribute Types (DLOT and ATOT)

The operations (denoted as building blocks, functions, and groups of constructions) operate on the DBPs (database partitions), organised as layered levels, each subordinate level consolidated in the one above, of information about the object types that are pre-processed by the apparatuses for acquisition, segmentation, disambiguation and zonation.

The main concept is that of Documental Logical Object Types, abbreviated as DLOT. These object types include all physical or derived objects contained in a document. The notion of Object Type covers all types of media—audio, video, pictures, text, etc. The present invention preferably focuses on the object type Text.

A Word is the smallest textual unit. A Word is a DLOT at the lowest level in a hierarchic structure. Each Word is part of a Sentence, and a Sentence may be part of derived DLOTs, denoted as text zones. If the texts' structure is properly annotated with XML, the sentences may be treated as objects within common structural units as paragraphs, sections, etc. A Sentence is a part of a Text (though a specific text may include only one sentence), and the Text is in turn a part of a Document.

The list below shows the hierarchical arrangement of these DLOTs:
WITHIN (Word, Sentence),
WITHIN (Sentence, Zone),
WITHIN (Sentence, Text),
WITHIN (Zone, Text),
WITHIN (Text, Document),
WITHIN (Document, Collection).

A Zone is a derived Documental Logical Object Type (DLOT) and is based on the calculation of feature similarities between pairs of sentences throughout the text (See 'Apparatus Zonation'). Each DLOT has attached a series of Attribute Types. These named attribute types designate the data resulting form various types of text processing. For instance, average sentence length, average word length, the 'reading' of each word, the lemma of each word, the lemma's frequency within a text and within a collection of texts, the word's grammatical class, and so on. The apparatuses operate on the internal values assigned to these sets of attribute types and transmit derived values that are assigned to other attribute types.

At the generic level the attribute types are denoted ATOT, Attribute Type attached to Object Type. The definitions of the building blocks, functions, etc, refer to ATOT, which may be considered as an 'open generic operand' that can be replaced by its specific kinds. Thus, DATOT denotes the attribute types attached to Document (<is-a> (Document, DLOT)), (<attached-to> (DATOT, Document)), <is-a (DATOT, ATOT)). The attribute types attached to the object type Word is denoted WATOT, thus <is-a> (WATOT, ATOT), <is-a> (SATOT, ATOT), and so on. SATOT refers to sentences, ZATOT refers to zones, and TATOT refers to text.

Each set of DLOT and ATOT and all operations performed on them are documented in the present inventions preferred Information Resource Management Systems, designed according to the general guidelines specified in the ISO standard for IRDS (1986).

Reduction Functions

The Reduction Functions (ReFun) operate on the database partitions containing data associated with the ATOTs. The present invention applies a special-designed XML-file format, at present, stored and managed in a RDBMS known in the prior art. The files/tables are annotated and organised in multiple levels (MAFS=Multi-Levelled Annotated File System).

The reduction is based on a set of criteria and these criteria are specified as belonging to certain types, see Zonation Criteria. When referring to ATOT in the following description, this means any kind of Attribute Type attached to any of the Documental Logical Object Types stored in and managed by the system.

ReFun is defined as recursive, which means that the function may be activated several times in a 'nested' fashion, and where the intermediate results are stored in intermediate files, and/or stored as persistent files that are consolidated or 'pushed upwards, in the MAFS, and/or possibly ending up for closure in the database partitions (DBP).

In the present invention ReFun is defined completely given that:

The system manages all attribute types available for further processing. Some of the attribute types together with their value sets are displayed in special-designed windowpanes in order for the user to select/activate displayed attribute types and/or value sets.

The internal values (those values that are actually stored in MAFS or DBP) and selected/activated by the user (or via a recursive call to ReFun) are denoted as VALUE (abbreviation VAL).

A set of operators known in the prior art, which at the generic level are denoted OPER (search OPERand). A Search Operator <is part of> Building Block. The definition of ReFun is therefore, basically, a general grammar describing allowable types of patterns for search expressions. The table below gives an overview of the different types of operators classified in two groups depending on the number of operands it operates on (MONO=a single operand, and DUO=two operands).

TABLE 5

<ReFun>::=
<operel> (<atot>, <val>)|

<operel> includes the relational predicates (ant thus
is a type of <opeduo> = operates on two operands.
All the different types of ATOTs are managed in separate
DBPs. ATOT -> WATOT -> {Wo-Id, Wo-GC, Wo-lemma, . . . }
If the current windowpane in the text sounding board is
on the DLOT 'Word', this will constrain the set of
ATOTs available for reduction (or filtering) - in this
case the set of attribute types denoted as WATOT. Note: The
non-terminal <val> includes the non-terminal <ExFun> as one
of its defined elements.
Example:
EQ (Wo-GC, 'NOUN') will generate a list all the word
identifiers (entries) of words tagged as
nouns.
EQ (Wo-lemma, 'STATOIL') will generate a list of all
the word identifiers for the words tagged
to have the lemma 'Statoil'.
<opeduo> (<ReFun>, <ReFun>) |

This operator binds together the results from two or
several (recursively) activations of ReFun. Each activation
returns one or several entries (logical access points (LAP),
commonly identifiers (internal vales) or derived values, for
instance pair of identifiers, transmitted for further processing.
Example:
AND ((EQ (Wo-GC, 'NOUN')), (EQ (Wo-Sem-Cl,
'ACTOR'))) will generate a list of word-identifiers
of words that are tagged as nouns and classified as belonging
to the semantic class Actor. These simple patterns may be
combined into complex patterns due to the recursive definition
of ReFun.
In order to use proximity operators or operators for enclosure,
the intermediate result (word identifiers or other types of
identifiers) must be assigned to a temporary file before a
new activation of ReFun.
<openeg> (<ReFun>)

The negation operator may be applied on the result (entries)
returned from a call to ReFun.
Example:
NOT(EQ (Wo-GC, 'NOUN')) will generate a list of all the
word identifiers (entries) of words not tagged as nouns (that is,
verbs, adjectives, etc).

Extraction Function (ExFun)

This set of functions locates and extract internal values from the DBPs containing data about the 'object layers', the set of DLOTs {Document, Text, Zone, Sentence, Word}. The adjusted DBMS keeps track of all the attribute types and internal and derived values attached to Document (DATOT) and all the attribute types and internal and derived values attached to the texts extracted from documents (TATOT).

In order for the user to receive a response she has to select one of the values displayed in the text sounding board. The displayed values are internal values that are extracted in advance from the underlying text (the difference between external values, i.e. values that are selected/activated by the user and internal values is blurred). The user is also given options for formulating her own request (external values given as free text search expression), in case there is no guarantee of a match against internal values (traditional IR options).

The Extraction Functions operate on current texts. The current texts are texts that are available for exploration once the user has selected one or several texts from a displayed list. The current texts are previously pre-processed by the present invention's apparatuses (acquisition, segmentation, disambiguation, zonation).

When the texts have completed the pre-processing stages, they are displayed in the mode 'Plain Modus Operandi'. In this mode, the present invention preferably gives the user options for activating series of Reduction Functions (ReFun). The idea founding the outline of Modus Operandi in the present embodiment of the invention is that the user in an 'incremental fashion' gets more and more advanced tools at hand.

In order for ExFun to operate adequately (for instance with respect to processing speed), it may be preferred that ExFun first activates series of ReFun in order to reduce the amount of 'current' ATOTs transmitted into further processing. The performance issues will preferably be handled via parallel processing. The ExFun rules therefore include a recursive call to Refun that can operate on all the ATOTs internal values. The reduced set of 'current ATOTs' is stored in temporary files (or persistent files if the ATOTs in question are involved (input in) frequent Extraction and Reduction functions). That is, in principle there is no difference between ExFun and ReFun. They are a sort of twins, however ExFun locates and extracts internal values and stores them in separate, temporary files designed for efficient processing.

A possible Reduction Function that is preferred in all Modus Operandi is the reduction to certain zones of the texts (a reduction that affects the following selections). Thereafter the user may focus on the words within these zones, in particular locating zones containing a value set for 'Problem Indicators' (reduction). This either activates an existing chain, triggers the generation of a new chain (depending on internal value selected). Another typical reduction may be to select nouns in the subject position where EQ(Word GC, 'subject'). It is not expected that the users are able to formulate or select and understand the effects of grammatical codes. Therefore internal values (ATOT and values) preferably must be transformed into 'understandable' value sets. These issues are related to HCI factors.

TABLE 6

<ExFun>::=
<atot> |

Example: Extract all word lemma (Wo-lemma), which in fact is
an application of ReFun: EQ(Wo-lemma, 'open operand')
Minimum = 1, Maximum = constraint given by system and
included as restriction in ReFun (see below). Other types of
user given maximum values is part of the set of functions
within ReFun,
<atot> (<ReFun> )

That is, the ExFun calls ReFun in order to reduce the set
of internal values displayed in a windowpane or reduce one
text by for example selecting certain zones in one of the
current texts. Zone-ID (AND ((EQ(Wo-lemma, 'LAW')),
(GT (Sentence Density, 1)))
Current DLOT is Zone. Extract zones where there are registered
occurrences of the word lemma 'law', and highlight
those sentences where the particular word occurs more than once.
The first part of the ReFun operates on the set WATOT, and the
second part operates on SATOT. The Sentence Density is
calculated as for Zone Density, i.e. a sentence is considered
to be a zone in itself (in particular for short texts). The
density value will reflect multiple occurrences of the same
word within one sentence. The Sentence Weight reflects the
'closeness' of words in a Chain.

Attention Function (AtFun)

This set of functions is related to the composition of new objects (derived objects) or the composition of constellations of contacts displayed in the text sounding board.

AtFun produces derived values. The derived values are based on external or internal, or previous derived values, along with activations of functions in the set ReFun and ExFun. That is, AtFun operates on intermediate results returned from several (recursive) activations of ReFun (location, extraction and composition of temporary files/tables are considered as a part of the rule described under ExFun.

TABLE 7

<AtFun>::=
<opecal> ( <ExFun> ) |

ExFun is specified with the option for activating ReFun recursively. Before anything is actually displayed or designated by pointers, the interim results may have to be sorted or processed by using a quantifier of some sort, (max, min, number).
<opebol> ( <ExFun> )

When the ExFun followed by one or several ReFun activations, there will either be 'something' in the interim or temporary files or these files will be empty. The function transmits a value telling whether 'derived set is empty' as a result to a previous function (either as activated by the user operating the text sounding board or resulting from the application of any of the by recursive activation order internal reduction functions).
The operator EXIST returns the values TRUE or FALSE. For instance: TRUE for Zones containing a specific set of Nouns. In case the value FALSE is returned - the system could display a message like 'Sorry, there are no zones containing these nouns, but several sentences quite close to each other contain these words. What about having a look at these sentences? If you would prefer to do so, push the button 'Do-It'.
This suggests an inclusion of the value OTHERWISE, or a new operator triggering the display of an appropriate message, succeeding the initial return FALSE which triggers a search in the DLOTs at a lower or higher level of the current DLOT. This follows the notion of an 'inside out' exploration and navigation strategy. The triggers start with the densest areas (zones) and move outwards to sentence level and then finally word level. The triggers compute an alternative to what the user demands through her selections in the text sounding board.

Details ATOT and Attention Structure

The concept ATOT denotes a set of attribute types, the set varying according to the Documental Logical Object Type (DLOT) the ATOT is attached to. There are five basic sets of ATOT {DATOT, TATOT, ZATOT, SATOT, WATOT}. It is further preferred to combine internal values assigned to attribute types in the different sets. These sets of attribute types form temporary files (representing derived objects, as for example Chain. Bond, Traversal Path). The set of attribute types held in an ATOT is arranged as interconnected tables (common key propagation). The type ATOT can therefore be further defined (or decomposed) in the production rule <atot> as follows:

TABLE 8

<atot>::=
<atot-name> |

The name assigned to one of the attribute types managed in a set denoted as an ATOT. This is an internal value at the type level. The atot-name is the named sets of attribute types attached to one of the DLOTs, {DATOT, TATOT, ZATOT, SATOT, WATOT}.

TABLE 8-continued

The atot-name may also be a name assigned to a temporary file constructed by the system during processing (storing and managing temporary data). These files contain a collection of internal values extracted from one of the 'permanent' ATOTs. The files (and their columns), follow standard naming conventions documented in the IRMS. Example: WATOT, will activate the currency indicator to the file/table given this name.
The text sounding board preferably will provide windowpanes from which the user can select and activate the various ATOTs and the internal values assigned to some of the attribute types (some types of internal values are considered to be of less importance to an end- user). Constraint: The user has to select one or several texts as current text(s) before they can focus on other types of DLOTs (Zones, Sentence, Words).
<atot-col [,atot-col]> | is part of the rule is a less constrained variant of the rule below. The system (via the meta data file) keeps track of which ATOT a certain named attribute type belongs to (each attribute type has assigned a unique name, following the naming convention of prefixing the attribute type with the first to letters of the DLOT in question (Te-, Zo-, Se-, Wo-). (Wo-CG, Wo-SemC1) list pairs of the words' grammatical class and values for semantic classes {(noun, actor), (noun, economy), (noun, utterance), . . . }. Any request for the extraction of atot-columns that does not include an identifier, will be default be extended with the identifier assigned to the set of ATOT in question (the identifiers are the entry points for extraction, display, further processing). The value pairs (ID, 'value') are consolidated and sorted (and/or ranked) before display. The user is given the option to select one or several values from the displayed set. Example: if the user selects/activates 'actor', all the words classified as being members of this semantic class will be highlighted (marked/visualised in the attention structures). All values in the corresponding chain unfolded in a list pane and highlighted in the text pane.
If the call involves the extraction of internal values assigned to attribute types in different ATOTs, the composition/assembly procedure will be constrained by the key propagation principle. (Values are extracted from atot-columns with a default inclusion of identifier).
Example: (Se-Id, Wo-SemClass)
List pairs of sentence-id and the word's semantic class, {(se-01, actor), (se-01, adj-pos), (se-02, economy), (se-02, adj-neg) . . . }
The Dublin Core Element Set (DCES) is a part of the set DATOT (Attribute Types attached to the Object Type 'Document').
The identifier propagation system anchors an inner layer DLOT to an outer layer DLOT. By applying this rule, a current text will be linked to its DCES. If the user selects one or several attribute types in the DCES like (doc-type, doc-producer, se- number), the system will respond by listing the set of document types {stortingsmelding, stortingsproposisjon, lov . . . }, and producers {OED, Odelsting}. The sets of values can be further restricted by applying a Reduction Function, for instance by operating on one of the attribute types in the set ZATOT, (LT (Ze-number, 50)).Each atot-col has assigned a 'display name' (data kept in the meta data file)
Example: Wo-GC is the name of the attribute type in the set WATOT denoting the Word's grammatical Class. Preferably HCI factors provide guidelines for the naming (a replacement of Wo-GC with Word Grammatical Class is not a preferred naming system.
<atot-name ( <atot-col [, atot-col]> |

During the apparatuses processing, several temporal files/tables will be generated. Data about these temporary files that in some occasions will be generated according to previous user requests will not exist in the system's meta data files. They are kept in separate files and if noted as successful preferably are pushed upwards to the User Profile.
These temporary files/tables may be considered s derived ATOTs, that is, a set of attribute types generated during processing and with value sets resulting from various types of calculations. The specific atot-name will be generated by the system according to preferred naming conventions. For instance, if the derived ATOT is based on calculations performed on attribute sets for Zones and Sentences, the derived atot-name should reflect this in the name's prefix. Similar naming conventions apply for the set of derived atot-columns (containing the derived value sets).

TABLE 8-continued

Example:
Wo-Zo-Temp 1 (Zone-traversal-path, zone order).
The user may request for detailed information about text zones, (in fact initially a derived DLOT). When the user activates the Zone button, a pop-up menu informs the user about traversal paths across zones that include a set of current search operands (the WITHIN Zone operation). The traversal path is derived from data extracted from the Zone Link Set. For instance, the user's current request may be like {OR (OR ((Statoil AND Aksje), (SDØE AND Eier)), (Gass AND Transport))}. This necessitates processing of the underlying files/tables ZATOT and WATOT. When the results in the form of traversal paths are displayed, the user can select/activate one of these paths and at the same time be given an option to select Zone Order. That is, in what order she wants to traverse the zones containing one or all pairs of word-values. The value set for Zone Order can for instance be {by appearance, zone size, zone weight, inside out}., the latter triggering a ranking from those zones with highest density values and outwards.
<opeari> (<atot-col>, <val>)|

The dyadic 'arithmetic operators' are used in order to calculate 'new' values according to the user requests. There are several attribute types in the various sets of ATOT that include numeric value sets (size, a whole range of frequency measures, for instance the weights, densities, length, frequency, etc.). Note that the element <val> is defined as including ExFun. The new, derived value sets are stored in temporary files/tables. In a similar way as above, a user request may involve a specific grammatical pattern, as for instance (FOLLOWED-BY (EQ (Wo-GC, adjective)), (EQ (Wo-GC, adjective)). The operator FOLLOWED-BY is constrained to operate against words in one sentence at the time. When composing an operation like this (putting together basic building blocks), data about the words' relative position within the sentences is needed. Data about positions are used in an arithmetic operation in order to calculate the distance between the two adjectives. The result may then be displayed in order of decreasing distance (density). This type of derived data is stored in a temporary file named like 'Wo-GC-distance'. If the derived set of attribute types held in the temporary file also includes the words' lemma, and possibly semantic-class, it will be possible to apply AtFun. The construction of these specific types of requests (by composing building blocks and generating temporary files) is a matter of detailed design. Instead of storing information about the words' semantic class in the set of attribute types WATOT, it is preferred to follow the guidelines given for TWS-procedure (Target Word Selection). Either from the outside in (from known thesauri entries onto words belonging to a certain grammatical class), followed by inside out (from values in the set WATOT, near-by word types in case of match after outside-in, and onto entries in a thesaurus).
Requests based on simple grammatical patterns may further be constrained to only consider word constellation in specific sentences types (part of the set of attribute types in SATOT) and/or zone types classified according to the notion of Discourse Elements. The user may receive a marked display of nouns in the subject position within these sentences, and the cue phrases highlighted in the other sentences within the zone. (Sentences may be classified as important because they contain 'important words (actors considered as important to the user group in question, and so forth).This particular example, may preferably be positioned under the 'Commix Modus Operandi' These examples are meant to explain the principles underlying ReFun and that ReFun operating on a set ATOT can be applied in the same manner on all layers {Document, Text, Zone, Sentence, Word}.

Basic Components

Operators

The operators are known in the prior art. Since they are included in the previous section, they are clearly set out in the table below.

TABLE 9

| | |
|---|---|
| <opebol>::= | EXIST<br>Operator returning the values 1 or 0<br>(TRUE or FALSE) |
| <openeg>::= | NOT<br>Negation |
| <operel>::= | EQ \| GT \| GE\| LT \| LE \| NE |
| <opearil>::= | PLUS \| MINUS \| PROD \| DIV |
| <opecal>::= | AVG \| SUM \| MAX \| MIN \| NUMBER \| other quantifiers<br>This set of operators covers quantifiers, which are a prefixed operator that binds the variables in a logical formula by specifying their quantity (Webster 1996). |
| <opeclo>::= | WITHIN \| OVERLAP \| ENCLOSING \| other closure operators<br>WITHIN is a kind of co-occurrence operator and operates on an 'inner object' to see if this 'inner object' is part of an 'outer object'. |
| <opedis>::= | PRECEDES \| FOLLOWS \| GREP \| other distance or proximity operators |
| <opelog>::= | AND \| OR \| XOR<br>Binds together two or several Reduction Functions |
| <openav>::= | UP \| DOWN \| NEXT \| PREVIOUS \| SUB \| SIB<br>Navigational operators (somewhat superfluous since they partly overlap with other operator types. The system generates chains stored in a DBP Information Chain that supports navigational operations. |

Values

The apparatuses, like in any other text processing system known in the prior art, operate on three different forms of values. The values all exist in the DBP but differ with respect to how they came into existence and how they are processed. The values are at different abstraction layers. The concept 'values and their types' is not be confused with 'value groups': The short description below explains the present inventions' preferred name 'contacts' referring to the content of the panes displayed in the text sounding board.

Internal Values

The word internal actually means 'existing or situated within the limits or surface of something'. MAFS and DBPs are 'the limits'. Internal values include all values stored. That is ATOTs and their named columns are internal values (type level) as well as the values (occurrence level) stored in each column. They include all data types such as numerical, alphabetical, string, tags, pointers, binary, labels, etc.

External Values

External values are the values coming in from the outside—that is values entering the system via the interface options. These values are given or selected by the user during her interactions with the underlying text via the text sounding board. If the user selects values extracted by devices embodied in the present invention, which are displayed for selection in one of the windowpanes in the text sounding board, these values will coincide with internal values. This is the reason why the concept of 'contacts' was introduced (the values are access points or contacts to the underlying text).

The contacts or external values selected are not 'terms' with respect to how the concept is used in traditional information retrieval systems—they are coincident with internal values. Values given by the user by chance (more like a free text search option) need of course not coincide with the internal values, thus it is worthwhile distinguishing between these two types of external values—contacts and terms. The distinction in fact blurs the distinction between internal values and external values.

Derived Values

Derived values are values that result from applying functions on internal values and/or external values. For instance the set of Sentence Identifiers constituting a Zone Border is a set of derived values. Concatenated nouns in Norwegian, such as 'oljeselskap' decomposed into two nouns (values) 'olje' and 'selskap', and unfolded in Fan Structures are also derived values (even if the components 'olje' and 'selskap' also exist as internal values. If these components are linked by using the two link types <is a> and aspect of >, these links (a set composed of the source-id and target-id) are likewise derived values.

The triplets of contacts ('triple tracks') constitute a particular set of derived values (in that the set is based on recursive applications of ReFun and ExFun). The distinction between internal values and derived values is not clear-cut since several derived values are consolidated and pushed upwards to be stored as persistent in DBPs. As soon as a derived value is actually stored in one of the temporary files comprising MAFS and DBPs, the value changes its status from derived to internal. The reason for differentiating between them is the need for denoting 'things' when specifying what the functions operate on.

The recursive definition of VALUE makes it possible to connect the various functions: ExFun, ReFun (element in ExFun) and AtFun (with ExFun as one of its elements).

TABLE 10

| | |
|---|---|
| <val> ::= | |
| <string> \| | alpha-numerical value as for instance 'government' |
| <expression> \| | A constant, either internal or external value, or an arithmetic operation on two constants (derived value). Expression may be used in order to construct values for navigation, that is the identifier for 'whatever' that is next, previous, up, down in a temporary file. See <openav> in the section for operators. |
| <ExFun> \| | The inclusion of an option for activating ExFun explicitly states the need for capturing intermediate internal values in a composite construction. |
| <element> \| | Any kind of element defined as operations performed on results transmitted from ExFun, which in part may call a ReFun (see below). |
| <all> | Refers to all values stored as associated to an ATOT (all the attribute types) or all the values stored as associated to an ATOT-column. |
| <expression>::= | <const> \| <opeari> (<const>, <const>) const is an external value such as 250 or an arithmetic operation performed on two constants recursively |
| <element>::= | <opecal> (<ExFun>) \| <opeclo> (<ExFun>) \| <opedis> (<ExFun>) An element is defined as the application of three types of operations performed on the result from an Extraction Function. In particular for the intersection of chains, enclosure and distance. For example, calculate the density for results (bundles of sentences or subsets of pre-defined zones) transmitted by ExFun and display as enclosed in zones with another feature set and only zones with a particular distance in between. |
| <all>::= | <val> |

Modus Operandi in More Detail

The table below shows the preferred names for the 'modus operandi' and their corresponding non-terminal code. The table elaborates the modus operandi into more detail.

TABLE 11

| | |
|---|---|
| <Modus Operandi> ::= | Preliminary names |
| <OPIMOD-1> \| | Plain Modus Operandi |

TABLE 11-continued

| | |
|---|---|
| <OPIMOD-2> \| | Crafted Modus Operandi (qualified) |
| <OPIMOD-3> \| | Quizzed Modus Operandi (multi-qualified) |
| <OPIMOD-4> \| | Commix Modus Operandi |
| <OPIMOD-5> \| | Virtuous Modus Operandi |
| other Modus Operandi | Nameless Modus Operandi |
| <OPIMOD-1> ::= | |

(<DLOT>) gives the user an overview of available exploration and navigation facilities. The DLOT are Text, Zone, Sentence and Word.
<OPIMOD-2> ::=

(<DLOT> (<OPEREL> (<ATOT> , <VAL>)))
The user has selected one of the DLOTs and decided to open a pane to see what kind of information is registered for each of them. She has for instance opened the DLOT text and gets aware of the interlinked DLOT Word and the attribute types attached to this DLOT, She prefers to explore the attribute type 'Word Focus' which unfolds a pane with the values stored for this attribute type. She may then browse through the set of internal values and preferably select one of them. The word occurrences are immediately highlighted in the text pane. The option for enclosure (within default zone) can be activated, and the word occurrences reduced and displayed accordingly. The pane displaying the lists of focused words can further be reduced to the subset occurring within zones.
<OPIMOD-3> ::=

(<ATOT> (<OPELOG> (<ReFun>) (<ReFun>)))
At this level one can expect that the user has selected the DLOT (for instance a set of particular texts), and have decided to go for a deeper investigation of another type of DLOT - the words and word constellations in the text. This means that some kinds of tracks (chain information) must preferably be displayed in the text sounding board. The tracks are the Zone Sensors that preferably must be given comprehensive names. For instance, the user prefers to intersect the chains for 'important actor' (a reduction function applied on the chain covering for semantic codes) and 'verbs in the present' (a reduction function applied on the chain covering the grammatical class 'verb' and the grammatical form 'tense present').
<OPIMOD-4> ::=

(<ATOT> (<OPEDUO> (<ATOT>, (<AtFun>)))
At this level the triple track preferably should be displayed in the text sounding board. The triple track involves a complex mix of recursively activated functions constraining the display of interconnected panes in the triple track. The modus operandi also provides for all the navigational operators. The underlying files include highly specialised information, among others the words grammatical functions, relative position within sentences together with different kinds of density measures, etc. This implies that the underlying intersecting chains preferably should be optimised calling for a particular DBP (DBP Triple Track).
<OPIMOD-5> ::=

(<AtFun>) \| (<ATOT> (<OPEDUO> (<ATOT>, (<ELEMENT>)))
See the description of ELEMENT (enclosing the advanced operators) under the section briefly describing the component 'values' and the section Zonation Criteria. All constructions (groups of functions) should be reachable and HCI factors will preferably guide the transitions between the other modus operandi and these most advanced facilities. See the specification for ELEMENT under the section about values that incorporates the most advanced operators. An orderly application of the groups of constructions will preferably provide for virtuous exploration and navigation facilities. This includes options for the display of zones according to the 'authority norm space model' as inscribed in the present invention's underlying document class model. The interchanging reflections between text zones and the triple track is preferably also included. That is, when the user navigates or traverses text zones, the content of the text zones are mirrored in the triple track giving a glance of some word constellations that are connected via underlying grammatical patterns, which in a previous pre-processing are captured and direct the moves in the tracks. By a text driven reflection of features in the inner context, the user is given support for the coupling between TABLE 11-continued insight, chance and discovery - the three princes of Serendip
as mentioned above.

Conceptual Outline of Filtering Options

The users' intentions are at all times dependent on the situational context, see section 'The principles of text driven attention structures'. The following tables give a more detailed conceptual outline of how the building blocks and functions are preferably combined into filtering options. The descriptions include the following elements, given in table 12. Only a subset of the filtering options are explained in this form, but seen together with the section 'Zonation Criteria' they convey the flexibility obtained by the present invention's selectivity.

The building blocks are interlinked as defined in a formal grammar, and section 'Overview of functions and groups of constructions' gives an outline of this grammar.

TABLE 12

| | |
|---|---|
| ID | An identifier in order to refer to it |
| Name | A name describing its main functionality |
| Definition | A definition including the main search operands and operators. The search operand types are described in the section 'Conceptualisation of Building Blocks in Search Macros'. |
| Principle | A description of the underlying classification principle and how building blocks may be combined in a predefined set of search macros. |
| Prerequisite | System requirements |
| Expected result | Increase or reduce the retrieved set. Each building block has a conceivable counterpart. |
| Example | Several examples are described in the section 'Zonation Criteria'. |
| Derived from | The types of underlying annotations (grammatical, semantic and/or pragmatic) and structural information (text segments encoded according to an XML-scheme), and other meta-data held in the DC Element Set. - |
| Intention | The user intention preferably supported. |

Reduction Filters

The main intention of the following filtering options is to reduce the retrieved set of zones and/or contacts.

Limit Contacts to Occur in a Specific Document Type

Table 13 outlines how to limit contacts to occur in a specific document according to a wide set of criteria.

TABLE 13

| | |
|---|---|
| ID | 13.09.01-1 |
| Name | Limit contacts to occur in a specific document type |
| Definition | Restricting search scope to certain Document Types. |
| Principle | The APOS is filtered against document types - that is, each document is assigned to a document class according to the present invention's preferred document class model.<br>The four broad document classes (each class with subclasses) as defined in the document class model, will preferably be used to restrict the search span. Most retrieval systems offer the option for restricting search spans by selecting database partitions. The classification criteria underlying the four main document classes are however different with respect to features referring to the document's situational context. The classification criteria are based on the social relations between Sender and Receiver, and the Sender's authority. The document classes will support the definition of hyper textual links between zones |

TABLE 13-continued

| | |
|---|---|
| | (or other text units) extracted from different documents.<br>For instance, units extracted from Debate documents (newspaper) may in some way be related to utterances in the Negotiation documents (discussions in ministries) and further on in law proposals). The units are to be connected in a hypertext system that is predefined links between selected (extracted) text units (the links are considered as conceptual pathways through the text base).<br>Meta data about documents are search operands at document level (document form descriptors). The retrieved set will be further reduced if the search is directed towards a limited set of documents within a document class. Document Class filters may be used in combination with Documental Logical Object Type filters or filters based on DC element set (Time for document production, Author, etc).<br>Users can create their own 'virtual data bases' by activating a stored search macro selecting documents from the source (global) database. The activation of a stored search macro ensures that the 'virtual data base' reflects changes in the source database. |
| Prerequisite | Document types are classified according to the document class model reflected in the extended Dublin Core Element Set (DCES).<br>Restrict 1: Limit to documents published in a particular period of time. Time element is an important part of the request. Collection must support time period partitioning.<br>Restrict 2: Limit to documents belonging to a certain class. Specific criteria for documental context, selected sources, etc are an important part of the request.<br>Restrict 3: Limit to documents that have, or do not have, a certain word in their titles (main headings).<br>Restrict 4: Limit to documents with certain keyness values, or keyness of keyness assigned in the new 'Keyness Element' (subordinate to the fixed element Keyword in DCES.<br>The system must give the user options for selecting document classes and support the selection of contacts in combination with these. Document Class is a filter option. |
| Expected result | The user has selected an APO triplet as search operand, or selected a subset of an APO Triplet (for example [Nurse as Agent], or a bundle of subsets of the APO Triplets (for example [Nurse as Agent OR Object] OR [Nurse OR Doctor as Agent], etc.). This is the current subset of APO Triplets. The user decides to restrict the search span to a certain Document Class and according to the Sender's authority. |
| Example | (Current subset of APO Triplets) WITHIN (Document Class = Law)) |
| Derived from | Result from document classification is embodied in a Dublin Core Element Set consolidated in DBP Information Document Class and the document structure is consolidated in DBP Information Document Structure. |
| Intention | The intention is mainly to reduce the retrieved set and improve precision. Precision is improved if a particular document, document class or document genre is required. |

Limit Contacts to Occur in Predetermined Textual Units

Table 14 outlines how to limit contacts to occur in predetermined textual units.

TABLE 14

| | |
|---|---|
| ID | 13.09.02-2 |
| Name | Limit contacts to occur in predetermined textual units, or a combination of units.<br>The textual units are according to the set of (Documental Logical Object Type (DLOT) |

TABLE 14-continued

| | |
|---|---|
| Definition | Restricting search scope to certain Documental Logical Object Types, either structural object types such as chapter, section, heading, sentence, and/or derived object types reflecting thematic issues, i.e. text zones. |
| Principle | The APO Triplets are filtered against DLOTs as encoded according to an XML-schema, i.e. well-formed documents, in DBP Document Structure. Or the APO triplets are filtered against text zones as specified in the DBP Information Zone. XML gives a richer opportunity for combining and linking different DLOTs. |
| Prerequisite | The system must give the user options for selecting documental object types and support the selection of contacts in combination with these. APOS are generated for all titles and headers (classified and tagged as special types of sentences). The documents have to be segmented and annotated (in XML). The device that identifies text zones according to the zonation criteria has processed texts extracted from documents.<br>The set of search operand types for DLOTs is described in the section 'Conceptualisation of Building Blocks in Search Macros'.<br>User should be given options for restricting 'Search Scope' (an option displayed in the main search pane). |
| Expected result | Users' moves restrict contacts so that they occur in certain DLOTs. This retrieves a set of units for which the concept (contact) is important enough to be mentioned in their titles and further that the word/words also occurs in the nearest subsequent logical object types. |
| Example | ((Nurse WITHIN DLOT Title) FOLLOWED-BY ((A = Nurse OR O = Nurse) WITHIN (DLOT Sentence D:2 echo Title))) The contact Nurse is in a title (heading) and the word nurse occurs either in the A or the O position in the 2 first sentences (D:2) following the same (echo) title. (A and O in the APO Triplet). If a contact like <nurse> is combined with the object type <title> the user may expect that this section of the document has nursing as one of its central themes. If the contact <nurse> is to be found in the A or O position in the following first or second sentence (or zones), the weight is higher (depending on frequency and distribution with respect to the A and O positions). |
| Derived from | Extracted APOS from tagged logical object types. Index structures for specific logical object types and organised as APOS are derived from underlying tagged logical object types. Type: Documental Logical Object Type (DLOT). |
| Intention | The intention is mainly to reduce the retrieved set of units or contacts and improve precision. Precision is improved under the assumption that words in titles signify themes dealt with in underlying sentences/zones. If the word or a set of words occur as tagged with the grammatical functions subject or object in the following nearest sentences or zones (or paragraphs) restricted by a distance operator, the assumption is further that this signals more weight given to the word/words. |

Limit Contacts on Proximity Criteria

Table 15 outlines how to limit contacts on proximity criteria.

TABLE 15

| | |
|---|---|
| ID | 13.09.02-3 |
| Name | Limit contacts on proximity criteria |

TABLE 15-continued

| | |
|---|---|
| Definition | Contacts in APOS occur closer another in the searched text. |
| Principle | When an element within an APO Triplet is selected the user can activate an option for displaying contacts with a certain distance to the selected set (or part of set). For instance displaying contacts within a distance of 20 sentences to the left and right for the selected APO Triplet. This option has some similarity with KWIC (Key Word In Context) but differs in that the display is reduced to sets of grammar-based codes (contacts) in accordance with underlying grammar patterns (realised as regular expressions combined in search macros). |
| Prerequisite | An APO Triplet (specific constellation of grammar based contacts) refers to one or several sentences. Each sentence has assigned an ID (Type: DLOT Identifier, a serial number or a relative position in the text file. A proximity operator will display contacts derived from 20 preceding sentences or 20 subsequent sentences with reference to the sentence referred to by an APO contact or all contacts in an APO Triplet. If the APO Triplet (or a contact within a triplet) has a frequency higher than 1, the software component must stack the sets for display (Selection). A ranking procedure will assign weight to the stack members, for instance by giving higher priority to stack members in which a word in the Agent position also occurs in the Object position. The system must support proximity operators and operators like 'within' or 'enclosed by', 'followed-by', 'precedes', etc. See section 'Operators' |
| Expected result | The APO Triplets as preferably embodied in the triple track will give the user and immediate glance of the current APO Triplet's nearest inner context. The inner context that is revealed is reduced and in accordance to the underlying grammar patterns and where the contacts are highlighted in the logical object types specified in the search macros (the distance operator may preferably have a default value that may be altered by the user, i.e. the default value is replaced by an open operand). |
| Example | Set Currency Indicator at (SELECTED APO) giving (LOT Sentence with LOT Identifier) (APO PRECEDES (DLOT Identifier D:20 echo Currency Indicator)) OR (APO FOLLOWS (DLOT Identifier D:20 echo Currency Indicator)) |
| Derived from | Triplet APO <is input to> Device Target Word Selection (TWS) <is realized as> Triple Track Device Triplet Generator <produces> and is connected to the underlying text via the SVO Triplet processed by the triplet generator: Device Triplet Generator <is member of> Set Device <produces> Triplet APO cat5 fac0 Subject Matter <is input to> Criteria Grammar Based <gives rules for> Set Database Partition (DBP) <is input to> Triplet SVO <is input to> where the SVO Triplet: Triplet SVO <is derived from> DBP Information Word <is input to> Device Target Word Selection (TWS) <is input to> Device Triplet Generator SVO Entry Noun <is part of> SVO Entry Verb <is part of> Intersecting facets according to one of the categories specified in the classification scheme can preferably also restrict the contacts in the APO Triplet. cat5 fac0 Subject Matter <is abstracted into> cat4 fac0 Subject Matter Complex <is input to> Device Triplet Generator <is a> Type: Category cat5 fac1 Agent <is subordinate to> cat5 fac2 Process <is subordinate to> cat5 fac3 Object <is subordinate to> |
| Intention | Reduce retrieved set (sentences within a certain distance) and possibly always in combination with a search scope restricted to certain document types. |

TABLE 15-continued

Improve precision regarding the textual context for the contacts in the Subject or Object pane. Proximity or distance operators will impose the restriction that the contacts in the APOS must appear within a scope as specified in the distance operator. Zones/defined by zone borders) will preferably be a default operand for proximity, and where the distance operator regulates the distance between zones.

Limit the Contacts Based on Frequency Information Combined with Grammatical Information.

Table 16 outlines how to limit the contacts based on frequency information combined with grammatical information.

TABLE 16

| | |
|---|---|
| ID | 13.09.01-4 |
| Name | Limit the contacts based on frequency information combined with grammatical information. |
| Definition | Words (preferably nouns) having a frequency above a certain threshold value (determine intratextually or intertextually) or a high keyness value are represented as either focused words or major descriptors respectively, (nouns contained in keyword filters). Focused words are elaborated further in the section 'Zonation Criteria'. |
| Principle | Each document entering the document collection is processed in order to compute keywords (words with high keyness value). See section 'Apparatus for acquisition'. The lists of candidate keywords are processed by a POS-tagger in order to identify nouns and preferably word lemma. Keywords that are nouns and their keyness value are stored as an ordered set in the DCES. All keywords derived from documents related to a certain domain (for instance Petroleum, EU enlargement, etc) are stored in separate keyword filters, i.e. chains connecting keywords and according to pragmatic criteria. By activating one of the keyword filters, the lists in the Agent or Object panes are reduced accordingly. Only nouns occurring in the selected keyword chain are displayed in the panes. Or nouns affected by the filter are highlighted in the panes (colour changes when activating keyword filter). Domain-specific keyword filters may of course overlap. The overlap is managed by the structure defined for the classification scheme in which a specific word type can be a member of more than one facet. Keyword chains are also utilised in the target word selection procedure aiming at constructing evolving domain specific thesauri. The frequency and keyness information is stored and managed in DBP Information Frequency and DBP Information Keyness. Contacts with a high frequency (or a threshold frequency value) may be of importance to the user. If the selected search scope is intratextual, the default display of contacts in the APOS is preferably by appearance or by consolidated frequency in preferably A. If the selected search scope is intertextual, the display should preferably be restricted to zones, (the user can at any point change options). The system also supports an option for display based on frequency. For instance, for each contact in the A position the user may choose to order them by frequency. This type of frequency information is assigned according to the word's Grammatical Function (GF). (The same types of frequency information may also be computed for the word's Grammatical Word Class (GWC). |
| | There are basically four types of frequency information: number of documents in which the word occurs with a GF (or GWC) number of zones in which the word occurs with a GF (or GWC) number of sentences in which the word occurs with a GF (or GWC) total frequency for the word occurring with a GF (or GWC) This type of frequency information can be used to filter the text with respect to all text units. |
| Prerequisite | Documents are classified with respect to criteria for domain (thematic field). DCE Domain Indicator <is part of> Type: Dublin Core Element Set (DCES), and the Domain Indicator(s) is/are either derived from bibliographic information or is assigned to the document based on the accumulated results from a Target Word Selection Procedure. When the system has generated a set of keyword filters, it will also be possible to automatically (or at least semi-automatically) classify documents (assign a code for thematic field, that is - a Domain Indicator) based on the result from the keyness calculations. Keyness calculations require an appropriate Reference Corpus: Device Keyness Calculation <produces> DBP Information Keyness <is part of> Device Frequency/Grammatical Distribution Calculation <is part of> Device Support Document Analysis <is member of> Set Device DBP Information Reference Corpus <is input to> Output from keyness calculations (list of words with total and relative frequency and a keyness value) is input to a POS-tagger (a threshold value for keyness determines number of words to be included as input). The information is used during the classification of documents. Device Support Document Analysis <is part of> Apparatus Acquisition <produces> Document Candidates Analysed <is member of> Set Device Device Keyness Calculation <is part of> Document Candidates <is input to> Only nouns are selected from the output (from POS-tagger) stored as separate ordered sets or merged with existing words in keyword chains referring to documents with shared features with respect to the situational context. |
| Expected result | Sentences from documents with nouns that are 'unusual frequent' as compared to the total set of words in a reference corpus are selected for retrieval. Ranking based on keyness or total/relative frequency. Display sentences from documents having assigned the specific keywords in a DC element and display sentences with the nouns in the A or O position. The nouns may also be displayed without the restriction that they are tagged as subject or object. |
| Example | ((A OR O) IN (DCE Keywords) WHERE (Keyness ARIT-OPERATOR Value)). Keyness information will preferably not be made directly available to users, but used in intermediate filtering options. |
| Derived from | Automatically constructed for each document entering the database. |
| Intention | Reduce retrieved set and improve precision (assign priority through calculated keywords). |

Limit the Contacts Based on Frequency Information and the Intersection of Chains.

Table 17 outlines how to limit the contacts based on frequency information and the intersection of chains.

TABLE 17

| | |
|---|---|
| ID | 13.09.02-8 |
| Name | Limit the contacts by intersecting chains. |
| Definition | Selected contacts in the Agent and/or Object panes are restricted according to four types of frequency information calculated for DLOT and combined with the intersection of chains. A chain is a linked list of words according to grammatical, semantic and/or or pragmatic criteria. |
| Principle | A Zone Sensor denotes a wide set of filter options that extracts nouns (or other word classes covered by chains) and intersects the chains with information about DLOTs, either sentences or preferably zones. Information about the DLOTs is registered in DBP Information Sentence, DBP Information Zone, and DBP Information Word. The zone sensor arranges the nouns in order of frequency (or in order of first appearance or alphabetically), and/or in semantic classes (based on pre-specified criteria), and transmits the result for display in the text sounding board. The results are stored in an intermediate file, 'Zone Sensor' managed in the Top Layer of the MAFS. The Zone Sensor can accordingly operate on all feature sets registered and consolidated in the interconnected DBPs. Device Zone Sensor <is part of> Device Zone Bond Generation <produces> Zone Sensor DBP Information Chain <is input to> DBP Information Zone <is input to> Zone Sensor <is consolidated in> DBP Information Zone Bond <gives rules for> Text Sounding Board Content |
| Prerequisite | The system must include frequency information assigned to each contact in the APO Triplets so that the user has the option of specifying a minimum frequency (preferably at zone level). |
| Expected result | The intersection of chains, combined with frequency information can filter the content displayed in the text sounding board along all dimensions defined for the present invention' selectivity. |
| Example | Example - The Device Zone Identification has located at text zone comprising 11 sentences in which the noun 'Hensikt' (Purpose) occurs (repetition of the word Hensikt in adjacent sentences, maximum distance for adjacency = 1). The word 'Hensikt' is also considered to be a cue phrase signalling a discourse element (e.g., the purpose of this discussion is . . .). The Device Zone Sensor extracts all the nouns from the Zone Link Set for this zone, selects the nouns also being repeated and collocated with Hensikt, computes the frequency of the different nouns, and transmits nouns with a frequency above a certain threshold value (e.g., 2) to the text sounding board, these values will coincide Sounding Board. When the user activates zones according to criteria in the class (Discourse Elements), the text sounding board may guide her attention to the fact that this particular text has for example 4 zones identified according to the word Hensikt or one of its near-synonyms (e.g., 'Formål', Siktemål'). The user may then activate the displayed contact Hensikt and ask for the display of more detailed information about each zone. This user request activates the Device Zone Sensor and the words (nouns) in the left column show the nouns occurring more than twice within Zone 'Hensikt', arranged in order of frequency. Semantic criteria provide for an alternative arrangement or order of display. |
| Derived from | The nouns to the right are filtered according to frequency, and the words as displayed in the content panes are intersected with chains based on semantic criteria. Subset of Nouns <within> current zone), order is frequency. | All nouns extracted from the chain that intersects the current zone in alphabetical order. The nouns are in either Subject or Object position, (two other chains). Nouns <within> current zone) |
| Chain intersections | Gas Management (4) Competitive Power Continental Shelf Value (2) Challenge (2) Government (2) Indicating the thematic sensemes or linguistic signs of 'classes of meanings': The first and third nouns are classified as focus words within the theme of 'oil affairs'. The second and fourth noun are classified as focus words within the theme of 'economical affairs. The fifth noun belongs to the set of cue phrases (discourse elements) signalling 'something' related to problems. The sixth noun refers to an important actor (government). | Aktør (Actor)(1) Effektivitet (Efficiency (1) Eierskap (Ownership) (1) Gassforvaltning (Gas Management) (4) Konkurransekraft (Competitive Power) (3) Kontinentalsokkel (Continental Shelf) (2) Perspektiv (Perspective) (1) Regjering (Government) (2) Ressurs (Resource) (1) Restrukturering (Restructuring) (1) Risiko(Risk)(1) Sammenheng (Connection) (1) Siktemål (Objective) (1) Stat (State) (1) Utfordring (Challenge) (2) Verdi (Value) (1) Vurdering (Assessment) (1) |
| Intention | When displayed in the triple track, the user will preferably get an immediate impression about the theme in the zone. If the same words occurred in a zone marked with an indicator for the discourse element 'Problem', this would preferably influence on the user's interpretation of the contacts reduced by combining frequency and the intersection of chains. |

Cut Display

Table 18 outlines how to cut display at random.

TABLE 18

| | |
|---|---|
| ID | 13.09.02-23 |
| Name | Cut display |
| Definition | Submit only part of the retrieved contacts, selected at random. General filter to be applied on top of other filters. |
| Principle | Precision-oriented moves have failed and the retrieved set of contacts is still too large (user's futility point exceeded). It is assumed to be acceptable for the user to see a few contacts only (in order to get informed about the textual content and based on this, enabling the user to select more discriminating contact from APOS) |
| Prerequisite | Simple randomising function activated on chains providing input to the APO triplets. |
| Expected result | The user can experiment with various minimum and maximum values, which may be combined with one or several of the other filter options. |
| Example | APO Triplets wanted (= maximum Number) AT RANDOM (Minimum Value IN Maximum Value) APO Triplets (max = 100) AT RANDOM (1 IN 5), will display each fifth APO Triplet of the 100 first triplets generated and temporary held in a stack. Where the system proposes default values for minimum and maximum based on the total number of APO Triplets referencing the current document set. The default value can preferably be based on information derived from the Zone Link Set. |

TABLE 18-continued

| | |
|---|---|
| Derived from | DBP Information Frequency<br><is input to> Device Zone Density Calculation<br><is a> Set Database Partition (DBP)<br>DBP Information Keyness <is consolidated in><br>DBP Information Sentence Consolidated<br><is consolidated in><br>DBP Information Word <is consolidated in> |
| Intention | Reduce set of displayed APO Triplets at random. |

Negate APO Triplets and Store as User Profiles

Table 19 outlines how to negate APO Triplets (or contacts within) and store as user profiles.

TABLE 19

| | |
|---|---|
| ID | 13.09.01-16 |
| Name | Negate APO Triplets or contact within APO Triplets and store as user profiles |
| Definition | Negating certain contacts will reduce APOS and the reduced APOS can be stored as a user-defined filters that may be activated in future searches. |
| Principle | The user has some experience in using the APOS and moving between/selecting contacts. One of the filter options may for instance be activated, and the user identifies unwanted contacts (that is, the contacts are evaluated as not having the wanted discriminating effect or of no interest to the user.<br>Such contacts may be eliminated from future displays of APOS by giving the user an opportunity to negate these specific contacts and store the negated words in a kind of stop-list, that is a user-defined filter. |
| Prerequisite | Multileveled Annotation File System (MAFS) in which user specific profiles are stored and maintained in the Top Layer (further consolidated into DBP Information User Profile, see section 'User Profile'. |
| Expected result | The negated contacts are not deleted from the Top Layer, but marked as not to be included in future searches when the specified user (User Identifier) enters the system. Thus, the user can at any time reset the specific contacts to be restored in future searches. The user has an option for defining user views for all documents in a collection or for subsets or in accordance with certain tasks (the user can specify several user views over the same set of grammar based contacts) |
| Example | Set Currency Indicator at (SELECTED APO)<br>Set Flag IF (((NOT (A)) OR (NOT (P)) OR (NOT (O))) OR ((NOT (A AND P AND O)))<br>INCLUDE Flag in ((APO Triplet) WITHIN User Filter)) |
| Derived from | User demands and requirements activated for all components underlying the available options for filter and display. |
| Intention | Improve precision based on experience |

Intersect a Contact with a Free-Text Term

Table 20 shows how to intersect a contact with a free-text term.

TABLE 20

| | |
|---|---|
| ID | 13.09.01-7 |
| Name | Intersect a contact with a free-text term |
| Definition | Selected contacts in the Agent and/or Object panes are intersected with free-text index terms. |
| Principle | Free-text index terms are restricted to words within sentences that are not extracted to be items in the APOS.<br>Other possible restrictions are nouns and verbs only (lemma or base form) and with a predefined minimum relative frequency within a document. Adverbs and adjectives may be |

TABLE 20-continued

| | |
|---|---|
| | important descriptors in some requests, but these will be incorporated in predefined grammar based search macros (combined regular expressions).<br>For instance (Adjective Comparative PRECEDES D: 3 Nouns All) - list APOS where the sentences also contains an 'adjective comparative' preceding a noun within the distance of 3 words.<br>An APO constellation refers to one or several sentences. The sentences are members of higher order documental object types. The free-text terms must preferably refer to higher order object types such as zones or sections, or whole documents. |
| Prerequisite | The system must allow for the combination of free-text terms and grammar based contacts.<br>The selection/specification of free-text terms must be available in a separate window. Free-text terms can also be generated form the user profile (user-added text may be considered as a set of free-text terms, and disambiguated by grammar taggers).<br>The user has an option for selecting one or several terms from a list or the user can specify one or several terms in a traditional free-text query. The system allows for combining the user-defined search expression with search operands selected from the APOS.<br>The user has the possibility to remove both free-text terms and fixed search operands (contact in the APO Triplets) from the query. |
| Expected result | If a free-text term like <paediatrics> is combined with the contact <nurse> in either the A or O position, the segment may contain information about nursing related to paediatrics. |
| Example | Set Currency Indicator at (SELECTED APO) WHERE (A = Nurse OR O = Nurse) giving (DLOT Sentence with DLOT Identifier)<br>((DLOT Identifier WITHIN DLOT Zone) WHERE (DLOT Word = Paediatrics)) |
| Derived from | A free-text index includes all words not included in the APOS or A free-text index includes all words (exclude words in stop-lists).<br>A and O items may for instance be reserved for nouns only, however there are a lot of nouns not having the syntactical functions of Subject or Object in the sentences. |
| Intention | Improve precision regarding the textual context for the selected nouns in the Agent or Object pane. |

Expansion Filters

The main intention of the following building blocks is to increase the retrieved set of text units or contacts. The expansion filters are more or less counterparts to the Reduction Filters.

Filter: Incremental Aboutness

TABLE 21

| | |
|---|---|
| ID | 20.09.02-34 |
| Name | Incremental aboutness |
| Definition | Expanding search scope incrementally. |
| Principle | Based on document structure (structure specified according to an XML-scheme) or zones founded on grammatical, semantic and/or pragmatic criteria.<br>The filter options generate APO Triplets in a stepwise, incremental manner.<br>APO Triplets for titles and section headings (following the hierarchical structure)<br>APO Triplets for first sentences (1–2) in first paragraph following section headings<br>APO Triplets for the first sentences (1–2) in each paragraph<br>APO Triplets for all sentences.<br>APO Triplets for first sentence in each zone, or first sentence in zone with highest weight or |

TABLE 21-continued

| | |
|---|---|
| | density first and then outwards (to zones with lower values for weight and density. APO Triplets for intersecting zones. APO Triplets for all sentences in all zones. When using this incremental filter option (interlinked set of search macros), the user must have available options for activating/ deactivating other filer options at each level/ step. |
| Prerequisite | Information about DLOTs and Distance Operators. |
| Expected result | Advanced exploratory facility in which the user can scan/browse the APO Triplets in a top-down manner or inside out based on values for weight and density assigned to sentences and zones. |
| Example | 1 Set scan on DLOT Title AND DLOT Header Loop until end-of-scan SELECT APO WITHIN (DLOT Title OR DLOT Header) 2 Set scan on DLOT Header Loop until end-of-scan Set Currency Indicator at DLOT Header with DLOT Identifier SELECT APO WITHIN DLOT Sentence WHERE (DLOT Identifier D:2 echo Currency Indicator) 3 Set scan on DLOT Zone Loop until end-of-scan Set Currency Indicator at DLOT Zone with DLOT Identifier SELECT APO WITHIN DLOT Sentence WHERE (DLOT Identifier D:2 echo Currency Indicator) |
| Derived from | The information about sentence locations is derived via on of the two DBPs. Zone Border includes information about the first and last sentence of zones and the zone density makes it possible to traverse the zones inside-out (from the zones with the highest density first and then outwards). DBP Information Document Structure <is input to> Device Text Extraction <is a> Set Database Partition (DBP) Device Document Structure Identification <produces> DLOT Document Logical Object Type <is consolidated in> MAFS Segmentation Information (ATF) <is consolidated in> DBP Information Zone <is input to> Device Zone Bond Generation <is input to> Device Zone Density Calculation <is input to> Device Zone Sensor <is input to> Device Zone Weight Calculation <is a> Set Database Partition (DBP) DLOT Zone <is an object in> Zone Border <is derived from> Zone Density <is consolidated in> Zone Link Set <is consolidated in> Zone Weight <is consolidated in> |
| Intention | Stepwise browsing of all available APO Triplets where the user can select an APO Triplet for further exploration at any level. The user can also activate other filter options in combination with the option for 'incremental aboutness'. A selected (activated and current) APO Triplet can further be input to a search macro locating identical APO Triplets or APO Triplets with contacts partly overlapping with the current APO Triplet. |

Expand or Limit Contacts by Fan Structures.

Table 22 outlines how to contacts are limited or expanded by "fan structures".

TABLE 22

| | |
|---|---|
| ID | 13.09.02-8 |
| Name | Limit or expand contacts by fan structures. |

TABLE 22-continued

| | |
|---|---|
| Definition | Expand or restrict a focused word that is linked to a fan structure. The concepts 'focused word' and 'fan structure' are described in the section 'Zonation Criteria'. search operand by selecting a semantic code linked to a contact via more specific levels in a thesaurus |
| Principle | A contact displayed in the APO Triplets may be replaced by more specific contacts unfolding in separate panes to the left or right of each contact displayed in any of the tracks, grammar taggers known in the prior art, for languages with concatenations as a characteristic feature are steadily improved by including tags marking concatenations. Algorithms for splitting concatenated words into their constituent parts are known in the prior art. The present invention combines this knowledge with proximity criteria and insight about how the author's language use fluctuate from general words to more specific words, and seen as patterns with respect to distance. Fan structures are of particular value as a tool applied in the device that calculates scores for connection points between sentences. If a certain contact, assigned to be a member of a chain for focused words, is registered as having attached a fan structure, the preferred option is that the display should include an icon with the symbol of a fan. When the user activates this button, preferably two interconnected panes will unfold and display more details as shown in the example below. |
| Prerequisite | Grammar taggers must handle concatenated words and tag them as such. Grammatical information is combined with frequency information in order to divide the fan structures according to the members' total frequency (intratextually and intertextually. |
| Derived from | For concatenations that have nouns as their constituents, the present invention embodies a device that generates fan structures superimposed on word sets organised along the dimension of general-specific. The device splits the fan structure into frequency classes, and constructs links between words if they are related by lexical similarity between the components in concatenated words. The words classified as unifying language use are placed in the centre of link sets (forming unfolding fans in the text sounding board when displayed from the centre and then left and right). These are typically (in Norwegian) low or middle length words and the selection criteria is that the tagger has not classified them as concatenated and that they have a frequency above a certain threshold value determined intratextually. The constituents of concatenated words, and if the constituents are similar to words in the set of unifying words (centre words), the constituents are denoted as convergence words and linked to word types that are equal to the constituents. The link type is either <is a> or <aspect of>, depending on whether the constituents are the first part or last part of the concatenated word. Fan structures are generated intratextually, and subsets of encoded fan structures can be transferred to cover for new texts if both sides (word types) in the fan structures are registered as occurring in the new text. |

TABLE 22-continued

| | |
|---|---|
| Example | The focused word in the centre and Word Convergence unfolding on both sides. |
| | <aspect of>    Focused Word    <is a> |
| | SELSKAP |
| | (Company) |
| | Selskapsanalyse         Oljeselskap |
| | Selskapsavtale          Forvalterselskap |
| | Selskapsdeltakelse      Transportselskap |
| | Selskapsnivå            Statsaksjeselskap |
| | Selskapsorgan           Gasselskap |
| | Selskapsside            Aksjeselskap |
| | Selskapsskatt           Morselskap |
| | Selskapsstrategi        Allmennaksjeselskap |
| | Selskapsstruktur        Energiselskap |
| | Selskapsverdi           Enkeltselskap |
| | Selskapsavgift          Oppstrømsselskap |
| | Selskapsstruktur        Statsaksjeselskap |
| | Selskapsdannelse        Statsselskap |
| | Selskapsfusjon          Eierselskap |
| | Selskapsledelse         Elektrisitetsselskap |
| | Selskapsregime          Nøkkelselskap |
| | Selskapsbalanse         Operatørselskap |
| | Selskapsregulativ       Produsentselskap |
| | Selskapsdrift           Sdøe-ivaretakerselskap |
| | Selskapsform            Serviceselskap |
| Intention | The users wish to explore from the general to the specific level, and the fan structures support this in a flexible manner. When the user traverses the zones by following a chain based on focused words, the unfolding panes can dynamically reflect the specialisations of the focused word as the zones are traversed. |

Definition of Some Important Terms Used in this Specification.

Textual Contacts, or Simply Contacts

The index entries represented in the APO Triplets, which are a part of a higher order representational form—Topic Frames', are terms extracted from the underlying grammatical annotated text base. Each word in the multileveled annotated file system has assigned an identifier (the document ID+the word's relative position within the file) and thereby it is possible to directly access the word or word constellation from which the index entry is derived. Since the index entries by this mechanism are connected to the underlying text, the index entries are denoted as contacts in the sense that they are contact points to the underlying text. Through these connections the user may visit and explore the text segments and select or discard the displayed segments.

Triplets of Contacts

The intended basic visualisation of contacts in window-panes is tentatively designed as a combination of three index entries referring respectively to Agent, Process and Object. Each triplet contains collocating contact points to underlying text segments, collocating in the sense that they represent collocating words in the underlying text. The triplet structure is a manifestation of three basic facets in the classificatory meta-structure following principles adapted from the idea behind 'free faceted classification', originally put forward by Ranganathan. However, a set of grammar based extraction patterns is the superordinate principle underlying the actual extraction process. According to the principles underlying the free faceted classification norms, each facet may be further organised in rounds and levels. Each round has several levels—levels with more detailed grammatical information and levels with semantic information (abstraction levels). The highest level in each round is a set of predefined search macros and the components in a search macro are regular expressions used for extracting words/word constellations from the text, further transformed to the representational form as prescribed for the basic triplet structure.

Epitomic Triplets

The term is used in order to refer to the fact that the main APO Triplets represent a form of extreme summary of a written work (epitome). The term 'epitome' is synonymous with the term 'synopsis', the proposed preliminary name of the present invention.

Dublin Core

The Dublin Core is a set of 15 basic information elements designed for use in Web pages to enhance indexing and retrieval. These elements are: title, creator, subject, descriptions, publisher, contributor, data, type, format, resource identifier, source, language, relation, coverage, and rights. Full, up-to-data details are available through the Web page for Dublin Core metadata element set http://purl.org/metadata/dublin_core/(last visited in October 2002.

Theme Frames

The terms 'subject', 'theme', and 'topic' are often defined as near synonyms. A preferred definition of 'subject' is Ranganathan's based on the difference between extension and intention: "Subject is a systematised body of ideas, with its extension and intention falling coherently within the field of interest. It is also comfortably within the intellectual competence and the field of inevitable specialisation of a normal person." (1987:28).

A related concept is 'aboutness'; usually defined behaviouristic in terms of the user's opinions about the relationship between what is in the text and how the user perceives this content (content perception relative to a particular person). A 'Theme Frame' is a representational unit in the preferred embodiment of the present invention in which each constituent is expressed in terms of rules and guidelines as prescribed in a classification scheme. It is a framework for representing different aspects of the theme within a textual unit such as sentence, zones or structural segments as chapters, sections, paragraphs, etc. As such a Theme Frame includes the representations of 'complex subjects' with 'compound subjects' as constituents, in turn having 'basic subjects' as constituents.

Target Word Selection Procedure, Abbreviation TWS

The rounds and levels constructed for each component in the main triplet structure (Agent, Process and Object) will contain index entries at for instance a higher abstraction level than the contacts derived from the underlying text. A target word selection procedure is a technique for data abstraction where concepts encoded in domain-specific thesauri are mapped against contacts derived from the underlying text. If a contact returns with the value 'concept match' during this procedure (several cycles), there will be established a link between the contact and the concept encoded in the thesaurus. The critical issue is not about how to establish relations or what type of links or relations to use, but rather which relations will serve a user community.

Word Sense Disambiguation (WSD)

Disambiguation means to establish a single grammatical or semantic interpretation of a word (or word constellation) as it appears in the text. A Constraint Grammar tagger deals with the grammatical ambiguities. Taggers have an error rate (depending on language and text genre), and resolving the meanings of multi-referential words to a full extent will require validation procedures.

Words are character strings and even if their grammatical word class and grammatical function are determined by a CG-tagger, a character string may have more than one meaning. For instance, a character string can be a homonym where the different referents are distinct. Target Word Selection procedures are techniques used for resolving some of the semantic ambiguities, for instance by using the controlled vocabularies encoded in thesauri limited to specific domains. Both WSD and TWS are related to issues of traversing databases according to specified rules. That is, traversing the grammatical encoded text files, chains, and domain specific thesauri and to that extent found necessary in order to resolve ambiguities that seriously disturb the system's performance. The degree of grammatical and semantic disambiguation is an issue of costs as opposed to meaningful (coherent) content representations.

Subject Verb Object Structures (SVOS)

The grammatical subject of a sentence can be said to denote what the sentence is about while its predicate comments on this. The sentence 'Hydro is an oil company' has 'Hydro' as its grammatical subject and it's predicate 'is an oil company' which comments on Hydro. The sentence states a fact about Hydro and give information about Hydro. If the extraction patterns focus on the main sentence grammar components 'Subject Verb Object', a collection of sentences about Hydro will result in a structure of representations about Hydro. The grammar patterns governing the term extraction is a reduction process in that certain words with certain grammatical functions within certain types of sentences are qualified as input to the extraction procedure. In any kind of information representation there will be an information loss and the critical issue is therefore to identify semantic categories of special interest within the user community to be served by the search macros (regular expressions) transmitting data to the text sounding board.

Agent, Process and Object Structures (APOS)

The SVOS are abstracted into a similar triplet structure for Agent and Object (preferably of transitive actions). The APO Triplets represent an important reduction of all the SVO Triplets encoded in the bottom layer of the multileveled annotation file system. The reduction results from the set of grammar based extraction patterns operating on the bottom layer. For instance by specifying that the only Subjects to be included in the APO Triplets are those that satisfy the criteria 'Noun and Subject' and further that the noun also exists as encoded in a facet denoting organisations related to Norwegian petroleum affairs.

RDF (Resource Description Framework

Is a technology proposed for the developing the so-called Semantic Web and in relation with eXtensible Mark-up Language (XML). Basically, this is a simple structure for defining relations between semantic concepts also encoded in sets of triplets, however not with reference to the grammatical structure of sentences in the text. The triplets of RDF form links information about related things in a similar way as concepts are linked to each other in a thesaurus. In the 'Semantic Web' terminology, these structures of information are denoted as 'ontology'. An extension of a RDF contains assertions about facts, for instance 'London is-a City', a technique quite popular in the earlier 'expert systems' encoded in programming languages such as PROLOG. The new aspect of the 'Semantic Web' is that the RDFs are connected to URIs (Universal Resource Identifier).

The present invention is based on a quite different ideology formulated with respect to the objectives to be achieved by the proposed system for organising information and theoretical principles that guide the design. This is the reason why it is preferred not to use concepts related to the 'Semantic Web' technology aiming at different goals and with different formalisation processes. The theoretical stance underlying the present invention is briefly described in the section 'The principle of text driven attention structures'.

REFERENCES

Aarskog, B. H. (1999): 'Argumenterende tekst transformert til hypertekst', Unpublished dissertation, submitted to the University of Bergen, Norway, July 1991. (In Norwegian)

Blair, D. C. (1990): Language and representation. Amsterdam: Elsevier.

Remer, T. G. (ed.), (1965): Serendipity and the Three Princes of Serendip; From the Peregrinaaggio of 1557. Norman, University of Oklahoma Press.

Werth, Paul (1999): *Text worlds: Representing conceptual space in discourse*. Addison-Wesley Longman Ltd.

Zipf, G. K. (1945): The meaning-frequency relationships of words. Journal of General Computing, 33, 251-256.

The invention claimed is:

1. A method for textual exploration and discovery comprising: annotating, with a processor, Subject-Verb-Object Structures (SVOS) in a grammatically encoded electronic text; and wherein said SVOS are used to identify semantic facets termed "Agent", "Process" and "Object", i.e. APOS, in a text span, and wherein said semantic facets "Agent", "Process" and "Object" are provided as index entries in respective window panes on a display unit as contacts point to said electronic text.

2. A method in accordance with claim 1, wherein three separate window panes are provided on the display unit.

3. A method in accordance with claim 2, wherein said triplets are based on a grammatical founded design aiming at supporting exploration and discovery.

4. A method in accordance with claim 3, wherein the grammatical design is based on grammatical annotation.

5. A method in accordance with claim 4, wherein the grammatical annotation is based on part-of-speech tagging (POS-tagging).

6. A method in accordance with claim 4, wherein the grammatical annotation is based on constraint grammars.

7. A method in accordance with claim 1, wherein said triplets are dynamically extracted from a grammatically encoded text.

8. A method in accordance with claim 1, wherein the user after having evaluated a set of contacts can open, and see directly into the text segment from which these contacts are extracted.

9. A method in accordance with claim 1, wherein the SVOS are organized in triplets.

10. A method in accordance with claim 1, wherein the APOS are organized in triplets, termed an "APO triplet".

11. A method in accordance with claim 1, wherein the user can explore the contacts through various options for filtering and sorting.

12. A method in accordance with claim 1, wherein the contacts relates to facets organized according to at least one of grammatical, semantic or pragmatic features in the underlying text.

13. A method in accordance with claim 1, wherein classes of nominal expressions provide semantic roles for subsets of "Agents" and "Objects".

14. A method in accordance with claim 1, wherein classes of verbal phrases provide semantic roles for a subset of "Process".

15. A method according to claim 1, wherein the contacts are displayed in an interface in the form of windows arranged for instance side-by-side, each window with options for expansion or reduction, and options for displaying the underlying words as they appear in the text.

16. A method for textual exploration and discovery according to claim 1, wherein;
   i) a first window pane contains index entries of Agent structures containing noun units, and
   ii) a second window pane contains index entries of Process structures containing verb units, and wherein this window pane is constrained to verb units that follow the noun units displayed in the text pane, and
   iii) a third window pane contains index entries of Object structures containing noun units constrained to noun units and verb units displayed in the text pane.

17. Apparatus for textual exploration and discovery, wherein Subject-Verb-Object Structures (SVOS) are annotated in a grammatically encoded electronic text, and wherein said SVOS are used to identify semantic facets termed "Agent", "Process" and "Object", i.e. APOS, in a text span, wherein the system comprises: a processor;
   memory; and
   a) an acquisition module for collection of documents, and capable of formatting the documents to at least one common format,
   b) a segmentation module for the generation of Annotated Text Files (ATF), thus forming the Annotated Text Corpus, and
   c) a Disambiguation Module for text disambiguation, and
   d) a display unit for presenting said semantic facets "Agent", "Process" and "Object" as index entries in respective window panes as contacts to said electronic text.

18. Apparatus according to claim 17, wherein the acquisition module are capable of administering, indexing and querying large text corpora.

19. Apparatus according to claim 17, wherein the documents can be annotated with structural information and grammatical information.

20. Apparatus according to claim 17, wherein the module provides a documental link structure, for instance, a group of peripheral documents are linked to a central document, the central documents can be linked to each other, or peripheral documents associated with a central document may also be linked to another central document.

21. Apparatus according to claim 17, wherein the module enables recording of various types of information about the texts, such as document source, collection date, person responsible for collecting it, language, copyright status, format information and version information.

22. Apparatus according to claim 17, wherein the segmentation process includes metadata assignment.

23. Apparatus according to claim 17, wherein the segmentation process applies the Dublin Core Metadata Element Set.

24. Apparatus according to claim 17, wherein a multi-leveled annotation file system is constructed.

25. Apparatus according to claim 24, wherein the Disambiguation module deals with techniques for converting output from Constraint Grammar taggers (CG-tagger) into an annotation format in compliance with the structure/architecture specified for the Multileveled Annotation File System (MAPS).

26. Apparatus according to claim 25, wherein extracted subsets of grammatical tags (codes) are combined with a selected set of semantic codes.

27. Apparatus according to claim 25, wherein special codes describing different linguistic features are assigned to the words in the texts.

28. Apparatus according to claim 17, wherein the module provides a framework based on triplets in the basic form Subject Verb Object Structures (SVOS).

29. An apparatus according to claim 17, wherein said display unit provides three separate window panes.

30. The apparatus according to claim 29, wherein;
   a first window pane contains index entries of Agent structures containing noun units, and
   a second window pane contains index entries of Process structures containing verb units, and wherein this window pane is constrained to verb units that follow the noun units displayed in the text pane, and
   a third window pane contains index entries of Object structures containing noun units constrained to noun units and verb units displayed in the text pane.

* * * * *